United States Patent
Hashimoto et al.

(10) Patent No.: US 6,992,714 B1
(45) Date of Patent: Jan. 31, 2006

(54) IMAGE PICKUP APPARATUS HAVING PLURAL PIXELS ARRANGED TWO-DIMENSIONALLY, AND SELECTIVE ADDITION OF DIFFERENT PIXEL COLOR SIGNALS TO CONTROL SPATIAL COLOR ARRANGEMENT

(75) Inventors: Seiji Hashimoto, Yokohama (JP); Mahito Shinohara, Machida (JP); Tetsunobu Kochi, Hiratsuka (JP); Hidetoshi Hayashi, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 944 days.

(21) Appl. No.: 09/584,198

(22) Filed: May 31, 2000

(30) Foreign Application Priority Data

| May 31, 1999 | (JP) | ............................ 11-151615 |
| Jun. 17, 1999 | (JP) | ............................ 11-171136 |
| Jul. 21, 1999 | (JP) | ............................ 11-206515 |
| Jul. 21, 1999 | (JP) | ............................ 11-206516 |
| Apr. 7, 2000 | (JP) | ........................ 2000-106782 |

(51) Int. Cl.
*H04N 5/335* (2006.01)

(52) U.S. Cl. .................. 348/273; 348/280; 382/298
(58) Field of Classification Search .............. 348/273, 348/272, 222.1, 280, 372, 283, 319, 318, 348/321, 323, 312; 382/300, 298, 299; 358/514, 358/909.1
See application file for complete search history.

(56) References Cited

U.S. PATENT DOCUMENTS

| 4,914,319 A | | 4/1990 | Hashimoto |
| 5,331,421 A | | 7/1994 | Ohzu et al. |
| 5,506,619 A | * | 4/1996 | Adams et al. ............... 348/272 |
| 5,694,167 A | | 12/1997 | Hashimoto |
| 5,737,016 A | | 4/1998 | Ohzu et al. |
| 5,828,406 A | * | 10/1998 | Parulski et al. ........... 348/220.1 |
| 6,236,433 B1 | * | 5/2001 | Acharya et al. ............. 348/273 |
| 6,275,261 B1 | * | 8/2001 | Yamazaki .................... 348/273 |
| 6,690,421 B1 | * | 2/2004 | Yamada et al. ............. 348/272 |
| 2002/0057354 A1 | * | 5/2002 | Yanai et al. ................. 348/273 |

FOREIGN PATENT DOCUMENTS

| JP | 9-247689 | | 9/1997 |
| JP | 2000308074 | * | 11/2000 |
| JP | 2001156281 | * | 6/2001 |

* cited by examiner

Primary Examiner—Tuan Ho
Assistant Examiner—Heather R. Long
(74) Attorney, Agent, or Firm—Fitzpatrick, Cella, Harper & Scinto

(57) ABSTRACT

An image pickup apparatus comprises a plurality of pixels arranged in a matrix form, first color filters arranged in an oblique direction for the pixels, second and third color filters arranged so that a same color is arranged in a horizontal direction, a circuit for adding together signals of two or more pixels each having the first color filter, which are adjacent to each other in an oblique direction, and a circuit for adding together the signals of two or more pixels each having the second color filter, which are arranged in a horizontal direction, and for adding together the signals of two or more pixels each having the third color filter, which are arranged in the horizontal direction.

4 Claims, 40 Drawing Sheets

COMMON AMP. PIXEL

FOR 1H

FOR 1H

FOR 1H

FIG. 28A

|    | V1  | V2  | V3  | V4  | V5  |
|----|-----|-----|-----|-----|-----|
|    | G11 | R12 | G13 | R14 | G15 |
|    | B21 | G22 | B23 | G24 | B25 |
|    | G31 | R32 | G33 | R34 | G35 |
|    | B41 | G42 | B43 | G44 | B45 |
|    | G51 | R52 | G53 | R54 | G55 |

COMMON AMP. PIXEL $a1 > a2$

IMAGE PICKUP APPARATUS HAVING PLURAL PIXELS ARRANGED TWO-DIMENSIONALLY, AND SELECTIVE ADDITION OF DIFFERENT PIXEL COLOR SIGNALS TO CONTROL SPATIAL COLOR ARRANGEMENT

BACKGROUND OF THE INVENTION

1. Field of the Invention

The present invention relates to an image pickup apparatus and to an image pickup system that employs the apparatus, and for example, relates to a color image pickup apparatus, which can select an operation for reading individual original pixel signals and an operation for adding the signals together and reading the result, and to an image pickup system that uses the apparatus.

2. Related Background Art

Nowadays, digital still cameras are available that are equipped with pickup devices that have two million pixels. The availability of pickup devices having such a high resolution is the result of the effort devoted to matching the image quality available with silver halide photographic equipment. These new cameras are especially used for static images. Conventional NTSC video cameras have only around four hundred thousand pixels, and reading speeds of about 13.5 MHz for interlaced scanning and 27 MHz for progressive scanning.

If a pickup device that has two million pixels is employed for a moving picture, the reading speed will be five times that attained by a four hundred thousand pixel device.

But when reading is performed at this speed, there is a considerable increase in the consumption of power and signals are degraded by the noise that is produced by the increased power consumption. Furthermore, device costs are also increased because more image processing memory is required.

To resolve this problem, a color image pickup apparatus was devised and is disclosed in Japanese Laid-open Patent Application No. 9-247689. In the embodiment that is described (FIG. 3, in the application), signals are read on 4×4 pixel block basis by thinning out signals for the same color are from each 4×4 pixel block, and are added together.

In this case, the problem is that the number of pixels in a 4×4 pixel block that are effectively used is reduced to ¼ of the total, and for the full pixel count, is reduced to 1/16 of the total. Therefore, for a device that has two million pixels, a resolution of only two million/16≈125 thousand pixels can be obtained. That is, the use efficiency is greatly deteriorated, and in actuality, such a device is used merely as a monitor.

Further, in the embodiment (FIG. 2 of the publication) in Japanese Laid-open Patent Application 9-247689 described above, a plurality of pixel signals are mixed and read. This process can not be implemented using a CCD (since a CCD employs charge-coupled transmissions, X-Y scan reading is difficult). In addition, the KTC noise along a vertical signal line is too large to perform the process using a semiconductor switch and a photodiode, so that a preferable S/N ratio can not be obtained.

As is described above, since in the prior art pixel signals are thinned out to be read in every 4×4 pixel block, a satisfactory resolution can not be acquired and a satisfactory S/N ratio can not be obtained.

Furthermore, to read a signal from a pixel, conventionally, a pixel signal for the first line is transferred to an upper memory, and a pixel signal for the second line is transferred to a lower memory. Therefore, the horizontal addition of signals is easy, while the vertical addition of signals or the oblique addition is difficult.

SUMMARY OF THE INVENTION

It is, therefore, one objective of the present invention to provide an image pickup apparatus that can add together a plurality of pixel signals and that can thus obtain a preferable image quality with such the addition.

To achieve this objective, according to aspect of the present invention, there is provided an image pickup apparatus comprises a plurality of pixels arranged in a matrix form;

means for adding together, in the oblique direction, at least two pixel signals that output a first color signal;

means for adding together, in the horizontal direction, at least two pixel signals that output a second color signal; and means for adding together, in the horizontal direction, at least two pixel signals that output a third color signal.

According to another aspect of the present invention, an image pickup apparatus is provided that comprises:

a plurality of pixels arranged in a matrix form;

scanning switching means for switching between interlaced scanning and progressive scanning on a plurality of line basis.

According to another aspect of the present invention, an image pickup apparatus is provided that comprises:

a plurality of pixels arranged two-dimensionally;

first and second horizontal output lines that are vertically arranged and oriented differently; and reading means for adding together signals produced by the plurality of pixels that output the first color signal and reading out the result from the first horizontal output line, and for adding together signals produced by the plurality of pixels that output the second color signal and reading out the result from the second horizontal output line.

According to aspect of the present invention, an image pickup apparatus is provided that comprises:

a plurality of pixels arranged two-dimensionally; and addition means for adding together signals produced by pixels that output the same color signal, wherein the addition means performs addition in such a manner that a line interval between pixels that output first color signals and used for addition of the first color signals, is smaller than a line interval between pixels that output second and third color signals and used for the addition of the second and the third color signals.

According to another aspect of the present invention, an image pickup apparatus is provided that comprises:

a pixel portion in which are arranged a plurality of pixel elements, each of which consists of a plurality of pixels arranged according to a predetermined basic color arrangement; and reading means for reading signals of a plurality of colors from the pixel elements, and for adding and scanning, on a same color basis, a signal from the same pixel elements and/or signals from different pixel elements, wherein the reading means adds the signals from the plurality of pixels so that a spatial color arrangement for each color before addition is the same as a spatial color arrangement for each color after addition.

According to still another aspect of the present invention, an image pickup apparatus is provided that comprises:

a pixel portion in which are arranged a plurality of pixel elements that consist of a plurality of pixels arranged according to a predetermined basic color arrangement; and reading means for adding and scanning signals of the plurality of pixels, and for reading signals of a plurality of colors, wherein the reading means adds together a plurality of pixel signals so that a spatial color arrangement for each color before addition is the same as a spatial color arrangement for each color after addition, and wherein at least one of the plurality of colors is provided by a color signal obtained by adding together signals produced only by pixels that are arranged in an oblique direction.

According to another aspect of the present invention, an image pickup apparatus is provided that comprises:

a plurality of pixels arranged two-dimensionally; and addition means for adding together signals from pixels that output a same color signal, wherein the addition means adds signals of individual colors produced by the plurality of pixels, with spatially overlapping the signals each other.

According to still another aspect of the present invention, an image pickup apparatus is provided that comprises:

a plurality of pixels that output a plurality of color signals;

reading means for reading the plurality of color signals output from the plurality of pixels; and driving means for adding together the color signals for each color, and for outputting the obtained signals in the line sequential order.

According to another aspect of the present invention, an image pickup apparatus is provided that comprises:

a plurality of pixels that output a plurality of color pixels; and driving means for performing on the plurality of color signals, combinational addition for a first color and combinational addition for a second color, and for outputting, in the line sequential order, the signal obtained from the combinational addition for the first color and the signal obtained from the combinational addition for the second color.

Other features and advantages of the invention will become apparent in the course of the following description, given by referring to the accompanying drawings.

BRIEF DESCRIPTION OF THE DRAWINGS

FIGS. 28A, 28B, 28C, 28D and 28E are diagrams for explaining a signal output method employed by a color image pickup apparatus according to a fifth embodiment of the present invention;

DETAILED DESCRIPTION OF THE PREFERRED EMBODIMENTS

The preferred embodiments of the present invention will now be described in detail by referring to the accompanying drawings.

A first embodiment will now be described.

Figure 1:
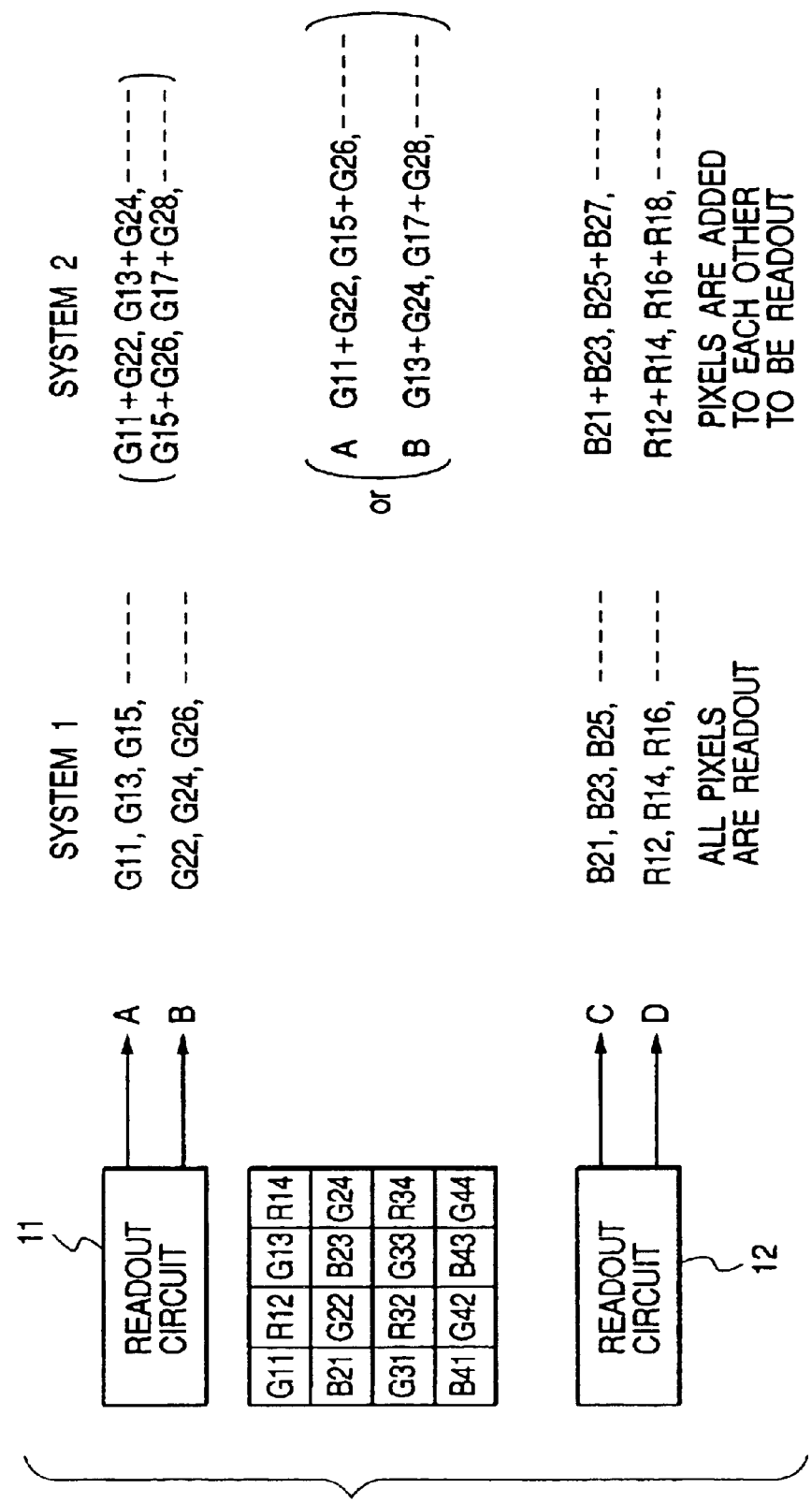
FIG. 1 is a schematic diagram for explaining a pixel signal reading method employed by a color image pickup apparatus according to a first embodiment of the present invention.

FIG. 1 is a schematic diagram for explaining a pixel signal reading method employed by a color image pickup apparatus according to the first embodiment of the present invention. In FIG. 1, four channels are provided for the output of an image pickup device, and color filters of individual pixels that are arranged as a matrix form in the image pickup device, are arranged in a checkerboard: G (green) filters are arranged in half of the checkerboard pattern, and R (red) filters and B (blue) filters are each arranged in the other half of the remaining.

For high definition reading (system 1), each pixel signal is read individually. That is, pixel signals G11, G13, G15, . . . are output by a reading circuit 11 via output channel A; pixel signals G22, G24, G26, . . . are output by the reading circuit 11 via output channel B; pixel signals B21, B23, B25, . . . are output by a reading circuit 12 via output channel C; and pixel signals R12, R14, R16, . . . are output by the reading circuit 12 via output channel D.

For low-resolution reading (system 2), pixel signals for the same color are added together and read. Signals for pixels with G filters, which are adjacent to each other in a oblique direction, are added together on two lines basis and read out by the reading circuit 11. Signals of from pixels with R or B filters, which are adjacent to each other in a horizontal direction, are added together on the two lines basis and read out by the reading circuit 11. Specifically, pixel signals G11+G22, G13+G24, . . . and pixel signals G15+G26, G17+G18, . . . are output by the reading circuit 11 via the output channel A, while pixel signals B21+B23, B25+B27, . . . are output by a reading circuit 12 via the output channel C, and pixel signals R12+R14, R16+R18, . . . are output by the reading circuit 12 via the output channel D. In FIG. 1, no signal is output via the output channel B; however, the pixel signals G11+G22, G15+G26, . . . may be output via the output channel A, while the pixel signals G13+G24, G17+G28 . . . may be output via the output channel B.

It should be noted that the image pickup device is. a high definition sensor of two million pixels of 1000 V×2000 H pixels.

For high definition moving images in system 1, the individual signals are output via the channels A, B, C and D at about 40 MHz (two million pixels×60 fields/sec×(4/3)), where 4/3 is employed while taking the blanking period into account). For high definition still images (digital still camera images) in system 1, the signals are output at about 4 MHz at a speed, for example, of 6 sheets/sec.

Assuming that the system 2 performs NTSC interlaced scanning, for the four-channel outputs the signals are output at about 10 MHz (½ for interlaced scanning and ½ for the addition of signals). When the G added signals are to be output via one channel, the signals are output at about 20 MHz.

The feature of system 2 is that G signals in two adjoining pixel lines are added in the oblique direction, and addition in the horizontal direction is employed for R and B signals. When the G signals are added in the oblique direction, the resolution for G (green) can be double the resolution for R (red) or for B (blue).

If the G high-band component is employed as the one for a luminance signal, a high resolution can be obtained, and no signal need be abandoned by thinning-out. Thus, only low-speed driving can be used and the consumption of power can be reduced.

Figure 2:
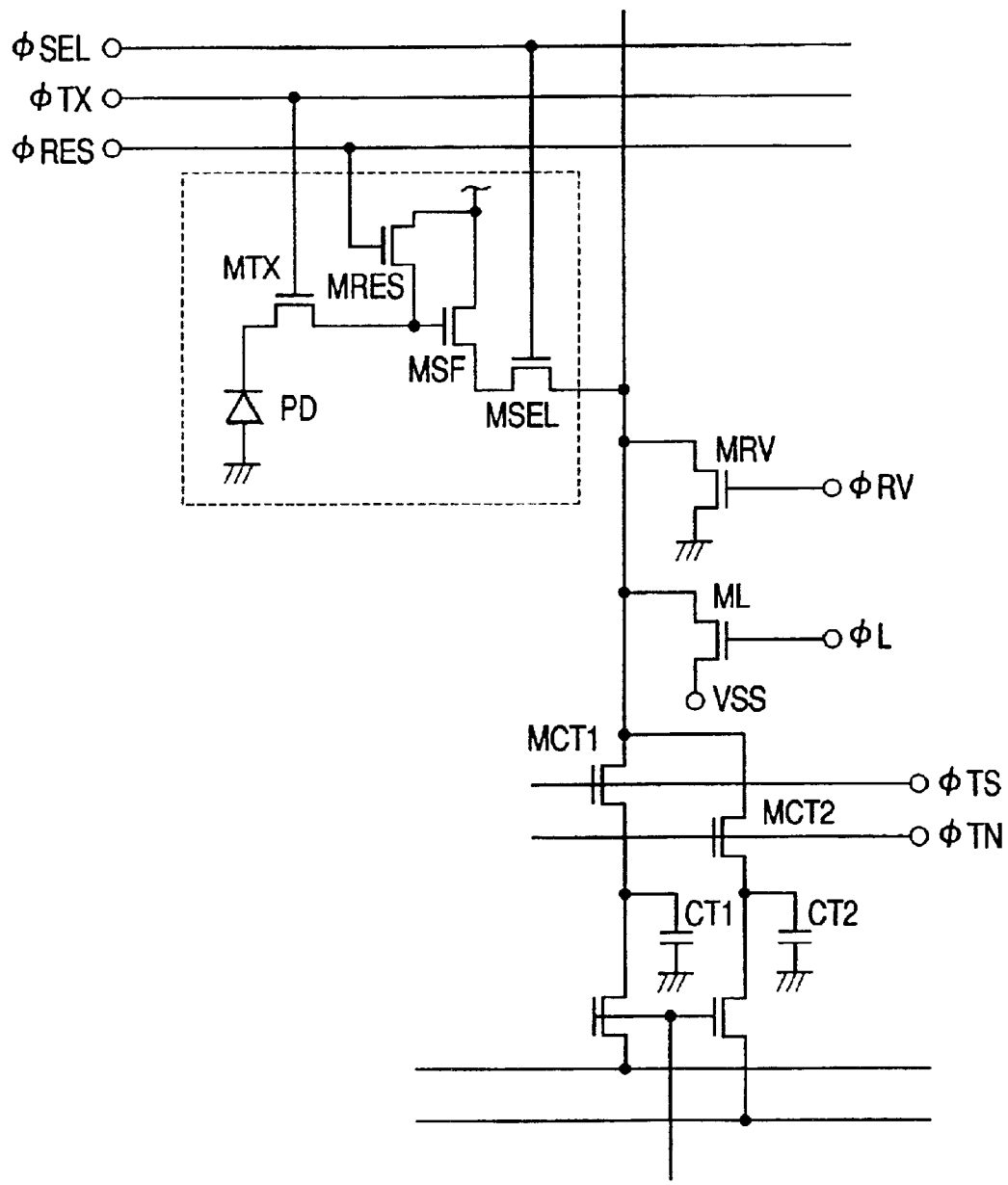
FIG. 2 is a circuit diagram showing a pixel portion and a reading circuit.

FIG. 2 is a diagram showing a pixel portion and a reading circuit. Since there is variation in the individual pixel amplifiers and gates produce reset noise, provided for the output unit are a signal memory CT1 and a noise memory CT2 to remove noise by a subtraction processing.

In FIG. 2, a block indicated by a broken line represents one pixel portion that includes a photodiode PD, a transfer transistor MTX, a reset transistor MRES, an amplification transistor MSEL which serves as a pixel amplifier, and a selection transistor MSEL for selecting a pixel. The pixel portion and the vertical output line are reset by turning on the reset transistors MRES and MRV, and noise signals are accumulated in the noise memory CT2 via the pixel amplifier, the selection transistor MSEL and a transistor MCT2. Further, when the transfer transistor MTX is turned on, a signal obtained by photoelectric conversion is transferred from the photodiode PD to the gate of the amplification transistor MSEL which serves as a pixel amplifier. Then, a signal which includes a noise signal component, is accumulated in the signal memory CT1 via the pixel amplifier, the selection transistor MSEL and the transistor MCT1. The signal which includes the noise signal component and which is stored in the signal memory CT1, and the noise signal which is stored in the noise memory CT2, are output to the horizontal output line. The subtraction process is preformed to obtain a signal from which the variation of the pixel amplifiers and the noise components, such as the reset noises produced by the gates, are removed. Control signals φSEL, φTX, φRES, φRV, φTS and φTN are used to control the amplification transistor MSEL, the transfer transistor MTX, the reset transistors MRES and MRV, and the transistors MCT1 and MCT2, respectively. Transistor ML is a load imposed on the pixel amplifier MSF, and control signal φL may be driven together with the control signal φSEL, or may be constantly maintained at level H to be used as a resistor.

Figure 3:
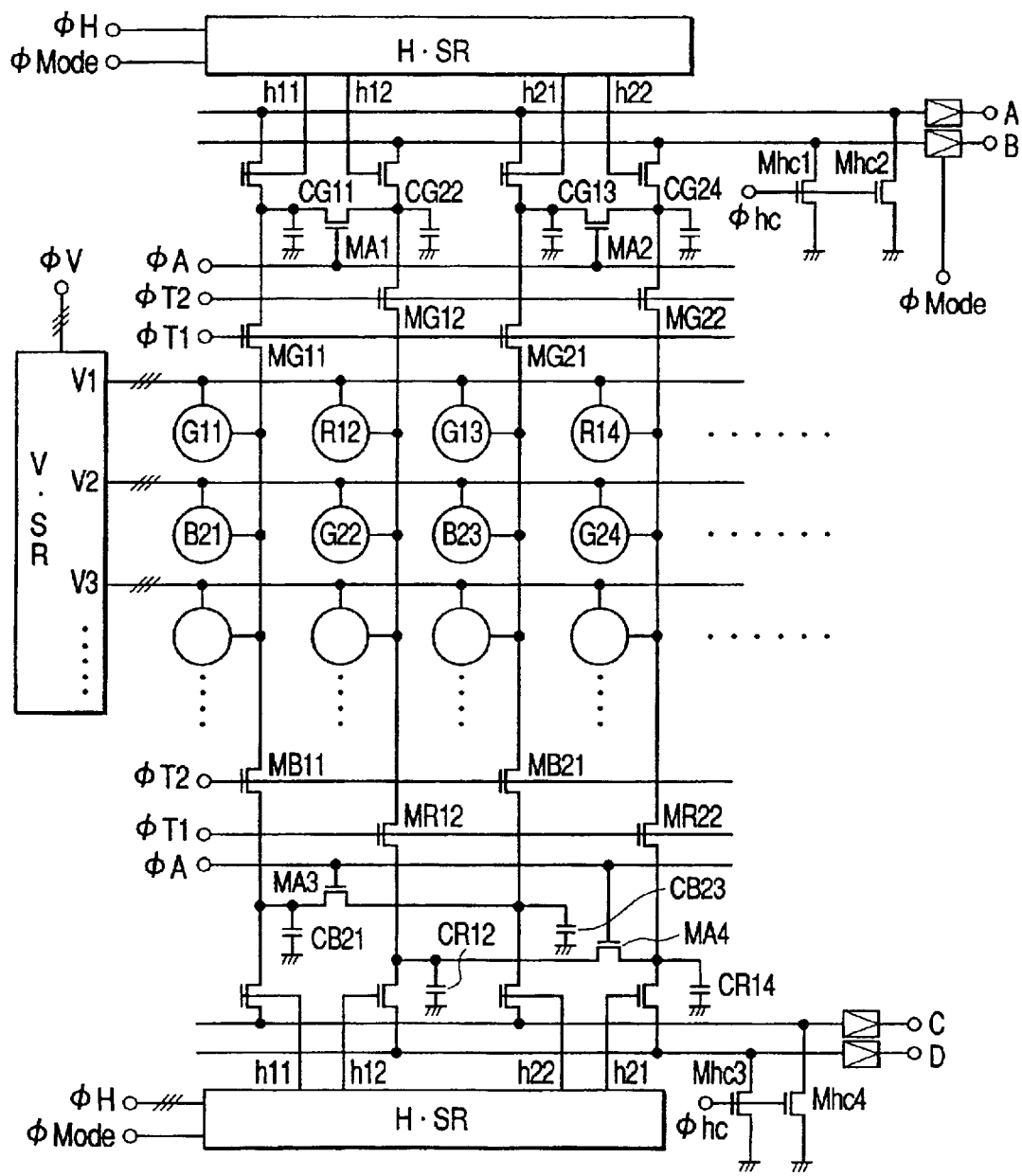
FIG. 3 is a circuit diagram illustrating the color image pickup apparatus.

FIG. 3 is a circuit diagram showing the arrangement of the color image pickup apparatus according to this embodiment. This circuit is formed on the same semiconductor substrate using a CMOS process, for example. Each pixel portion in FIG. 3 is arranged as Is shown in FIG. 2. And while noise removal means is not shown, the noise memory and the horizontal output line for the noise signal are provided in the same manner as in FIG. 2, and through subtraction processing, a signal is obtained from which the variation of the pixel amplifiers and the noise components, such as the gate reset noise, are removed.

The memory circuit in the upper portion in FIG. 3 stores G signals for two lines, and the memory circuit in the lower portion stores R signals and B signals for two lines. The process by which signals are read from pixels G11, R12, B21 and G22 will now be described as an example. A signal from the pixel G11 is stored in a memory CG11 via a switching transistor MG11 and a signal from the pixel G22 is stored in a memory CG22 via a switching transistor MG12, while a signal from the pixel B21 is stored in a memory CB21 via a switching transistor MB11 and a signal from the pixel R12 is stored in a memory CR12 via a switching transistor MR12. A transistor MA1 adds together the signals stored in the memories CG11 and CG22; a transistor MA2 adds together the signals stored in the memories CG13 and CG24; a transistor MA3 adds together the signals stored in the memories CB21 and CB23; and a transistor MA4 adds together the signals stored in the memories CR12 and CR14. Control signals $\phi$T1, $\phi$T2, $\phi$A are respectively used to control the transistors MG11, MG21, MR12 and MR22, the transistors MG12, MG22, MB11 and MB21, and the transistors MA1 to MA4, while a control signal $\phi$hc is used to control transistors Mhc1 to Mhc4 which reset the horizontal output lines.

Figure 4:
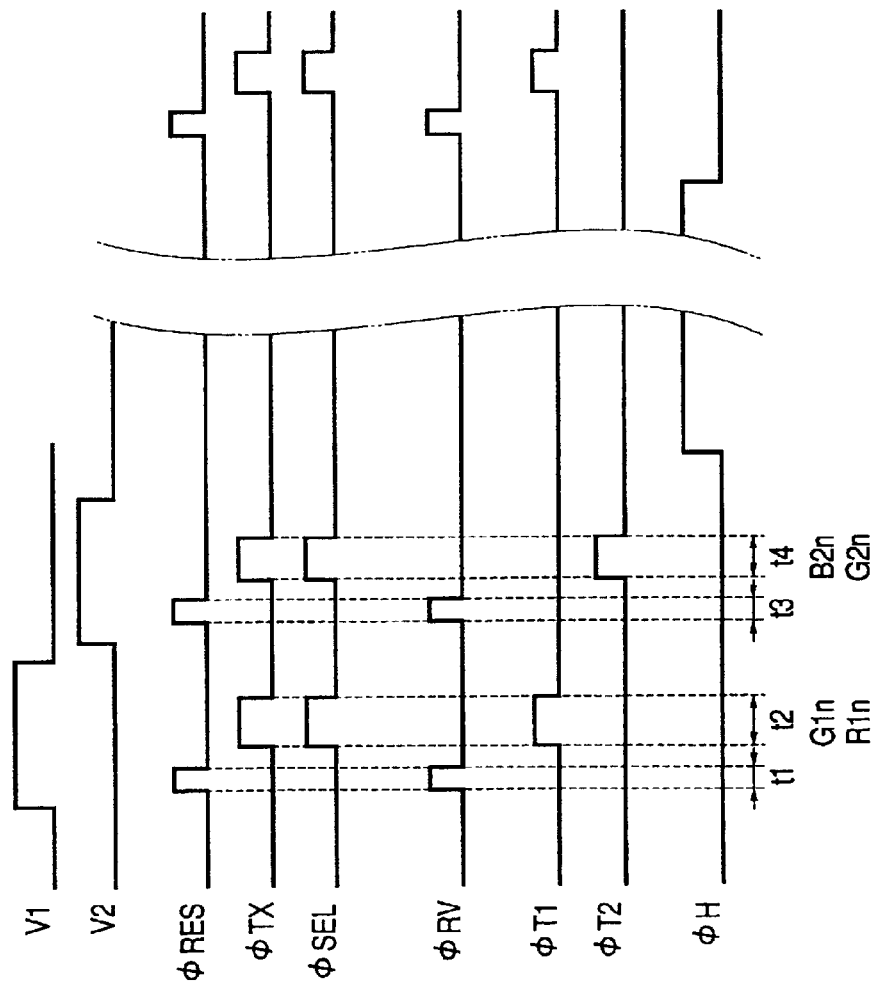
FIG. 4 is a timing chart showing the timings for transmitting a pixel signal to a memory.
Figure 5:
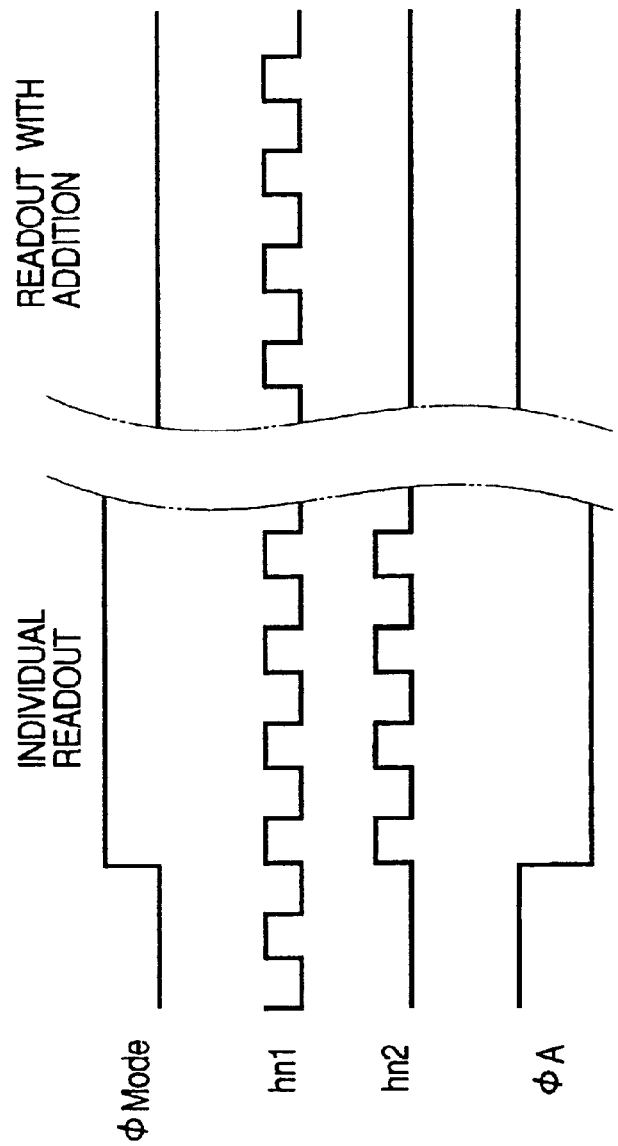
FIG. 5 is a timing chart showing the timings for independently reading a memory signal, and for adding memory signals and reading the resultant signal.

FIG. 4 is a timing chart for the transfer of a pixel signal to a memory, and FIG. 5 is a timing chart showing the timings for independently reading a memory signal, and for adding the memory signals together and reading the resultant signal.

In FIG. 4, at time t1 the control signals $\phi$RES and $\phi$RV for the pixels on the first line are set to level H to turn on the reset transistors MRES and MRV, and to thus reset the pixels and the vertical output lines.

At time t2, the control signals $\phi$TX and $\phi$SEL for the pixels on the first line are set to level H to turn on the transfer transistors MTX and MSEL. And in addition, the control signal $\phi$T1 is set to level H to turn on the transistors MG11, MG21, MR12, MR22, . . . . Then, signals corresponding to signal charges obtained by photoelectric conversions performed in pixels G11, R12, . . . , G1(n−1) and R1n are transferred to the memories CG11 to CG1(n−1) and CR12 to CR1n. A noise signal (not shown), such as reset noise, is-transferred between time t1 and time t2.

At time t3, the control signals $\phi$RES and $\phi$RV for the pixels on the second line are set to level H to turn on the reset transistors MRES and MRV, and to thus reset the pixels and the vertical output lines.

At time t4, the control signals $\phi$TX and $\phi$SEL for the pixels on the second line are set to level H to turn on the transfer transistors MTX and MSEL. And in addition, the control signal $\phi$T2 is set to level H to turn on the transistors MB11, MB21, MG12 and MG22. Then, signals that correspond to signal charges obtained by photoelectric conversions performed in pixels B21, G22, . . . , B2(n−1) and G2n are transferred to the memories CB21 to CB2(n−1) and CG22 to CG2n. A noise signal (not shown), such as reset noise, is transferred between time t3 and time t4.

Through the above described operation, of the pixel signals for two lines, the G signals from the G pixels arranged in the oblique direction are stored in the upper memory, and the R and B signals are stored in the lower memory.

Since the system 1 independently reads each pixel signal, as is shown in FIG. 5 a signal $\phi$Mode is set to level H, and horizontal shift pulses h11 to hn1 and h12 to hn2, which are provided by the horizontal scanning circuit (H·SR), are driven in the same phase. Therefore, the R, B and G signals for each 2×2 pixel block are transferred in the same phase to the horizontal output lines, and are output after noise has been removed by the output amplifier.

Since the system 2 adds signals together and reads the resultant signal, the signal $\phi$Mode is set to level and addition pulse $\phi$A is set to level H. Thus, for G, signals on two adjacent lines are added together, and for R and B, the same color signals on every other line are added together. As a result, addition in the oblique direction is performed for G, while for R and B, same color addition is performed for the same color in the horizontal direction. Specifically, pixel signals G11 and G12, G13 and G24, . . . and G1(n−1) and G2n are added together, pixel signals B21 and B23, . . . and B2(n−3) and B2(n−1) are added together, and pixel signals R12 and R14, . . . and R1(n−2) and R1n are added together. The transfer of these signals is performed with maintaining the horizontal shift pulses h11 to h(n/2)1 at level H and maintaining the horizontal shift pulses h12 to h(n/2)2 at level L.

In this embodiment, the G signal is transferred to the channel A, the B signal is transferred to the channel C and the R signal is transferred to the channel D. Since no signal is output to the channel B and the channel B is not used, the power is turned off. In this embodiment, the addition of signals is performed in the memory; however, the addition methods that can be used are not thereby limited, and the memory signals may be added together on the horizontal output lines, or they may be added in pixels.

Figure 6:
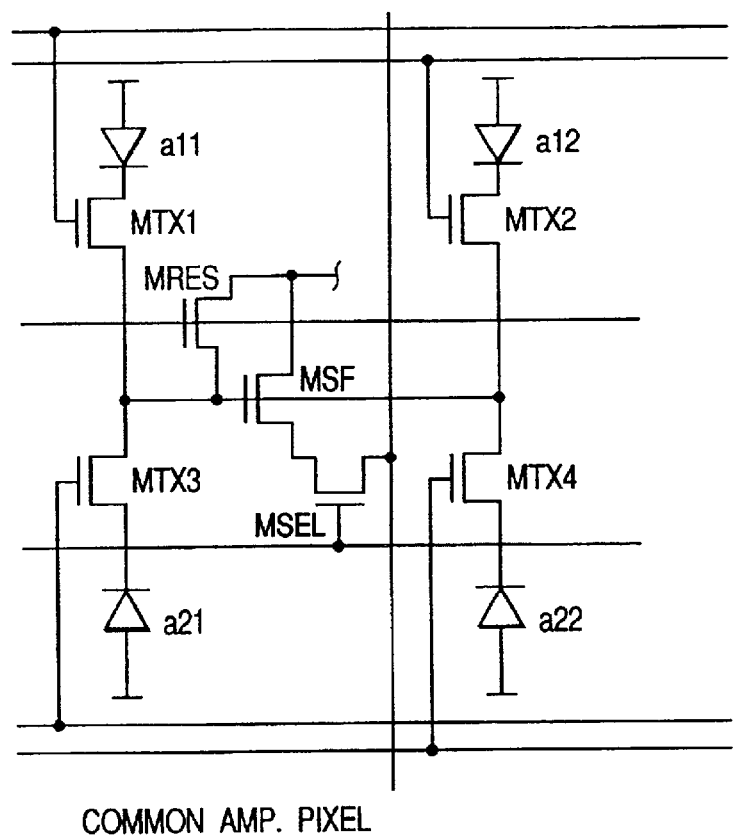
FIG. 6 is a diagram showing an example common amplifier pixel.

FIG. 6 is a diagram showing an example of a common amplifier pixel. As is shown in FIG. 6, photodiodes a11, a12, a21 and a22 are photoelectric converters of individual pixels; an amplification transistor MSF is used as a common amplifier; transfer transistors MTX1 to MTX4 transfer signal charges stored in the photodiodes to a floating diffusion area (FD area) which is the input portion of the common amplifier; a reset transistor MRES resets the FD area; and a selection transistor MSEL selects a common amplifier pixel, while the transistors MSF and MSEL constitute a source follower circuit. In the thus structured common a amplifier pixel, signals are output from the four photodiodes via the common amplifier, and four pixels constitute one unit cell. One pixel includes a photodiode and a transfer transistor, and also includes a part of a common circuit that is constituted with a common amplifier, a reset transistor and a selection transistor. A G filter is provided for the photodiodes a11 and a22, a B filter is provided for the photodiode a21, and an R filter is provided for the photodiode a12. And with this arrangement, when the transfer transistors MTX1 and MTX4 are turned on, the signals from the photodiodes a11 (G11) and a22 (G22) are added together at the gate of the common amplifier, so that the signal to be output is doubled and the S/N ratio is increased. When eight pixels are used to form the common amplifier, the signals for each color (R, B or G) can be added together at the gate of the common amplifier.

In the color image pickup apparatus in FIG. 3, to perform the interlaced (progressive) scanning the vertical scanning circuit (V·SR) first employs a scanning pair of horizontal signal lines V1 and V2, and thereafter employs a scanning pair of two horizontal signal lines, such as V3 and V4 or V5 and V6.

During the interlaced scanning, the pairs of horizontal signal lines V1 and V2, V5 and V6, and V9 and V10 are scanned in the first field, and the pairs of horizontal signal lines V3 and V4, and V7 and V8 are scanned in the second field. When the horizontal lines are scanned in this manner and the pixel signals are added together and read, then a vertical resolution of 500 lines can be obtained.

In this embodiment, the signals in two pixel lines are added together; however, more pixel lines may be employed for the addition process. Similarly, although in this embodiment two pixels in the horizontal lines are added together, the number of pixels that are added together may be increased. That is, the number of pixel lines or pixels can be arbitrarily changed in accordance with a request received from the system.

As is described above, according to this embodiment, either the reading of independent pixel signals or the adding together of pixel signals and the reading of the result can be selected, so that it is possible to switch between a high resolution image and a moving image (a standard image or a low-resolution image). Since the thinning-out process is not performed for a moving image, there is little moire, the S/N ratio is increased and the consumption of power can be reduced.

Furthermore, since a part of the signals on two lines can be transferred to the same memory, the addition of signals in the memory or on the horizontal signal line can be performed.

A second embodiment according to the present invention will now be described.

Figure 7:
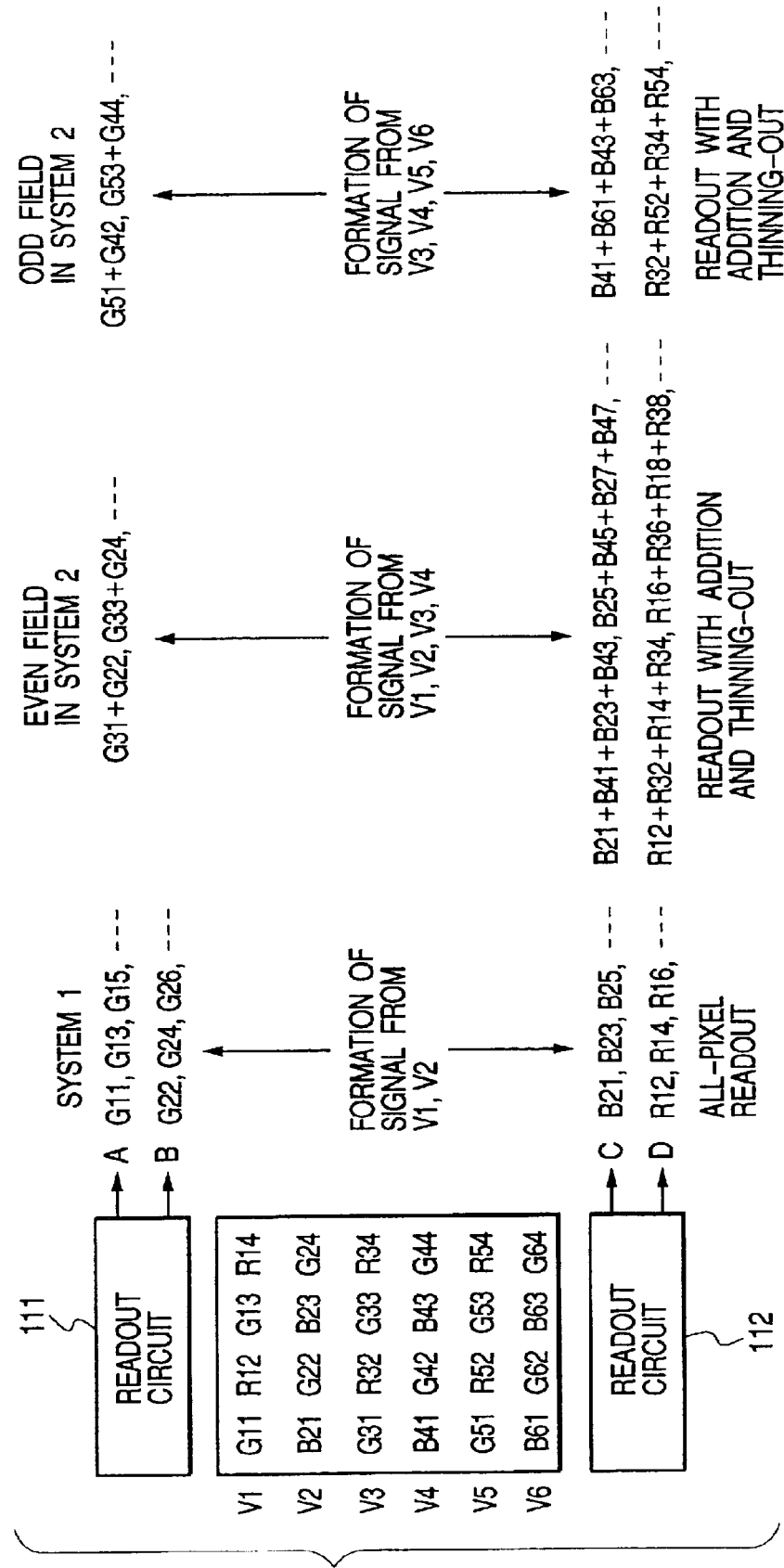
FIG. 7 is a schematic diagram for explaining a pixel signal reading method employed by a color image pickup apparatus according to a second embodiment of the present invention.

FIG. 7 is a schematic diagram for explaining a pixel signal reading method employed in a color image pickup apparatus according to the second embodiment of the present invention. In FIG. 7, four channels (four outputs) are provided for an image pickup device, and color filters for individual pixels that are arranged in a matrix form in the image pickup device, are arranged in a checkerboard: G (green) filters are arranged in half of the checkerboard pattern, and R (red) filters and B (blue) filters are each arranged in the other half of the checkerboard.

For high definition reading (system 1), all the pixel signals are read individually. That is, pixel signals G11, G13, G15, . . . are output by a reading circuit 111 via output channel A; pixel signals G22, G24, G26, . . . are output by the reading circuit 111 via output channel B; pixel signals B21, B23, B25, . . . are output by the reading circuit 112 via output channel C; and pixel signals R12, R14, R16, . . . are output by the reading circuit 112 via output channel D. Two lines, e.g., line V1 and line V2 are used to form a color signal.

For low-resolution reading (system 2), addition and thinning-out reading are used. In system 2, four lines are used to form a color signal, and a G (green) signal is obtained by adding together signals from the two middle adjacent lines of the four lines in an oblique direction, and a R (red) signal and a B (blue) signal are obtained by adding together signals obtained from the four lines in vertical and horizontal directions. Between the fields, interlaced scanning is performed by changing the four line combination. Specifically, in system 2, in an even field, four lines, e.g., lines V1, V2, V3 and V4, are used to generate a color signal, and pixel signals G31+G22, G33+G24, . . . are output by the reading circuit 111 via the output channel A; pixel signals B21+B41+B23+B43, B25+B45+B27+B47, . . . are output by the reading circuit 112 via the output channel C; and pixel signals R12+R32+R14+R34, R16+R36+R18+R38, . . . are output by the reading circuit 112 via the output channel D. Again, in an odd field, four lines, e.g., lines V3, V4, V5 and V6, are used to generate a color signal, and pixel signals G51+G42, G53+G44, . . . are output by the reading circuit 111 via the output channel A; pixel signals B41+B61+B43+B63, . . . are output by the reading circuit 112 via the output channel C; and pixel signals R32+R52+R34+R54, . . . are output by the reading circuit 112 via the output channel D. The line interval for the pixels for which the G filters are arranged (to provide the first color) is smaller than the line interval for the pixels for which the R and B filters that provide the second and third colors are arranged. With this arrangement, the G signal has a higher resolution than the other colors, and a high luminance signal can be generated.

With this arrangement, a resolution of 500 vertical lines is obtained for the G signal.

A pixel and a reading circuit will now be described.

FIG. 2 is a diagram showing a pixel portion and the reading circuit. Since there is variation in the individual pixel amplifiers and gates produce reset noise, provided for the output unit are a signal memory CT1 and a noise memory. CT2 to remove noise by a subtraction processing.

In FIG. 2, a block indicated by a broken line represents a pixel portion that includes a photodiode PD, a transfer transistor MTX, a reset transistor MRES, an amplification transistor MSEL which serves as a pixel amplifier, and a selection transistor MSEL for selecting a pixel. The pixel portion and the vertical output line are reset by turning on the reset transistors MRES and MRV, and noise signals are accumulated in the noise memory CT2 via the pixel amplifier, the selection transistor MSEL and a transistor MCT2. Further, when the transfer transistor MTX is turned on, a signal obtained by photoelectric conversion is transferred from the photodiode PD to the gate of the amplification transistor MSEL which serves as a pixel amplifier. Then, a signal including a noise signal component is accumulated in the signal memory CT1 via the pixel amplifier, the selection transistor MSEL and the transistor MCT1. The signal including the noise signal component which is stored in the signal memory CT1, and the noise signal which is stored in the noise memory CT2, are output to the horizontal output line. The subtraction process is preformed to obtain a signal from which the variation of the pixel amplifiers and the noise component, such as the reset noise produced by the gates, are removed. Control signals φSEL, φTX, φRES, φRV, φTS and φTN are used to control the amplification transistor MSEL, the transfer transistor MTX, the reset transistors MRES and MRV, and the transistors MCT1 and MCT2, respectively. Transistor ML is a load imposed on the pixel amplifier MSF, and control signal φL may be driven together with the control signal φSEL, or may be constantly maintained at level H to be used as a resistor.

Figure 8:
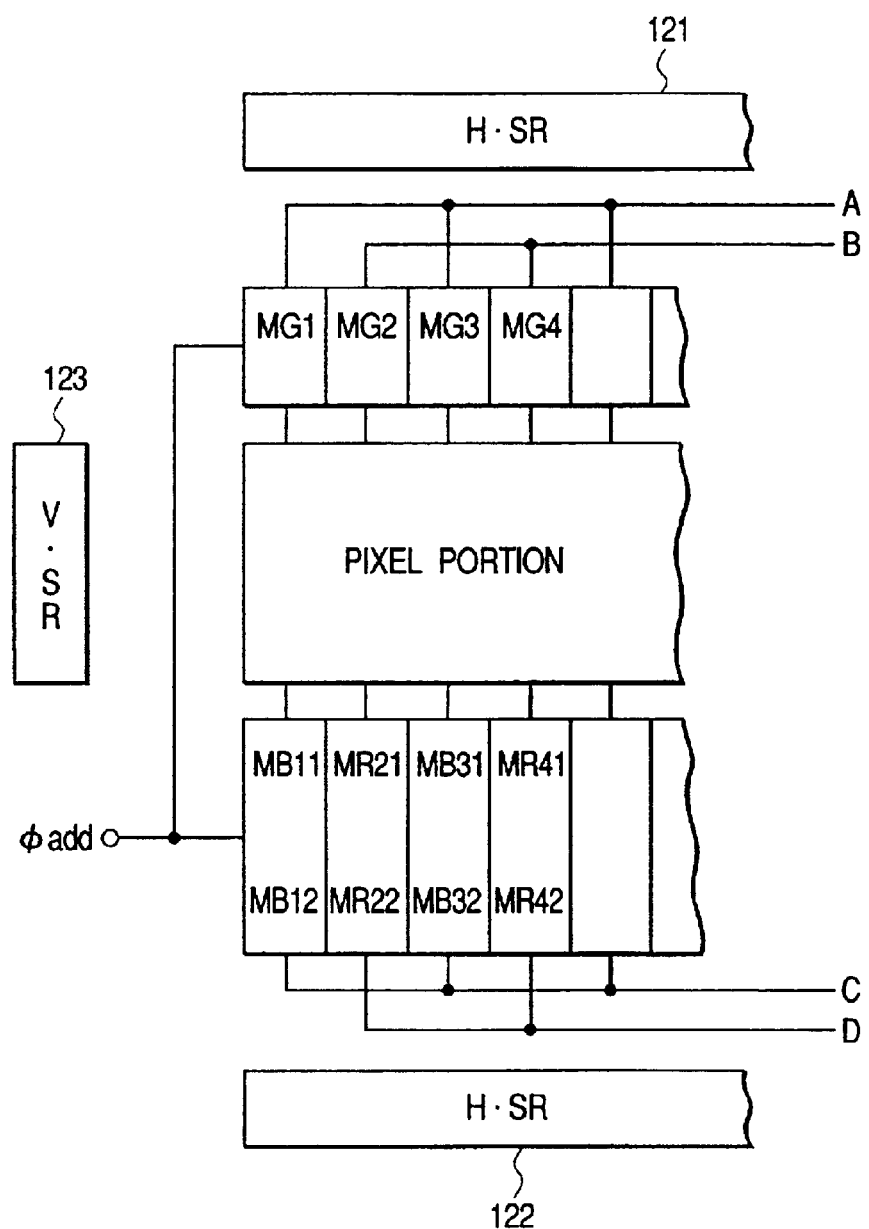
FIG. 8 is a block diagram showing the arrangement of the signal reading circuit in the image pickup apparatus.

FIG. 8 is a block diagram showing the arrangement of a pixel portion and a reading circuit for the image pickup apparatus according to this embodiment. To simplify the explanation, the noise removal means explained by referring to FIG. 2 is not shown. Furthermore, the pixel portion and the reading circuit are formed on the same semiconductor substrate using a CMOS process, for example.

G memories MG1, MG2, . . . for two lines are provided above the pixel portion, and B memories MB11, MB12, MB31, MB32, . . . for two horizontal lines and R memories MR21, MR22, MR41, MR42, . . . for two horizontal lines are provided below the pixel portion. A pixel signal is read from the pixel portion, and is transferred to the upper and lower memories. The upper memories are controlled by a horizontal scanning circuit (H·SR) 121, and the lower memories are controlled by a horizontal scanning circuit (H·SR) 122. The reading of a signal from the pixel portion is controlled by a vertical scanning circuit (V·SR) 123.

The adding together of signals is performed as follows. In the upper memories (G memories), the signals from two adjacent pixels are added together in the memory or on the horizontal signal line in accordance with addition pulse φadd. For example, a signal transferred to the memory MG1 and a signal transferred to the memory MG2 are added together, and a signal transferred to the memory MG3 and a signal transferred to the memory MG4 are added together.

In the lower (B and R) memories, the signals from four pixels are φadd together in accordance with addition pulse φadd. For example, signals transferred to the memories MB11 and MB12 and signals transferred to the memories MB31 and MB32 are added together, and signals transferred to the memories MR21 and MR22 and signals transferred to the memories MR41 and MR42 are added together.

Figure 9:
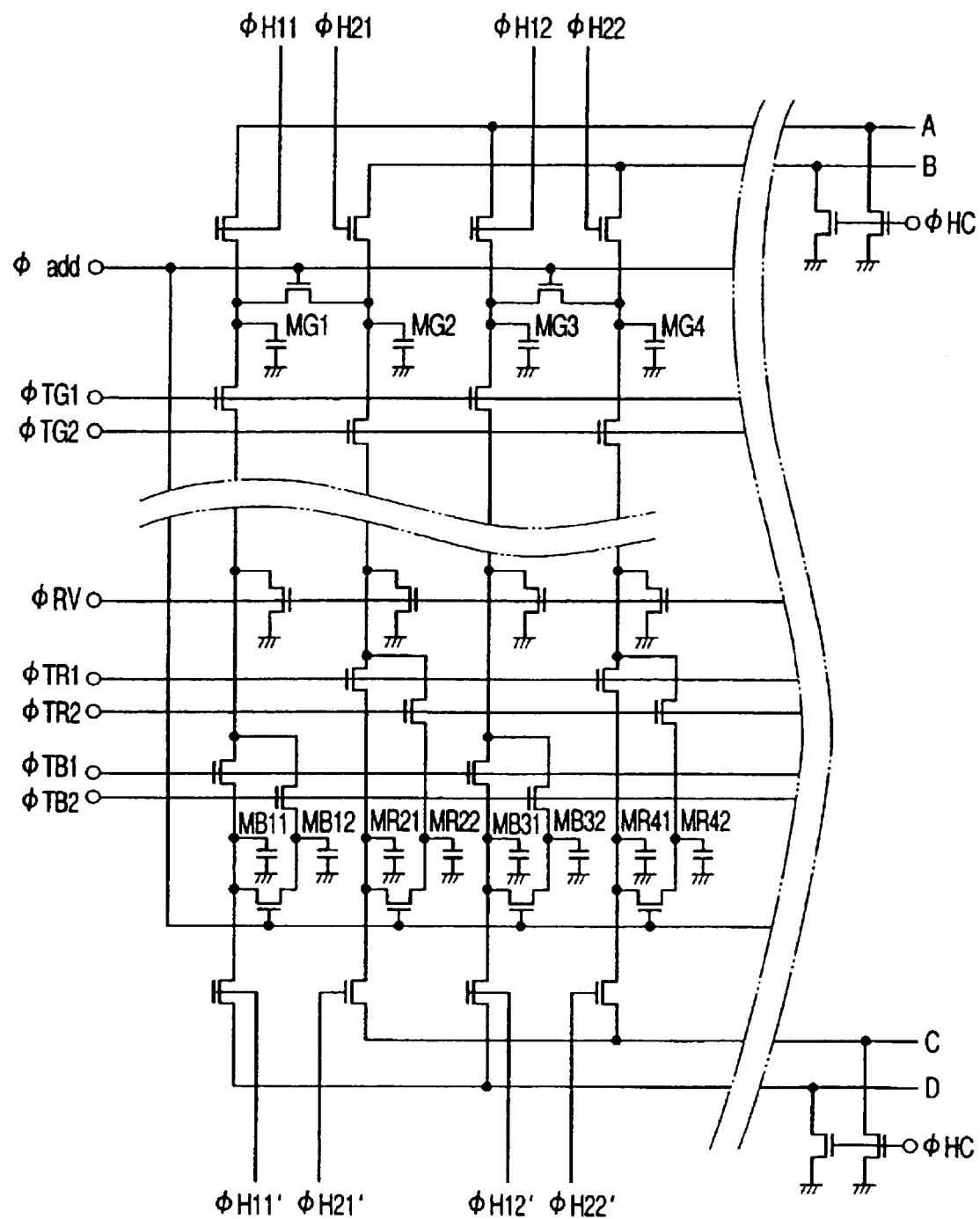
FIG. 9 is a detailed diagram showing the arrangement of the signal reading circuit.
Figure 10:
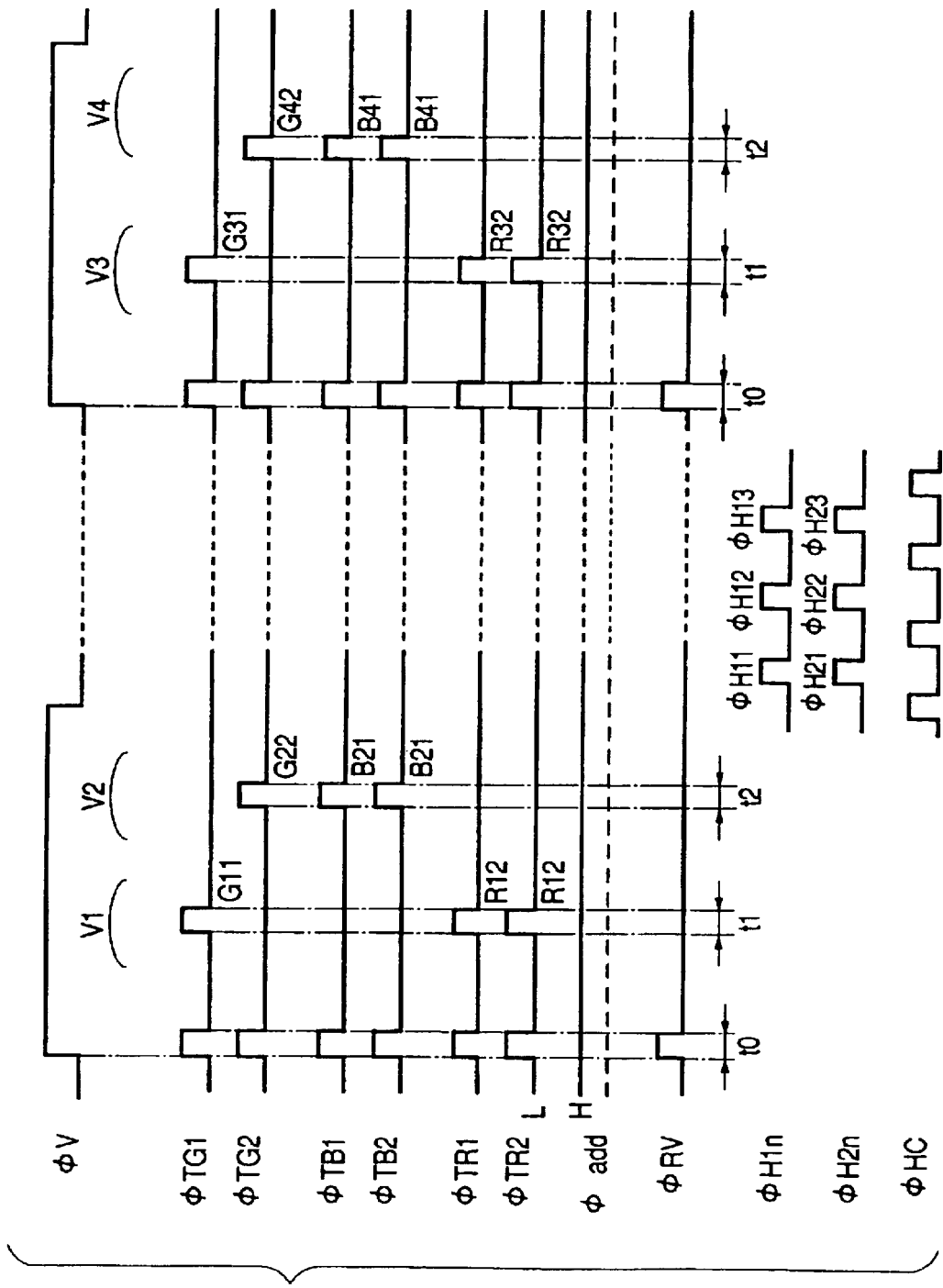
FIG. 10 is a timing chart showing timings for reading all the pixel signals.
Figure 11:
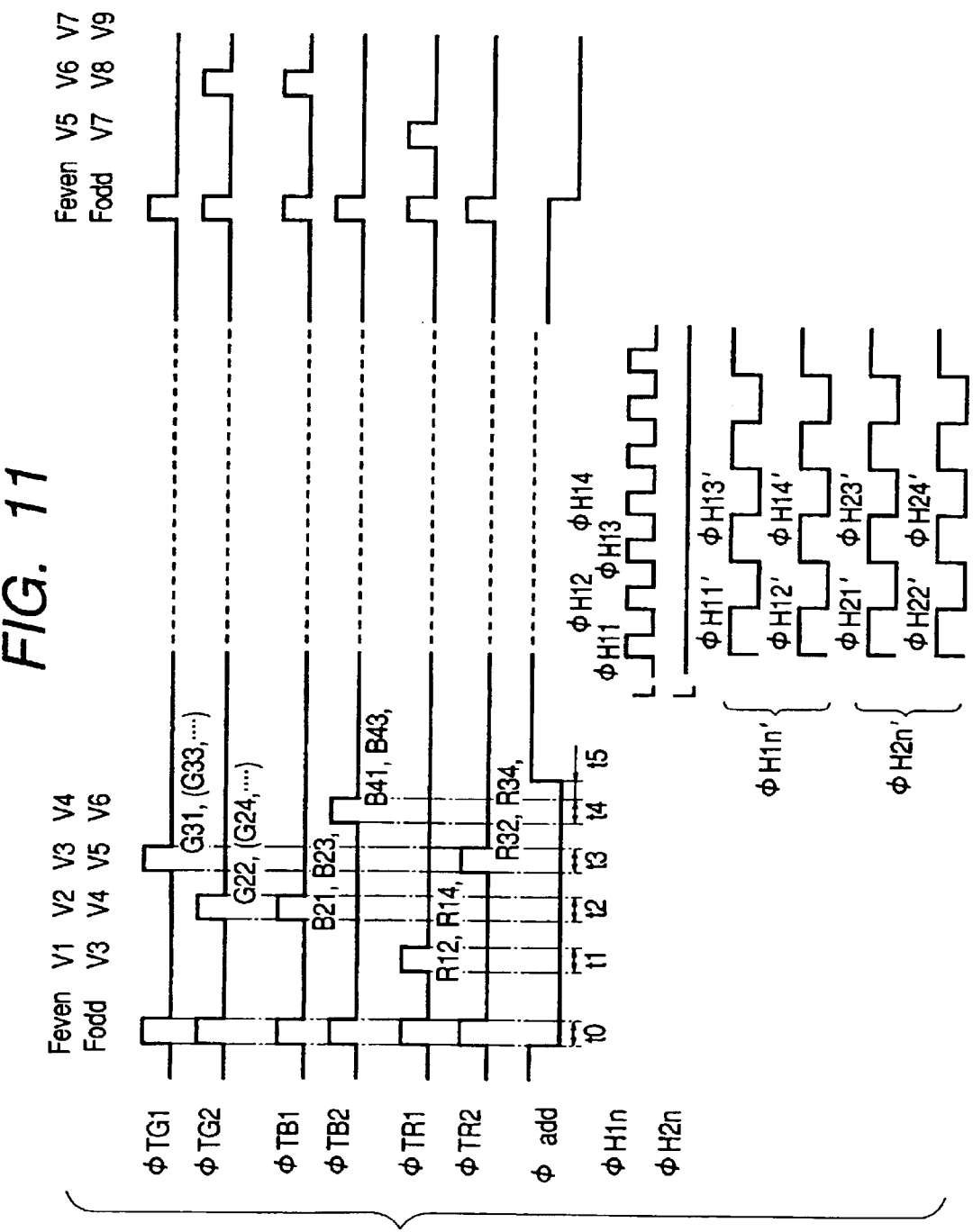
FIG. 11 is a timing chart showing timings for adding and intermittently reading.

FIG. 9 is a detailed circuit diagram showing the signal reading circuit, FIG. 10 is a timing chart for reading all the pixel signals, and FIG. 11 is a timing chart for addition and thinning-out reading.

First, the process for reading all the pixel signals will be described by referring to FIGS. 9 and 10.

As is shown in FIG. 10, at time t0 the reading circuit is reset by setting the control signals φTG1, φTG2, φTB1, φTB2, φTR1, φTR2 and φRV to level H.

At time t1, the line V1 is selected, and when the control signals φTG1, φTR1 and φTR2 are set to level H, the pixel signal G11 is transferred to the upper memory MG1, and the pixel signal R12 is transferred to the lower memories MR21 and MR22. In the lower memory, the two memories MR21 and MR22 are employed in common to increase the gain for reading from the memory to the horizontal output line.

Similarly, at time t2 the line V2 is selected, and when the control signals φTG2, φTB1 and φTB2 are set to level H, the pixel signal G22 is transferred to the upper memory MG2, and the pixel signal B12 is transferred to the lower memories MB11 and MB12. In the lower memory, the two memories MB11 and MB12 are employed in common to increase the gain for reading from the memory to the horizontal output line.

Following this, the control signals φH11 and φH21, φH21 and φH22, φH13 and φH23, ... are sequentially output from the horizontal scanning circuit 121, and signals are transferred from individual upper memories to the two horizontal output lines and are output via the output channels A and B. During the period in which the control signals φH11 and φH21, φH21 and φH22, φH13 and φH23, ... are output, the signal φHC is changed to level H, and the horizontal output line is reset. Although not shown, control signals φH11' and φH12', φH12' and φH22', φH13' and φH23', which have the same phases as φH11 to φH13 and φH21 to φH23, are also sequentially output from the horizontal scanning circuit 122. Thereafter, the signals are transferred from the individual lower memories to the two horizontal output lines, and are output via the output channels A, B, C and D. As a result, a signal is output via the output channels A, B, C and D on a 2×2 pixel block basis. Thereafter, in the same manner, the lines V3 and V4 are selected, and signal reading is performed.

The addition and thinning-out reading will now be described by referring to FIGS. 9 and 11. In this embodiment, an even field is explained; however, for an odd field, addition and thinning-out reading can be performed in the same manner.

As is shown in FIG. 11, at time t0, the reading circuit is reset by setting the control signals φTG1, φTG2, φTB1, φTB2, φTR1 and φTR2 to level H.

At time t1, the control signal φTR1 is raised to level H, the pixel signals R12, R14, ..., which are R signals of the line V1, are transferred to the lower memories MR21, MR41, ..., and no G signal is transferred to the memory.

At time t2, the control signals φTG2 and φTB1 are set to level H, and the pixel signals G22, G24, ..., which are G signals of the line V2, are transferred to the upper memories MG2, MG4, ..., while B signals B21, B23, ... are transferred to the lower memories MB11 and MB31.

At time t3, the control signals φTG1 and φTR2 are set to level H, and the pixel signals G31, G33, ..., which are G signals of the line V3, are transferred to the upper memories MG1, MG3, ..., while R signals R32, R34, ... are transferred to the lower memories MR22 and MR42.

At time t4, the control signal φTB2 is set to level H, and the pixel signals B41, B43, ..., which are B signals of the line V4, are transferred to the lower memories MB12 and MB32, and no G signal is transferred to the memory.

At time t5, upon the receipt of the addition pulse φadd, the addition of the G signals between the adjacent upper memories, that is, the addition of G31+G22, G33+G24, ... is performed. In the lower memory, the vertical signals are added together upon the receipt of the addition pulse φadd. That is, the addition of B21+B41, B23+B43, ... and the addition of R12+R32, R14+R34, ... are performed. Further, the signal (B21+B41) and the signal (B23+B43), and the signal (R12+R32) and the signal (R14+R43), are added together on the horizontal output lines, so that the signal (B21+B41+B23+B43) and the signal (R12+R32+R14+R34) are obtained.

In the timing chart in FIG. 11, upon the receipt of the horizontal shift pulse φH1n, a signal is output to the output channel A, and since the horizontal shift pulse φH2n is maintained low, no signal is output to the output channel B. The pulses φH1n' and φH2n' are transferred in the same phase to the lower memories, and the signals obtained by additions in the vertical and horizontal direction (the signals obtained by adding between the lower memories and on the horizontal output lines) is output to the output channels C and D.

Figures 12, 13:
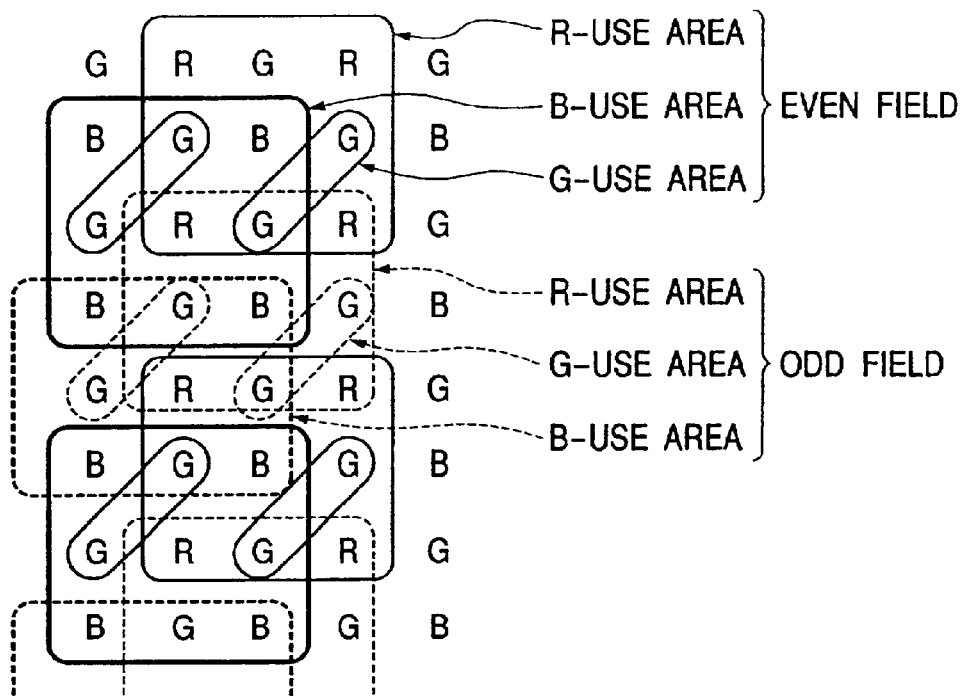
FIG. 12 is a diagram showing a pixel-use area for each color when a signal is obtained by adding signals for R, G and B pixels in the interlaced driving process.
FIG. 13 is a diagram showing a pixel use form when eight pixel lines are employed.

FIG. 12 is a diagram showing a pixel use area for each color when the addition signal of R, G and B pixels is obtained during interlace driving. The R pixels and B pixels are partially used in common in the even field and the odd field, while the G pixel is not. Since the signals from the G pixels adjacent in an oblique direction are obtained by adding together, the horizontal resolution and the vertical resolution are improved.

In the above described embodiment, in the addition and the thinning-out reading process, four lines are used for the generation of the color signal. The present invention is not limited to this, however, and eight lines, for example, can be used to generate a color signal. FIG. 13 is a diagram showing a pixel use form when eight pixel lines are used. In this example, more lines than eight lines are used in the form in FIG. 12 are used to add pixel signals. In FIG. 13, nine R pixels which are denoted by a circle along lines V3, V5 and V7, are added; six G pixels which are denoted by a square along lines V4 and V6, are added; and nine B pixels which are denoted by a triangle along lines V2, V4 and V6, are added. Of the eight lines, the B and R pixels are selected from five lines, while G pixels are selected from three lines.

Further, in the above embodiment, the G, B and R color filters have been employed. Even when other color filters are used, the interval between addition lines of the pixels for which color filters are arranged for a luminance signal to which a high resolution is required, is required only to be smaller than the interval between addition lines of pixels for which the other color filters are arranged.

According to this embodiment, since the independent reading of all the pixels and the adding and thinning-out reading of the pixel can be selected, recording and display can be performed by switching between a high resolution and a low resolution image.

Of the pixel signals for a plurality of lines, the signals for the first color (G signals) are added for the adjoining lines, and the other color signals are thinned out. Thus, a high resolution can be obtained for the first color signal, and since the second and third color signals (R and B signals) are obtained by adding signals vertically and horizontally, vertical and horizontal moire can be drastically reduced. Furthermore, the S/N ratio is increased by the addition of signals, and the drive frequency in the process for reading small numbers of pixels can be as low as that for an image pickup device for the NTSC system. Thus, the consumption of power can be reduced.

A third embodiment according to the present invention will now be described.

Figure 14A:
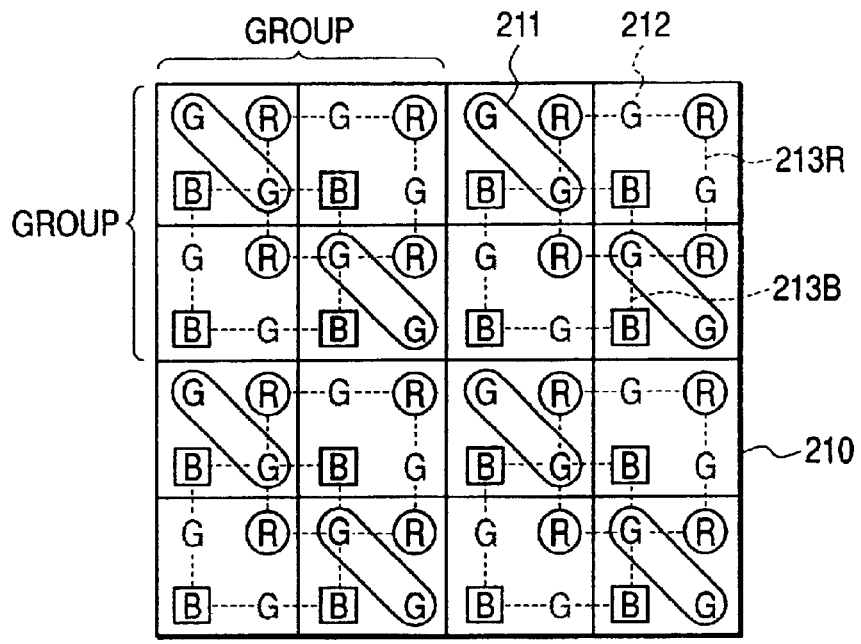
FIGS. 14A and 14B are conceptual diagrams showing an addition method according to a third embodiment of the present invention.
Figure 14B:
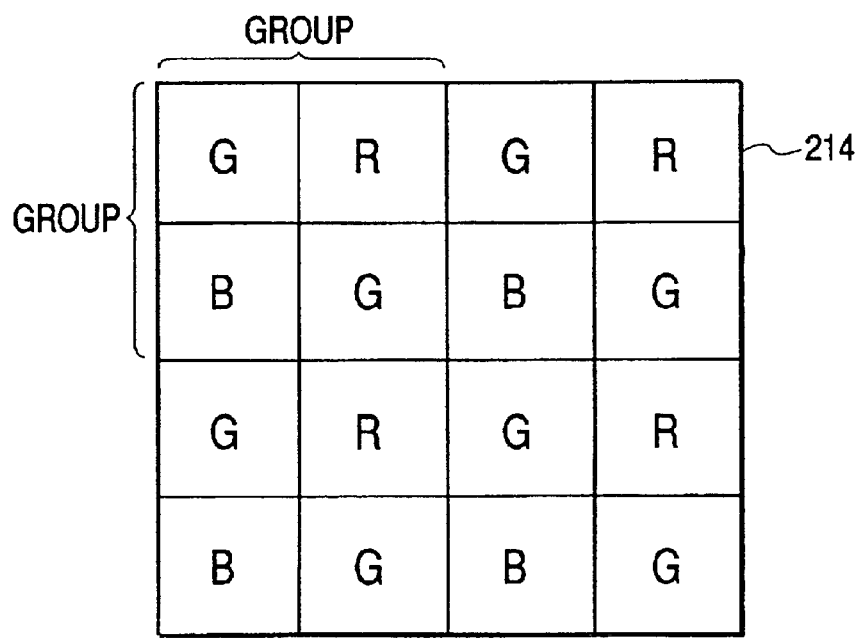

FIGS. 14A and 14B are conceptual diagrams for an addition method according to this embodiment. In FIG. 14A, a general bayer arrangement 100 is the filter arrangement in which G is positioned, in a checkerboard, between R and B. The addition method of this embodiment will be explained by referring to FIG. 14A. In this example, a 2×2 pixel block, wherein G is positioned, in a checkerboard, between R and B, is regarded as one element that has a basic color structure, and four adjacent elements constitute one group. As for G, two pixcels adjacent to each other in an oblique direction in the element are added together. A block 211 denotes the G pixels to be added together. As for R and B, basically, only R and B pixels in the element are selected, and in this example, four pixels of the same color in the four adjacent elements (four pixels of the same color in one group) are added together. As a result, the addition is performed both horizontally and vertically. Four R pixels to be added together (denoted by a circle) are connected by a broken line 213R, and four B pixels to be added together (denoted by a square) are connected by a broken line 213B. As is shown in FIG. 14A, the range (211) for the G pixels to be added together, the range (213R) for the R pixels to be added together, and the range (213B) for the B pixels to be added together spatially overlap one another. Further, pixels 212 are ones that are not to be added in the addition mode, and according to this addition method, the pixels that are not selected are limited to the G pixels indicated by broken lines. As a result of this addition, as is shown in FIG. 14B, as well as in FIG. 14A, a bayer arrangement 214 is obtained where G pixels are arranged in a checkerboard between R and B pixels. The pixel arrangement after the addition is the same as that before the addition, so that the mode having a substantial number of pixels that is reduced to ¼ the total can be used as a moving image mode.

Figure 15A:
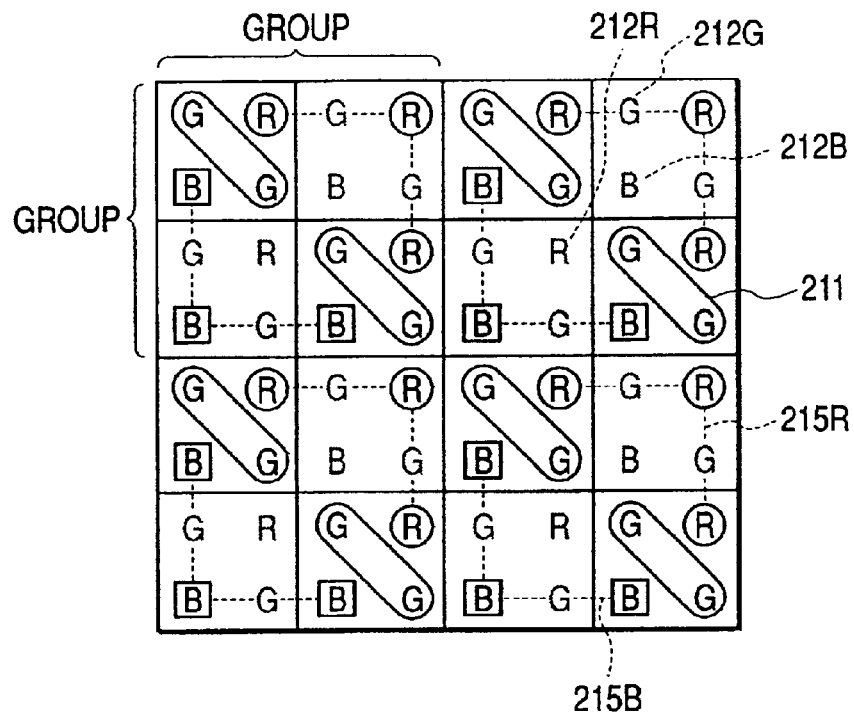
FIGS. 15A and 15B are conceptual diagrams showing another addition method.
Figure 15B:
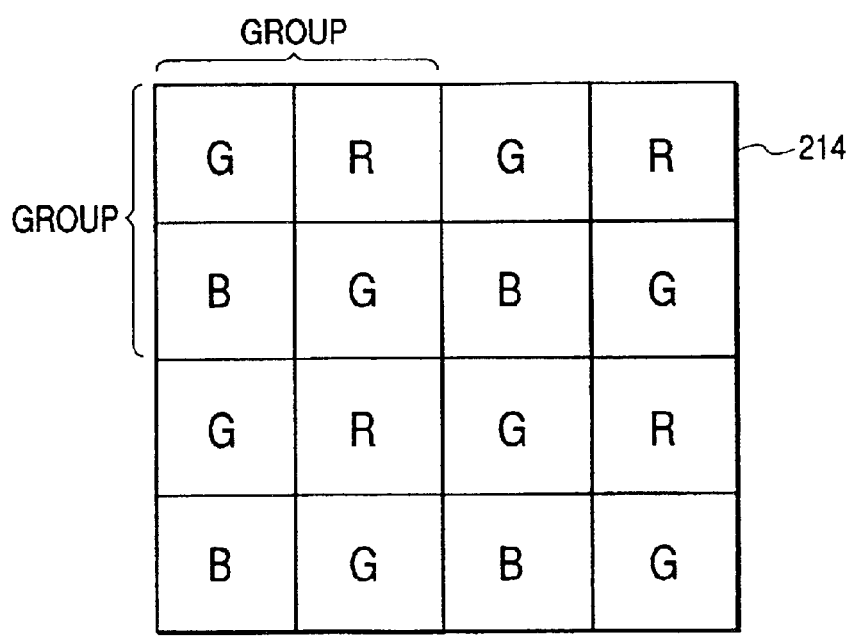

FIGS. 15A and 15B are conceptual diagrams showing another addition method according to the embodiment. As for G, two pixels adjacent to each other in an oblique direction in an the element are added, as in the example in FIGS. 14A and 14B. And as for R and B, three pixels in the elements of one group are added together horizontally and vertically. In this example, not only G pixels indicated by the broken lines in FIGS. 14A and 14B but also some R and B pixels are not read. In FIGS. 15A and 15B, the G, R and B pixels 212G, 212R and 212B, indicated by broken lines, are the ones that are not read. According to this addition method, a bayer arrangement 214 where G is positioned, in a checkerboard, between R and B is also obtained as is shown in FIG. 15B as well as in FIG. 14B. As is described above, besides the addition of two G pixels and of four R and B pixels, the addition of two G pixels and of an arbitrary number of R and B pixels may be performed.

Figure 16:
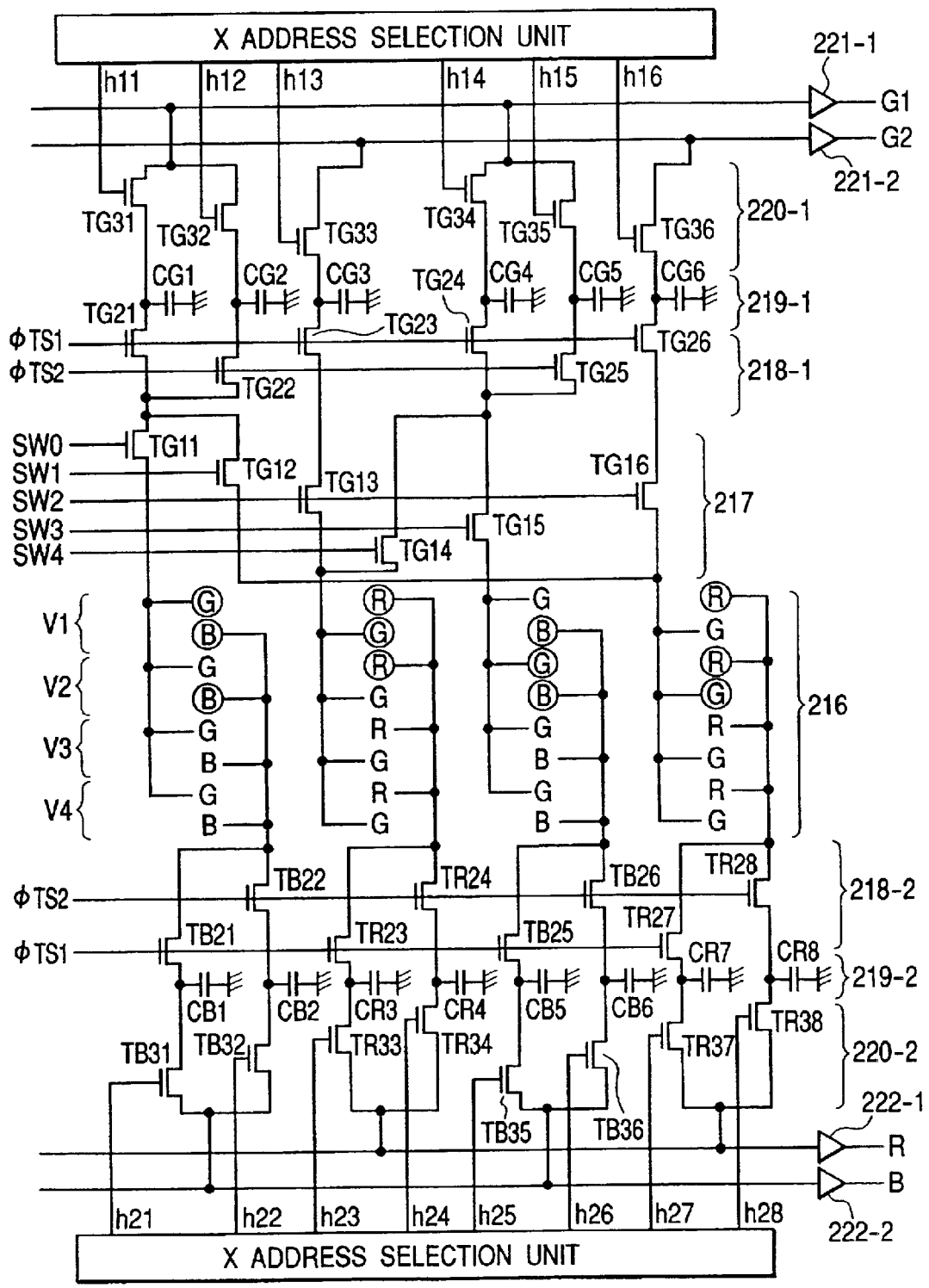
FIG. 16 is a schematic circuit diagram showing a reading circuit for implementing the addition method in FIG. 14.

FIG. 16 is a schematic circuit diagram showing a pixel portion and reading circuits for carrying out the addition method shown in FIGS. 14A and 14B. The circuit is formed on the same semiconductor substrate using a CMOS process, for example. In FIG. 16, R, G and B pixels in FIG. 14A are distributed in a bayer arrangement in a pixel portion 216. In FIG. 16, a circuit for reading a G pixel signal is located in the upper portion. Transistors TG11 to TG16 (217-1) and TG21 to TG26 (218-1) are used to read signals from G pixels in the pixel portion 216. Capacitors CG1 to CG6 (219-1) are used to accumulate signals that are read from the G pixels in the pixel portion 216. And transistors TG31 to TG36 (220-1) are used to output signals from the capacitors CG1 to CG6 to horizontal output lines. Output amplifiers 221-1 and 221-2 are also provided.

Furthermore, in FIG. 16, a circuit for reading R and B pixel signals is located in the lower portion. Transistors TB21, TB22, TB25, TB26, TR23, TR24, TR27 and TR28 (218-2) are used to read signals from B and R pixels in the pixel portion 216. Capacitors CB1, CB2, CB5, CB6, CR3, CR4, CR7 and CR8 (219-2) are used to accumulate signals that are read from the R and B pixels in the pixel portion 216. Transistors TB31, TB32, TB35, TB36, TR33, TR34, TR37 and TR38 (220-2) are used to output signals from the capacitors CB1 to CR8 to horizontal output lines. Output amplifiers 222-1 and 222-2 are also provided. Signals V1 to V4 are used to control two horizontal pixel lines in the pixel portion 216, and signals SW0 to SW4 are used to control the transistors 217. Signals φTS1 and φTS2 are used to control the transistors 218-1 and-218-2, and signals h11 to h28 are used to control the transistors 220-1 and 220-2.

Figure 17:
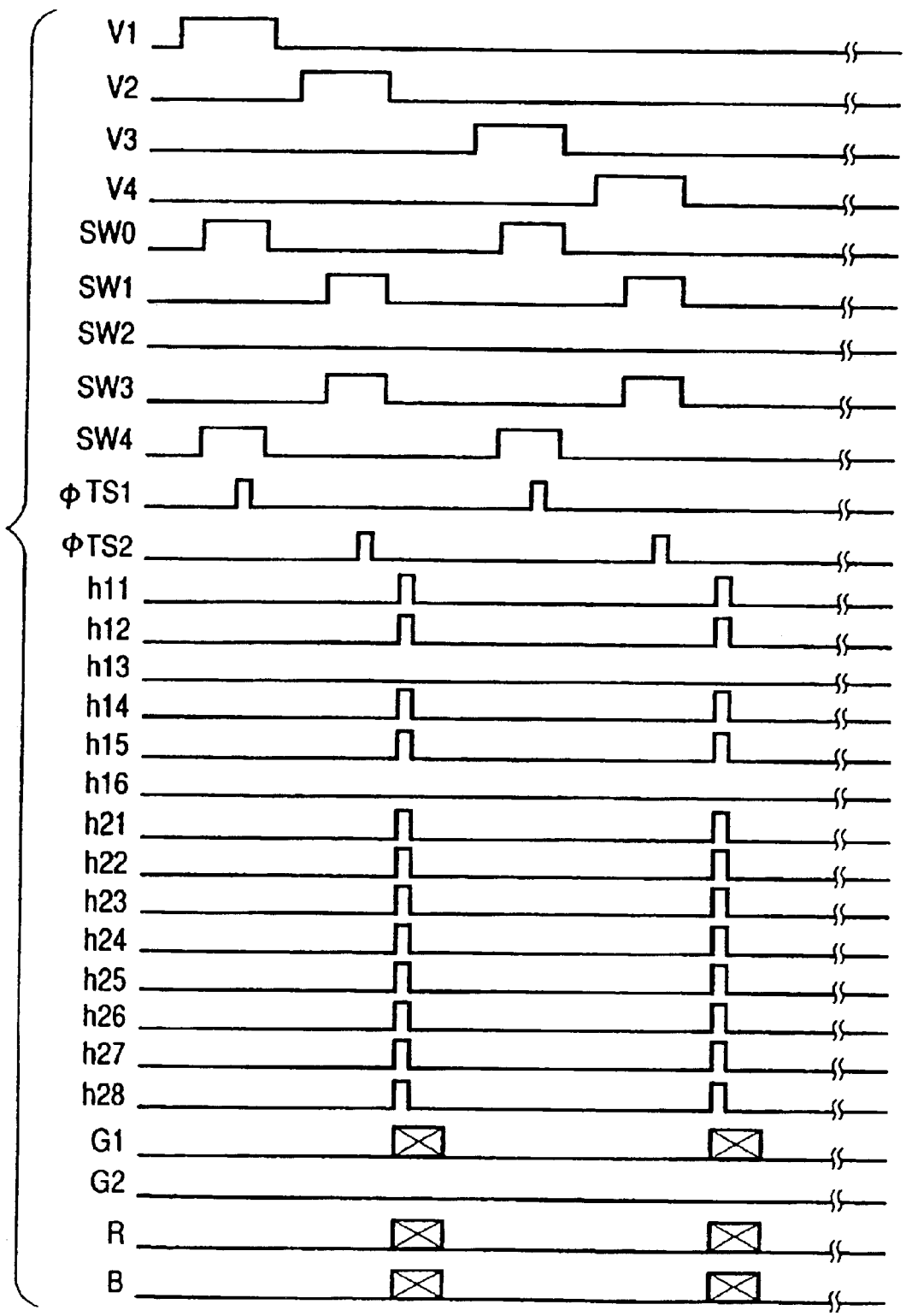
FIG. 17 is a timing chart in the addition mode based on the reading circuit.
Figure 18:
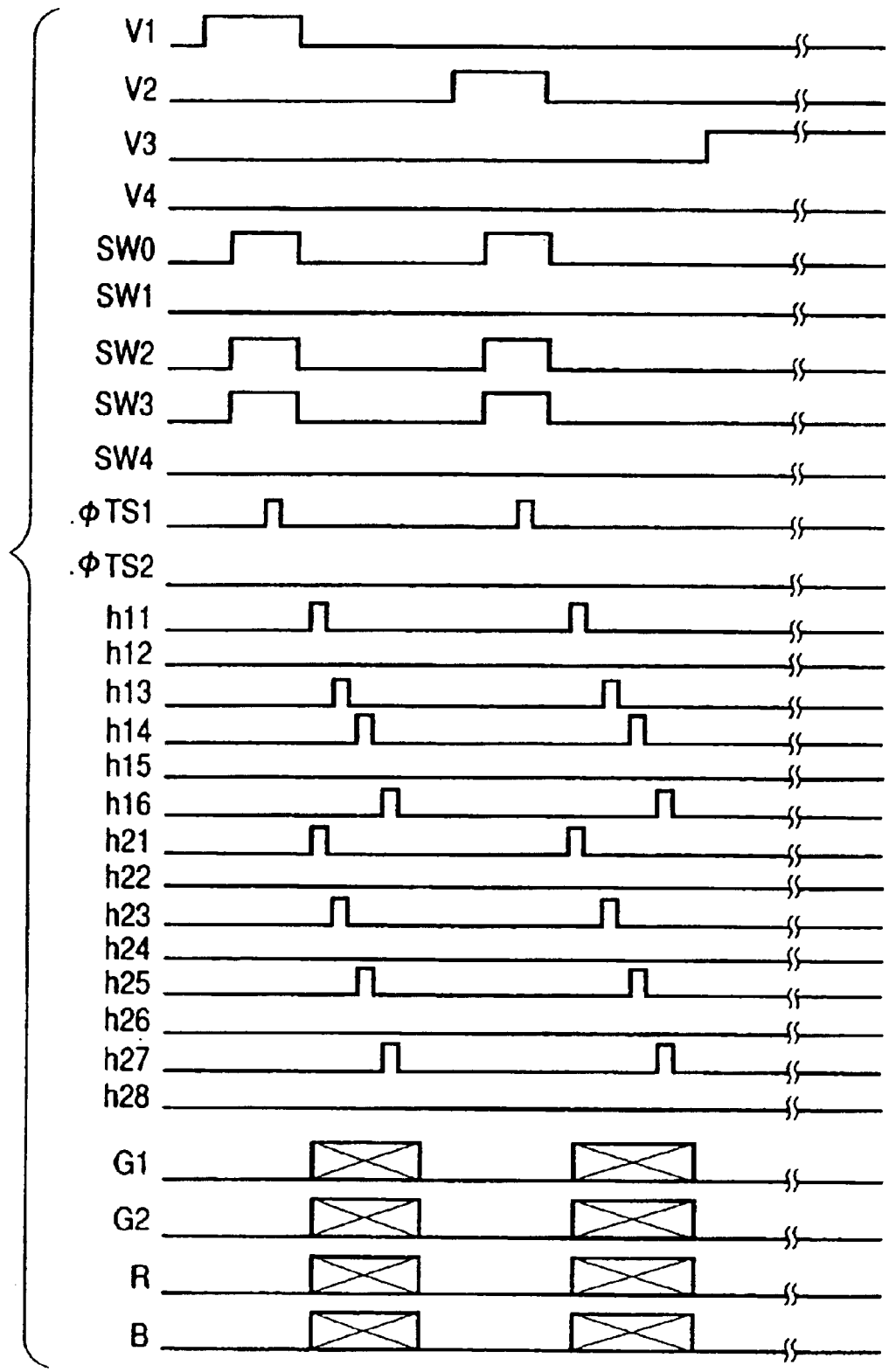
FIG. 18 is a timing chart in the all pixel reading mode based on the reading circuit.

The operation for the reading circuits will now be described. FIG. 17 is a timing chart for the addition mode that is based on the above circuit arrangement, and FIG. 18 is a timing chart for the all pixel reading mode.

At the timing for the reading in the addition mode in FIG. 17, first, the signal V1 is set to level H and the first 2H lines (two horizontal lines) are selected. In this process, the signals SW0 and SW4 are set to level H, and the transistors TG11 and TG14 are turned on. Then, when the signal φTS1 has been set to level H, the transistors TG21 and TG24 are turned on, and thus pixel information obtained from the G pixel at the juncture of the first row and the first column and the G pixel at the juncture of the second row and the second column, which is required for the addition of two horizontal lines, is accumulated as a charge in the capacitors CG1 and CG4. In addition, since the signal φTS1 has been set to level H, the transistors TB21, TR23, TB25 and TR27 are turned on, and pixel information obtained from the B pixel at juncture of the second row and the first column, the R pixel at the juncture of the first row and the second column, the B pixel at the juncture of the second row and the third column and the R pixel at the juncture of the first row and the fourth column is accumulated as a charge in the capacitors CB1, CR3, CB5 and CR7.

Next, the signal V2 is set to level H, and the next two horizontal lines are selected. During this process, the signals SW1 and SW3 are set to level H and the transistors TG12 and TG15 are turned on. At this time, since the signal φTS2 has been set to level H, the pixel information obtained from the G pixel at the juncture of the fourth row and the fourth column and the G pixel at the juncture if the third row and the third column, which is required for the addition of the two horizontal lines, is accumulated as a charge in the capacitors CG2 and CG5. In addition, when the signal φTS2 is set to level H, the transistors TB22, TR24, TB26 and TR28 are turned on, and pixel information obtained from the B pixel at the juncture of the fourth row and the first column, the R pixel at the juncture of the third row and the second column, the B pixel at the juncture of the fourth row and the third column, and the R pixel at the juncture of the third row and the fourth column is accumulated as a charge in the capacitors CB2, CR4, CB6 and CR8.

Finally, when the signals h11, h12, h14 and h15 are set to level H at the same time by the charges accumulated in the individual capacitors, addition is performed on the horizontal output lines, and a G addition signal obtained by adding together the signals of the capacitors CG1, CG2, CG4 and CG5 is transferred outside the circuit via the amplifier 221-1. Further, when the signals h23, h24, h27 and h28 are set to level H at the same time, an R addition signal obtained by adding together the signals of the capacitors CR3, CR4, CR7 and CR8 is transferred outside the circuit via the amplifier 221-1. And when the signals h21, h22, h25 and h26 are set to level H at the same time, a B addition signal obtained by adding together the signals of the capacitors CB1, CB2, CB5 and CB6 is transferred outside the circuit via the amplifier 221-2. With this cycle sequence being regarded as one cycle, the pixel signals for the horizontal four lines are added together sequentially until the signals are read at the last line in the pixel portion 216.

An explanation will now be given, by referring to the timing chart in FIG. 18, for the reading method used in the all pixel reading mode. First, the signal V1 is set to level H, and the first two horizontal lines are selected. For this process, the signals SW0, SW2 and SW3 are set to level H, and the corresponding transistors TG11, TG13, TG15 and TG16 are turned on. Then, when the signal φTS1 is set to level H, the transistors TG21, TG23, TG24 and TG26 are turned on. And thus, pixel information obtained from the G pixel at the juncture of the first row and the first column, the G pixel at the juncture of the second row and the second column, the G pixel at the juncture of the first row and the third column, and the G pixel at the juncture of the second row and the fourth column is accumulated as a charge in the capacitors CG1, CG3, CG4 and CG6. Further, when the signal φTS1 is set to level H, the transistors TB21, TR23, TB25 and TR27 are turned on. And thus, pixel information obtained from the B pixel at the juncture of the second row and the first column, the R pixel at the juncture of the first row and the second column, the B pixel at the juncture of the second row and the third column, and the R pixel at the juncture of the first row and the fourth column is accumulated as a charge in the capacitors CB1, CR3, CB5 and CR7.

The G signals accumulated in the capacitors are sequentially output in accordance with the signals h11, h13, h14 and h16 of the X address selector. Similarly, the B signals and R signals are sequentially output in accordance with the signals h21 and h25 and the signals h23 and h27, respectively.

Figure 19A:
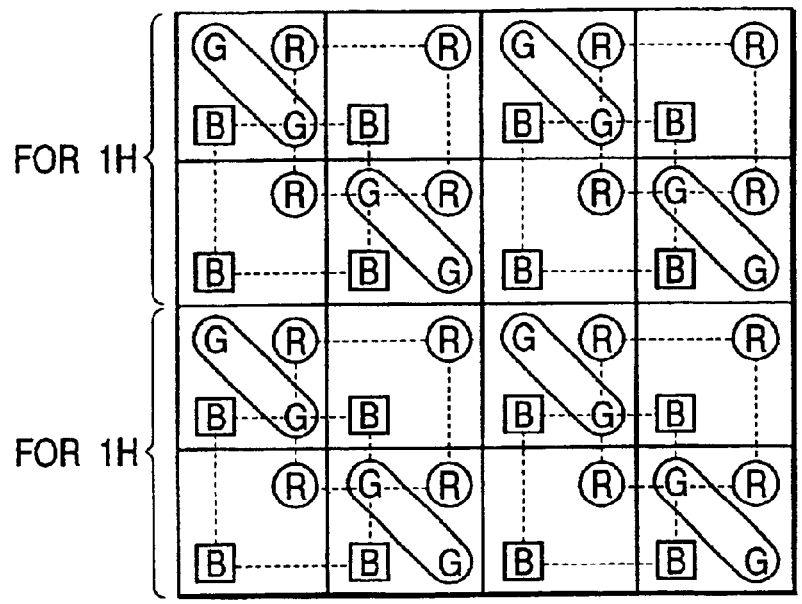
FIGS. 19A and 19B are conceptual diagrams showing a reading method in the addition mode, while taking the interlaced display into account.
Figure 19B:
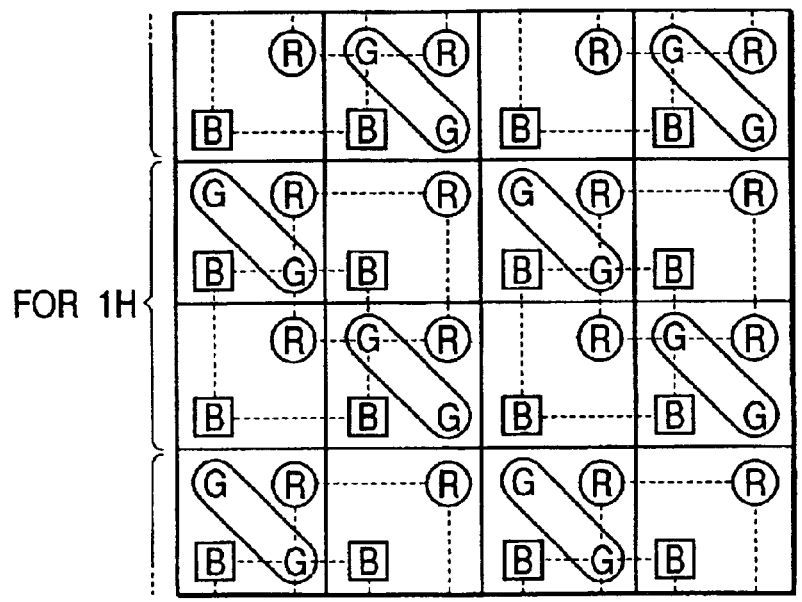

FIGS. 19A and 19B are conceptual diagrams showing the reading method in the addition mode, while taking the interlaced display into account. The addition method in an odd field is shown in FIG. 19A, while the addition method in an even field is shown in FIG. 19B. For either field, the same area in the pixel portion is indicated. And while in FIG. 14A the pixels that are not read are indicated by broken lines, those pixels are not shown in FIGS. 19A and 19B.

First, in the odd field in FIG. 19A, a display line 1H is prepared by using R, G and B for four horizontal lines, and is scanned. In the even field, a display line 1H is prepared using four horizontal lines that are shifted 2H lines relative to the odd field. The interlaced display can be coped with by alternately scanning these fields.

The arrangement of a pixel portion will now be described.

FIG. 2 is a diagram showing a pixel portion and a reading circuit. Since there is variation in the individual pixel amplifiers and the gates produce reset noise, signal memory CT1 and noise memory CT2, which are prepared for the output unit, remove this noise by a subtraction processing. The reading circuit shown in FIG. 3 can be provided by additionally providing the noise memory CT2 and a transistor connected to the noise memory CT2.

In FIG. 2, a block indicated by a broken line represents one pixel portion that includes a photodiode PD, a transfer transistor MTX, a reset transistor MRES, an amplification transistor MSEL which serves as a pixel amplifier, and a selection transistor MSEL for selecting a pixel. The pixel portion and the vertical output line are reset by turning on the reset transistors MRES and MRV, and noise signals are accumulated in the noise memory CT2 via the pixel amplifier, the selection transistor MSEL and a transistor MCT2. Further, when the transfer transistor MTX is turned on, a signal obtained by photoelectric conversion is transferred from the photodiode PD to the gate of the amplification transistor MSEL which serves as a pixel amplifier. Then, a signal including a noise signal component is accumulated in the signal memory CT1 via the pixel amplifier, the selection transistor MSEL and the transistor MCT1. The signal including the noise signal component which is stored in the signal memory CT1, and the noise signal which is stored in the noise memory CT2, are output to the horizontal output line. The subtraction process is preformed to obtain a signal from which the variation of the pixel amplifiers and the noise component, such as the reset noise produced by the gates, are removed. Control signals φEL, φTX, φRES, φRV, φTS and φTN are used to control the amplification transistor MSEL, the transfer transistor MTX, the reset transistors MRES and MRV, and the transistors MCT1 and MCT2, respectively. Transistor ML is a load imposed on the pixel amplifier MSF. Control signal φL may be driven together with the control signal φSEL, or may be constantly maintained at level H to be used as a resistor.

In the pixel portion, one common amplifier may be provided for a plurality of photoelectric converters. FIG. 6 is a diagram showing an example of a common amplifier pixel. As is shown in FIG. 6, photodiodes a11, a12, a21 and a22 are photoelectric converters of individual pixels; an amplification transistor MSF is used as a common amplifier; transfer transistors MTX1 to MTX4 transfer signal charges stored in the photodiodes to a floating diffusion area (FD area) which is the input portion of the common amplifier; a reset transistor MRES resets the FD area; and a selection transistor MSEL selects a common amplifier pixel, while the transistors MSF and MSEL constitute a source follower circuit. In the thus structured common amplifier pixel, signals are output from the four photodiodes via the common amplifier and four pixels constitute one unit cell. One pixel includes a photodiode and a transfer transistor, and also includes a part of a common circuit that is constituted with a common amplifier, a reset transistor and a selection transistor. A G filter is provided for the photodiodes a11 and a22, a B filter is provided for the photodiode a21, and an R filter is provided for the photodiode a12. With this arrangement, when the transfer transistors MTX1 and MTX4 are turned on, the signals from the photodiodes a11 and a22 can be added together at the gate of the common amplifier.

As is described above, according to this embodiment, the following effects can be obtained.

The G (green) information, which for the resolution of an image is dominant, can be obtained by adding the two pixels that are the closest pixels in an oblique direction, so that the image can be provided at a resolution that is not reduced too much. Since four pixels are added to obtain the R and B information, the horizontal and vertical moire can be reduced.

Since the order of the colors of the color filters corresponding to the signals that are read is unchanged, regardless of whether the addition is performed, a signal processor in a DSP can be used in common, and the objective of the present invention can be implemented with a simple circuit structure.

Since the conventional thinning-out reading is not performed and since signals are added in the pixel portion to create a moving image, the moire that appears as the result of thinning-out can be reduced, and a clear moving image can be provided.

A fourth embodiment according to the present invention will now be described.

Figure 20:
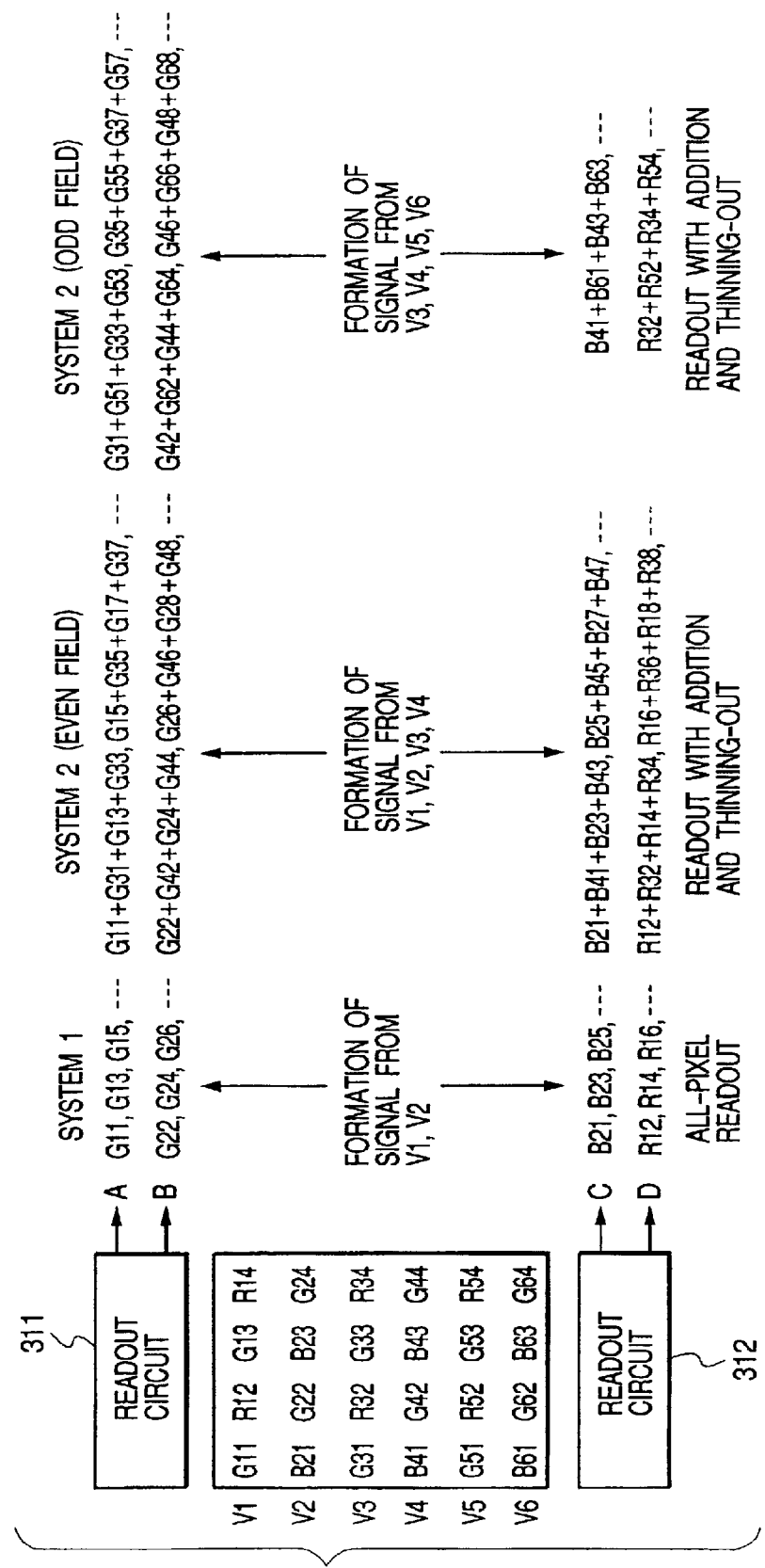
FIG. 20 is a schematic diagram for explaining a pixel signal reading method employed by a color image pickup apparatus according to a fourth embodiment of the present invention.

FIG. 20 is a schematic diagram for explaining a pixel signal reading method employed by a color image pickup apparatus according to the present invention. In FIG. 20, four channels (four outputs) are provided for an image pickup device, and color filters for individual pixels that are arranged in a matrix form in the image pickup device, are positioned in a checkerboard: G (green) filters are arranged in half of the checkerboard pattern, and R (red) filters and B (blue) filters are each arranged in the other half of the checkerboard pattern.

In high definition reading (system 1), all the pixels are read by the reading of individual pixel signals. That is, pixel signals G11, G13, G15, . . . are output by a reading circuit 311 via output channel A; pixel signals G22, G24, G26, . . . are output by the reading circuit 311 via output channel B; pixel signals B21, B23, B25, . . . are output by the reading circuit 312 via output channel C; and pixel signals R12, R14, R16, . . . are output by the reading circuit 312 via output channel D. A color signal is formed using two lines, e.g., line V1 and line V2.

In low-resolution reading (system 2), addition and thinning-out reading are performed. In system 2, a color signal is formed using four lines. A G (green) signal, an R (red) signal and a B (blue) signal are obtained by addition in the vertical direction and addition in the horizontal direction performed for the four lines. Further, for an image pickup apparatus for the performance of interlaced scanning, the selection of four lines is changed. Specifically, in system 2, in an even field, a color signal is generated using four lines, e.g., lines V1, V2, V3 and V4; pixel signals G11+G31+G13+G33, G15+G35+G17+G37, . . . are output by the reading circuit 311 via the output channel A; pixel signals G22+G42+G24+G44, G26+G46+G28+G48, . . . are output via the output channel B; pixel signals B21+B41+B23+B43, B25+B45+B27+B47, . . . are output by the reading circuit 312 via the output channel C; and pixel signals R12+R32+R14+R34, R16+R36+R18+R38, . . . are output by the reading circuit 312 via the output channel D. And in an odd field, a color signal is generated using four lines, e.g., lines V3, V4, V5 and V6; pixel signals G31+G51+G33+G53, G35+G55+G37+G57, . . . are output by the reading circuit 311 via the output channel A; pixel signals G42+G62+G44+G64, G46+G66+G48+G68, . . . are output via the output channel B; pixel signals B41+B61+B43+B63, . . . are output by the reading circuit 312 via the output channel C; and pixel signals R32+R52+R34+R54, . . . are output by the reading circuit 312 via the output channel D.

A pixel portion and a reading circuit will now be described.

FIG. 2 is a diagram showing a pixel portion and the reading circuit. Since there is variation in the individual pixel amplifiers and gates produce reset noise, provided for the output unit are a signal memory CT1 and a noise memory CT2 to remove noise by a subtraction processing.

In FIG. 2, a block indicated by a broken line represents one pixel portion that includes a photodiode PD, a transfer transistor MTX, a reset transistor MRES, an amplification transistor MSEL which serves as a pixel amplifier, and a selection transistor MSEL for selecting a pixel. The pixel portion and the vertical output line are reset by turning on the reset transistors MRES and MRV, and noise signals are accumulated in the noise memory CT2 via the pixel amplifier, the selection transistor MSEL and a transistor MCT2. Further, when the transfer transistor MTX is turned on, a signal obtained by photoelectric conversion is transferred by the photodiode PD to the gate of the amplification transistor MSEL which serves as a pixel amplifier. Then, a signal that includes a noise signal component is accumulated in the signal memory CT1 via the pixel amplifier, the selection transistor MSEL and the transistor MCT1. The signal that includes the noise signal component which is stored in the signal memory CT1, and the noise signal, which is stored in the noise memory CT2, are output to the horizontal output line, and the subtraction process is preformed to obtain a signal from which the variation of the pixel amplifiers and the noise component, such as the reset noise produced by the gates,. have been removed. Control signals φSEL, φTX, φRES, φRV, φTS and φTN are used to control the amplification transistor MSEL, the transfer transistor MTX, the reset transistors MRES and MRV, and the transistors MCT1 and MCT2, respectively. Transistor ML is a load imposed on the pixel amplifier MSF. Control signal φL may be driven together with the control signal φSEL, or may be constantly maintained at level H to be used as a resistor.

FIG. 6 is a diagram showing an example of a common amplifier pixel. As is shown in FIG. 6, photodiodes a11, a12, a21 and a22 are photoelectric converters of individual pixels; an amplification transfer transistor MSF is used as a common amplifier; transfer transistors MTX1 to MTX4 transfer signal charges stored in the photodiodes to the input portion of the common amplifier; a reset transistor MRES resets the input portion of the common amplifier; and a selection transistor MSEL selects a common amplifier pixel, while the transistors MSF and MSEL constitute a source follower circuit. In the thus structured common amplifier pixel, signals are output from the four photodiodes via the common amplifier, and four pixels constitute one unit cell. One pixel includes a photodiode and a transfer transistor, and also includes a part of a common circuit that is constituted with a common amplifier, a reset transistor and a selection transistor. A G filter is provided for the photodiodes a11 and a22, a B filter is provided for the photodiode a21 and an R filter is provided for the photodiode a12.

Figure 21:
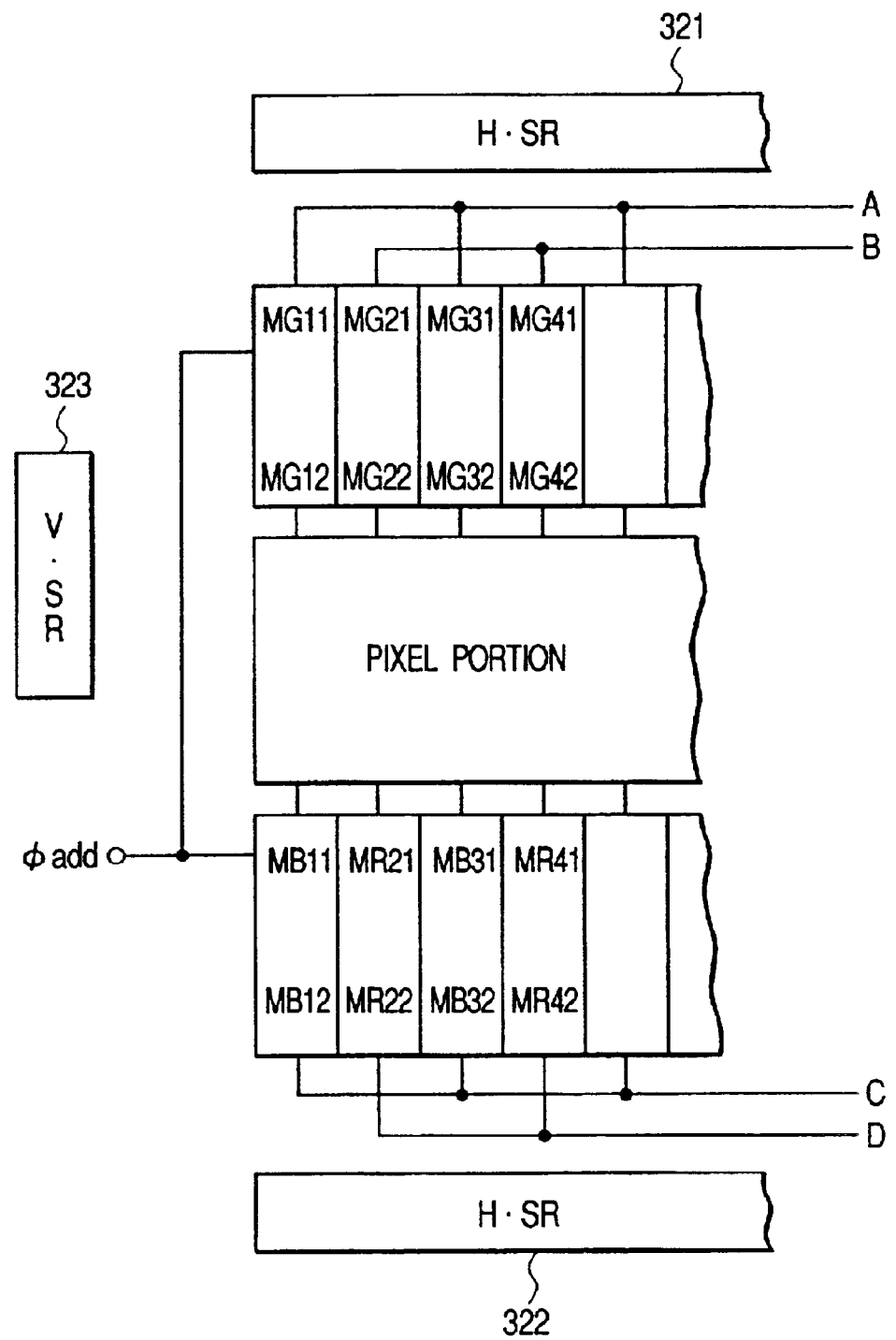
FIG. 21 is a block diagram showing the arrangement of the signal reading circuit of the image pickup apparatus.

FIG. 21 is a block diagram showing the arrangement of a pixel portion and a reading circuit of the image pickup apparatus according to this embodiment. To simplify the explanation, the noise removal means explained by referring to FIG. 2 is not shown. The pixel portion and the reading circuit are formed on the same semiconductor substrate using a CMOS process, for example.

Two signal lines, G memories MG11, MG12, MG31, MG32, . . . for two horizontal odd lines, and G memories G21, G22, MG41 and MG42, . . . for two horizontal even lines are provided above the pixel portion. And two signal lines, B memories MB11, MB12, MB31, MB32, . . . for two horizontal lines, and R memories MR21, MR22, MR41, MR42, . . . for two horizontal lines are provided below the pixel portion. A pixel signal is read from the pixel portion, and is transferred to the upper and lower memories. The upper memories are controlled by a horizontal scanning m circuit (H·SR) 321, and the lower memories are controlled by a horizontal scanning circuit (H·SR) 322. The reading of a signal from the pixel portion is controlled by a vertical scanning circuit (V·SR) 323.

The addition of signals is performed as follows. In the upper memories (G memories), the signals from four adjacent pixels are added together in the memory or on the horizontal signal line in accordance with addition pulse φadd. For example, signals transferred to the memories MG11, MG12, MG31 and MG32 are added together, and signals transferred to the memories MG21, MG22, MG41 and MG42 are added together.

In the lower memories (B and R memories), the signals for four pixels are added together in accordance with addition pulse φadd. For example, signals transferred to the memories MB11 and MB12 and a signal transferred to the memories MB31 and MB32 are added together, and a signal transferred to the memories MR21 and MR22 and a signal transferred to the memories MR41 and MR42 are added together.

Figure 22:
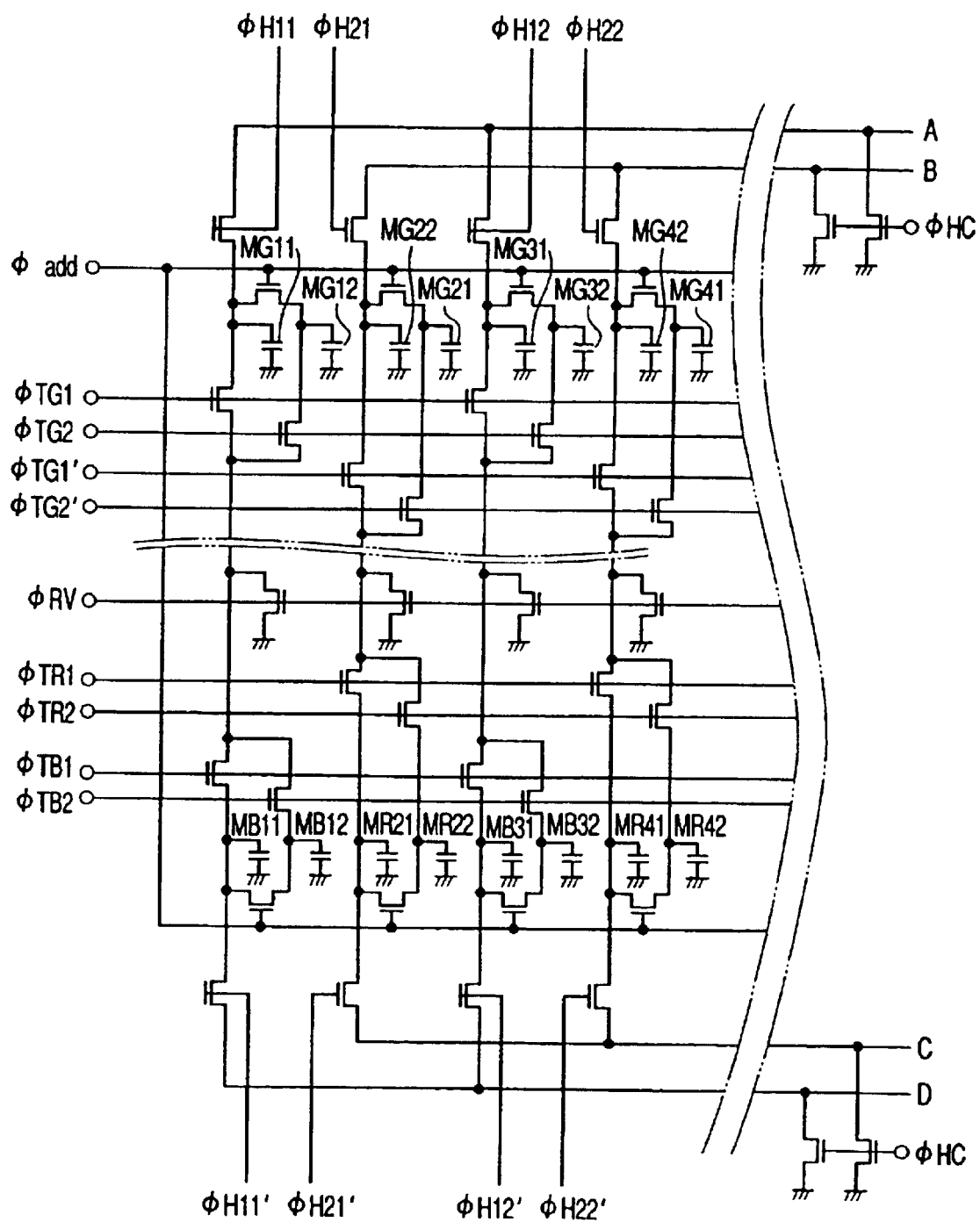
FIG. 22 is a detailed diagram showing the arrangement of the signal reading circuit.
Figure 23:
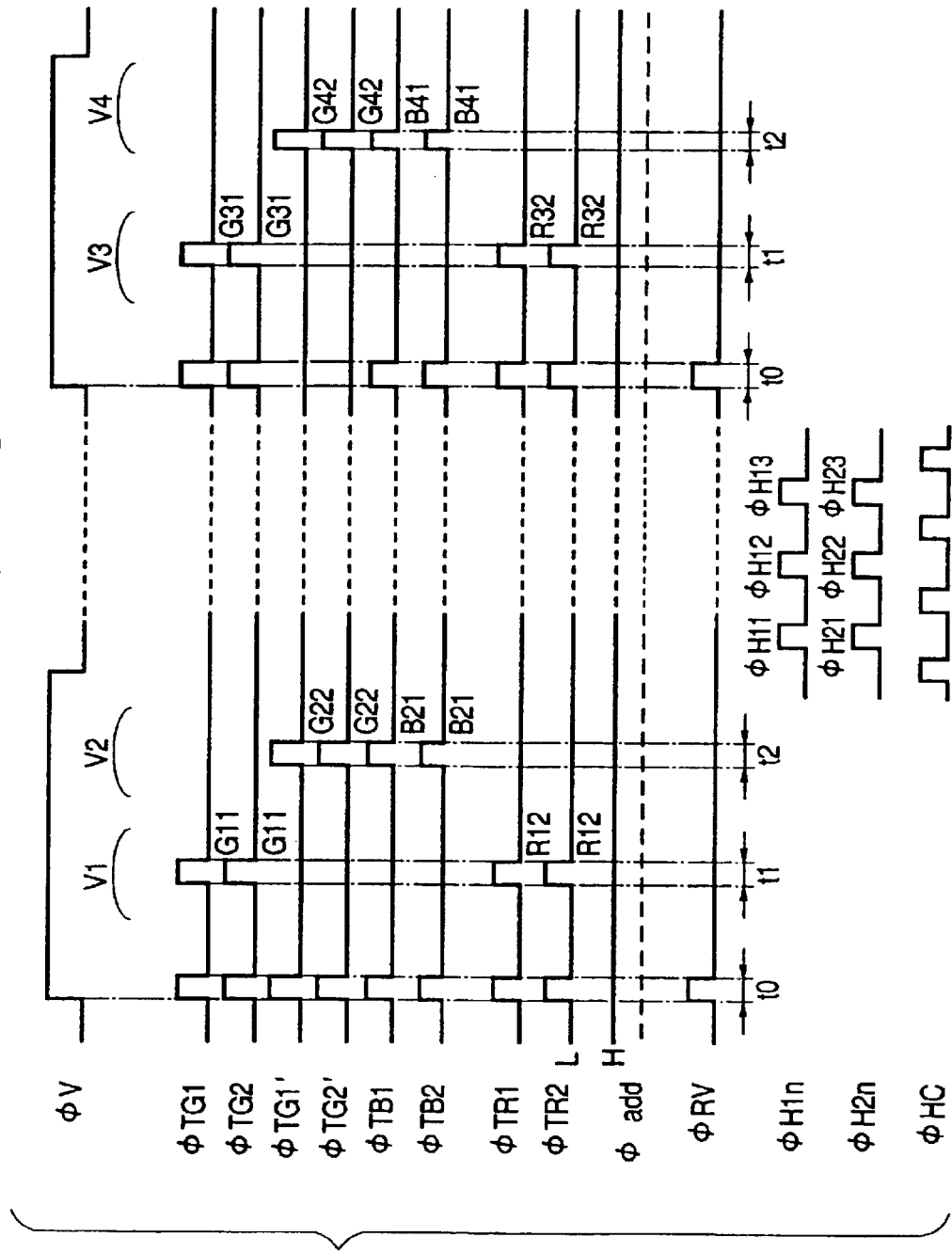
FIG. 23 is a timing chart showing timings for reading all pixel signals.
Figure 24:
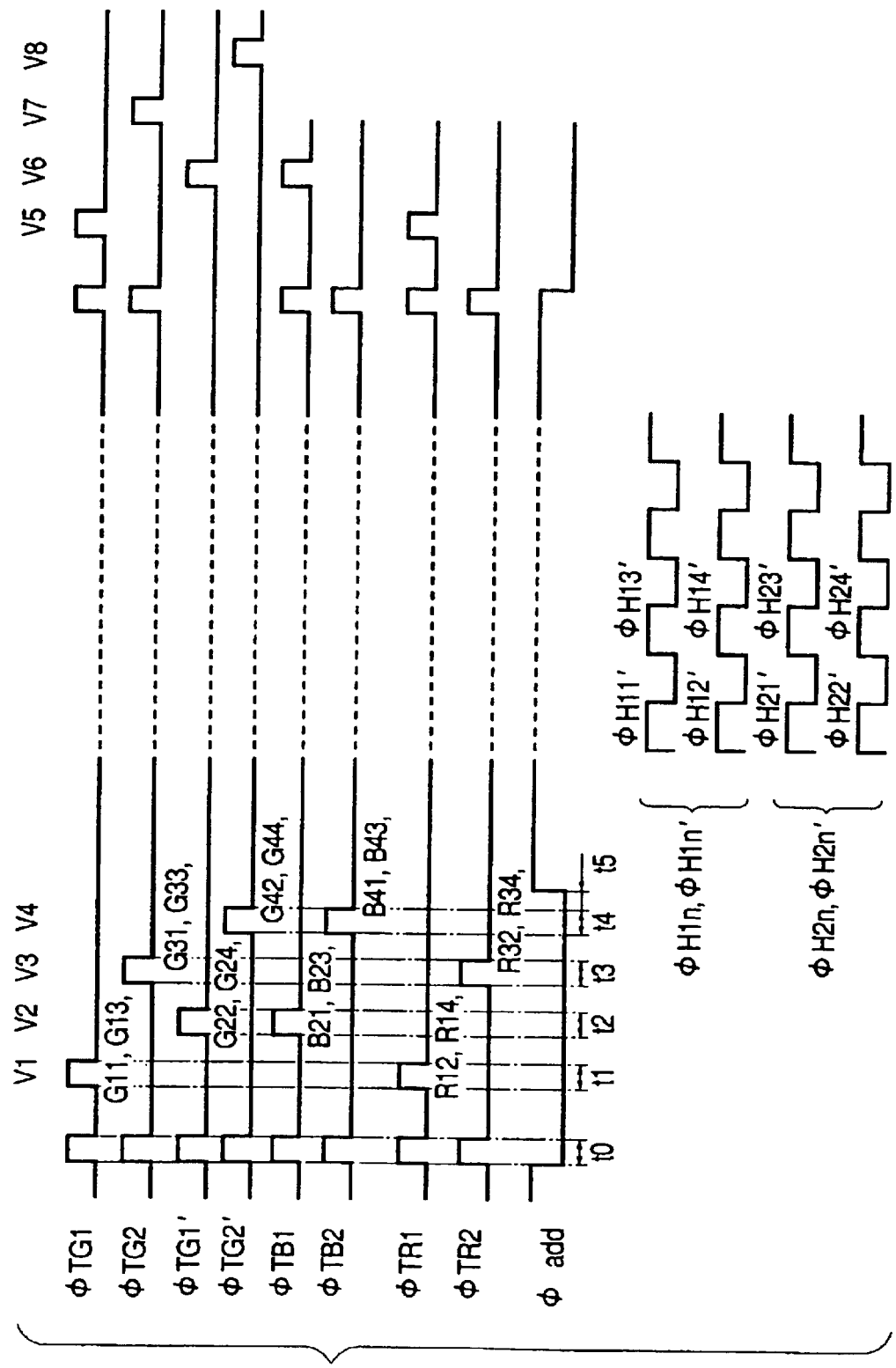
FIG. 24 is a timing chart showing timings for addition and intermittent reading.

FIG. 22 is a detailed circuit diagram showing the signal reading circuit, FIG. 23 is a timing chart for reading all the pixel signals, and FIG. 24 is a timing chart for addition and intermittent reading.

First, the process for reading all the pixel signals will be described by referring to FIGS. 22 and 23.

As is shown in FIG. 23, at time t0 the reading circuit is reset by setting the control signals φTG1, φTG2, φTG1', φTG2', φTB1, φTB2, φTR1, φTR2 and φRV to level H.

At time t1, the line V1 is selected, and when the control signals φTG1, φTG2, φTR1 and φTR2 are set to level H, the pixel signal G11 is transferred to the upper memories MG11 and MG12, and the pixel signal R12 is transferred to the lower memories MR21 and MR22. The two upper memories MG11 and MG12, and the lower memories MR21 and MR22 are employed in common to increase the gain for reading from the memory to the horizontal output line.

At time t2, similarly, the line V2 is selected, and when the control signals φTG1", φTG2', φTB1 and φTB2 are set to level H, the pixel signal G22 is transferred to the upper memories MG21 and MG22, and the pixel signal B21 is transferred to the lower memories MB11 and MB12. The upper two memories MB21 and MG22 and the lower memories MB11 and MB12 are employed in common to increase the gain for reading from the memory to the horizontal output line.

Following this, the control signals φH11 and φH21, φH21 and φH22, φH13 and φH23, . . . are sequentially output from the horizontal scanning circuit 321, and signals are transferred from individual upper memories to the two horizontal output lines, and are output via the output channels A and B. During a period in which the control signals φH11 and φH21, φH21 and φH22, φH13 and φH23, . . . are output, the signal φhc is changed to level H, and the horizontal output line is reset. Although not shown, control signals φH11' and φH12', φH12' and φH22', and φH13' and φH23', which have the same phases as have φH11 to φH13 and φH21 to φH23, are also sequentially output from the horizontal scanning circuit 322. The signals are transferred from the individual lower memories to the two horizontal output lines, and are output via the output channels C and D. As a result, a signal is output via the output channels A, B, C and D on 2×2 pixels basis. Thereafter, in the same manner, the lines V3 and V4 are selected, and signal reading is performed.

The addition and thinning-out reading will now be described by referring to FIGS. 22 and 24. In this embodiment, while system 2 (an even field) is explained, the same processing can be performed for addition and thinning-out reading for an odd field in the interlace scanning.

As is shown in FIG. 24, at time t0, the reading circuit is reset by setting the control signals φTG1, φTG2, φTG1', φTG2', φTB1, φTB2, φTR1 and φTR2 to level H.

At time t1, the control signals φTR1 and φTG1 are raised to level H, the pixel signals R12, R14, . . . , which are R signals for the line V1, are transferred to the lower memories MR21, MR41, . . . , and the G pixel signals G11, G13, . . . are transferred to the upper memories MG11, MG31, . . . .

At time t2, the control signals φTG1' and φTB1 are set to level H, and the pixel signals G22, G24, . . . , which are G signals for the line V2, are transferred to the upper memories MG22, MG42, . . . , and B signals B21, B23, . . . are transferred to the lower memories MB11 and MB31.

At time t3, the control signals φTG2 and φTR2 are set to level H, and the pixel signals G31, G33, . . . , which are G signals for the line V3, are transferred to the upper memories MG12, MG32, . . . , while R signals R32, R34, . . . are transferred to the lower memories MR22 and MR42.

At time t4, the control signals φTB2 and φTG2' are set to level H, and the pixel signals B41, B43, . . . , which are B signals for the line V4, are transferred to the lower memories MB12 and MB32, while the G pixel signals G42, G44, . . . are transferred to the upper memories MG21 and MG41, . . . .

At time t5, upon the receipt of the addition pulse φadd, the G signals in the vertical direction are added in the memories. That is, the addition G11+G31, G22+G42, . . . is performed. In the lower memory, the signals in the vertical direction are also added upon the receipt of the addition pulse φadd. That is, the addition B21+B41, B23+B43, . . . and the addition R12+R32, R14+R34, . . . are performed. Further, the signal (G11+G31) and the signal (G13+G33), the signal (G22+G42) and the signal (G24+G44), the signal (B21+B41) and the signal (B23+B43), and the signal (R12+R32) and the signal (R14+R43) are added together on the horizontal output lines. As a result, the signal (G11+G31+G13+G33), the signal (G22+G42+G24+G44), the signal (B21+B41+B23+B43) and the signal (R12+R32+R14+R34) are obtained.

In the timing chart in FIG. 24, the horizontal shift pulses φH1n, φH2n, φH1n' and H2n' are supplied as the upper and lower memory signals in the same phase, and signals obtained by additions in the vertical and horizontal directions (the signals obtained by performing addition between the lower memories and on the horizontal output lines) are output to the output channels A, B, C and D.

Figure 25:
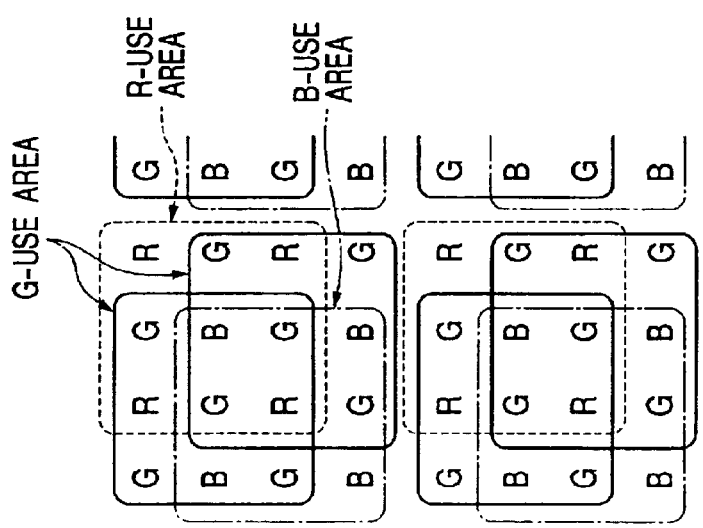
FIG. 25 is a diagram showing a pixel-use area for each color when a signal is obtained by adding together signals for R, G and B pixels in the interlaced driving process.

FIG. 25 is a diagram showing the pixel use area for each color that is used to obtain addition signals for R, G and B pixels.

The pixel use area in FIG. 25 is an area that each pixel uses for the signal reading method explained by referring to FIGS. 20, 22 and 24. In FIG. 25 it is apparent that the color signals from the R, G and B pixels are spatially overlapped and added together.

Figure 27:
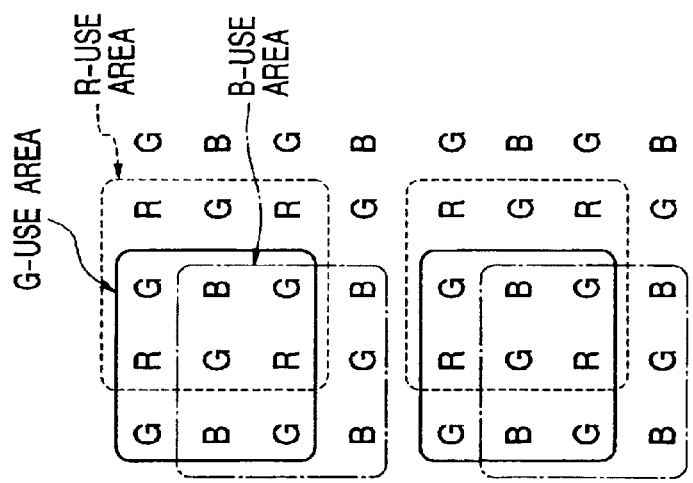
FIG. 27 is a diagram showing a pixel use area for obtaining the three systems of color signals.
Figure 26:
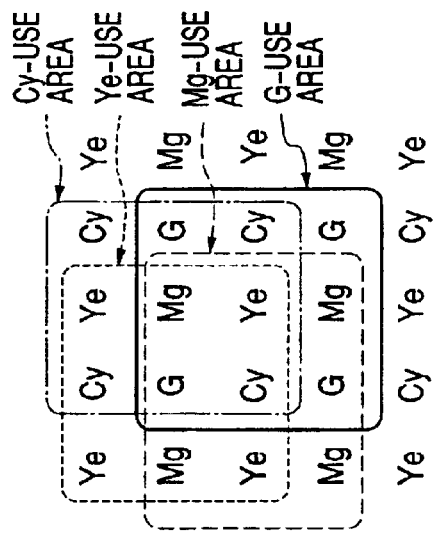
FIG. 26 is a diagram showing a pixel use area for a complementary color filter.

FIG. 26 is a diagram showing the pixel-use area for each color used to obtain the addition signals using filters for complementary colors Ye (yellow), Cy (cyan), Mg (magenta) and G (green). FIG. 27 is a diagram showing the pixel-use area used for each color to obtain the addition signals to obtain R, G and B colors from 4×4 pixel blocks. As is apparent from FIGS. 26 and 27, the pixel-use areas are overlapped.

For the pixel-use areas shown in FIGS. 25 and 26, four systems (R, G, G and B, or Ye, Cy, Mg and G) of addition are repeated, while in the pixel-use area shown in FIG. 27, three systems (R, G and B) of addition are repeated.

For a large number of pixels, less moire is caused by a spatial shift in the gravity center of each color signal after addition, so that the R, G and B signals may be employed as simultaneous signals.

According to this embodiment, since the independent reading of all the pixels and the adding and thinning-out reading of the resultant pixel signal can be selected, recording and display can be performed by switching between a high resolution image and a low resolution image.

Since the pixel signals for a plurality of lines are added in vertical and horizontal directions and the individual color signals are spatially overlapped and added together, vertical and horizontal moire can be drastically reduced. Furthermore, the S/N ratio is increased by the addition of signals, and the drive frequency in the process for reading a small number of pixels can be as low as it is for an image pickup device for the NTSC system. Thus, the consumption of power can be reduced.

A fifth embodiment of the present invention will now be described.

Figures 28A, 28B, 28C, 28D, 28E:
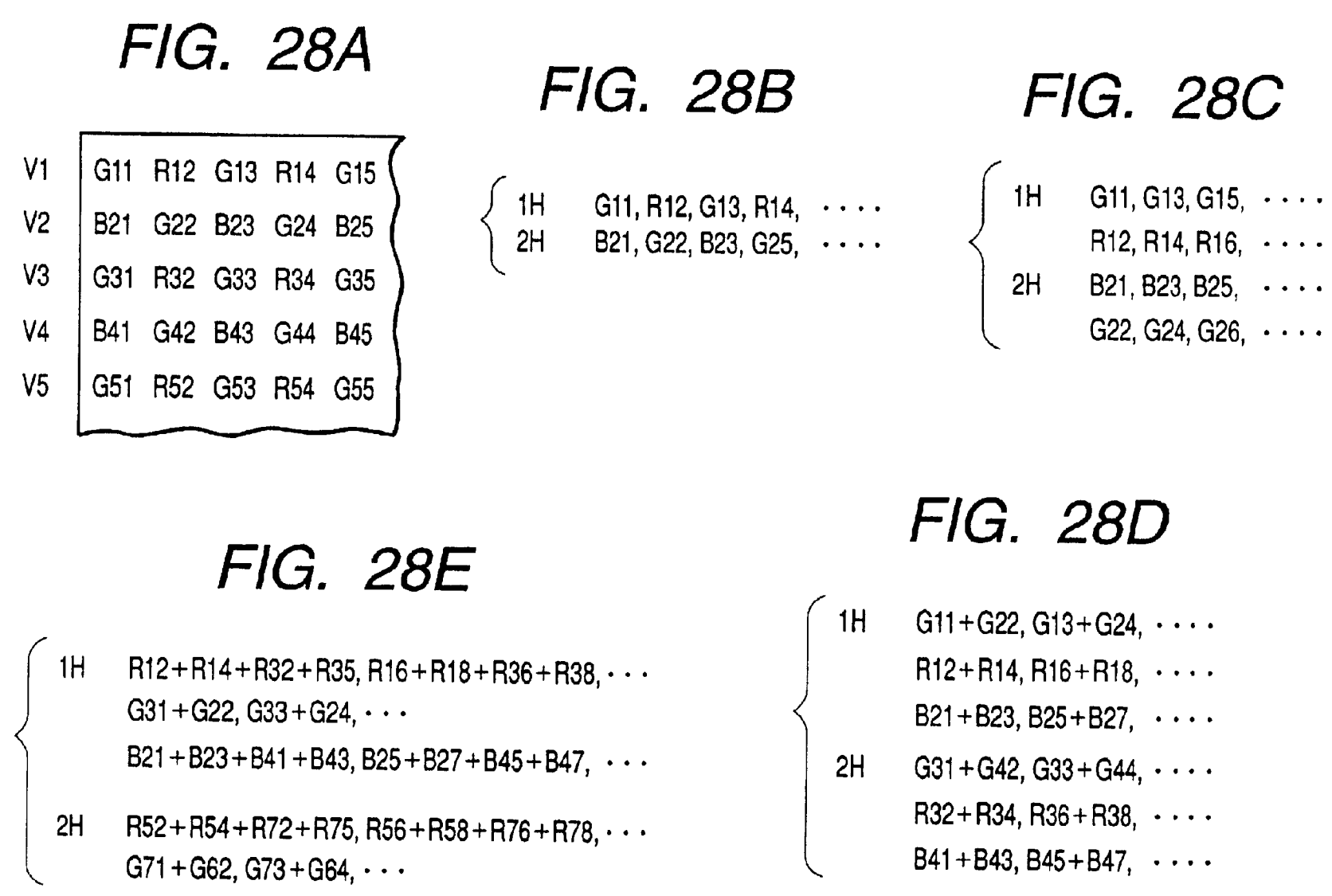

FIGS. 28A to 28E are diagrams for explaining a signal output method employed by a color image pickup apparatus according to this embodiment. In FIG. 28A, output signals are shown for a general bayer arrangement wherein G signals are positioned in a checkerboard between R and B signals. In FIG. 28B an example is shown wherein signals for a pixel row are dot-sequentially read on a line basis (line sequential scanning); in FIG. 28C an example is shown wherein signals for a pixel row are line-sequentially read on a same color basis (line sequential scanning); in FIG. 28D an example is shown wherein color signals are line-sequentially read, while G signals in two pixel lines are added in an oblique direction and R and B signals are added in a horizontal direction; and in FIG. 28E an example is shown wherein R and B signals are added together in horizontal and vertical directions, and the G signal located between the R and B signals is selected and added together in an oblique direction.

Figure 29:
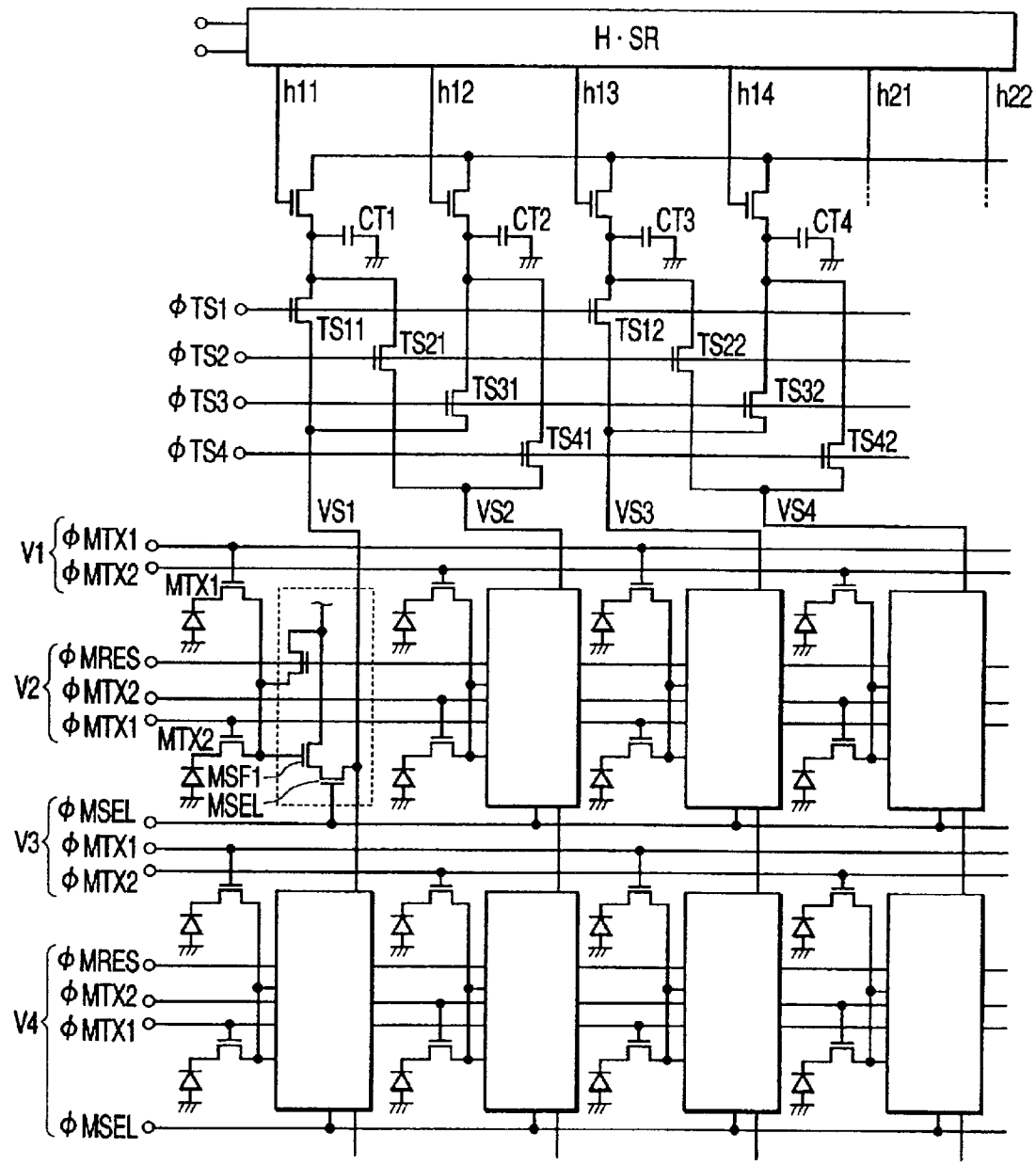
FIG. 29 is a circuit diagram showing the color image pickup apparatus according to the embodiment.

FIG. 29 is a circuit diagram showing the arrangement of the color image pickup apparatus of this embodiment which comprises a pixel portion and a reading circuit, and which employs the signal output methods shown in FIGS. 28A to 28E. This circuit is formed on the same semiconductor substrate using a CMOS process, for example. In the pixel portion, two vertical pixels are connected to a common amplifier.

Memories (capacitors) CT1, CT2, . . . , which serve as signal holding means, are connected to vertical output lines VS1, VS2, . . . via transfer transistors TS11, TS21, . . . . In this embodiment, only one memory system is provided that corresponds to each vertical signal line. Specifically, in FIGS. 28D and 28E, addition is performed for each color, and if the R, G and B color signals are to be added at the same time, three systems of memories are required. However, in this embodiment, signals received from two vertical output lines can be transferred to one memory by controlling the transfer transistors TS11, TS21, (or a signal from one vertical output line can be transferred to one or both of two memories). Therefore, only one memory system is required, and only a small number of memories are required to perform addition. While performing the addition of multiple colors at the same time requires many memories, to perform addition for individual colors only a small number of memories is required. In this embodiment, one memory is provided for each vertical output line; however, since when a noise signal is to be read in is order to remove a noise component from a pixel signal a noise memory must be separately provided, two memories, a signal memory and a noise memory, are provided for each vertical output line.

Thus, since the area of the memory can be very small, and since only a small number of the memories is required, it is easy that the signal memory and the noise memory are designed similarly. Therefore, the precision with which noise is removed from a signal is increased, and the S/N ratio is improved. And as is described above, two vertical output lines are connected via a switch (transistor) to one system of memory, with this connection, signals for a plurality of lines can be transferred to the memory.

Figure 34:
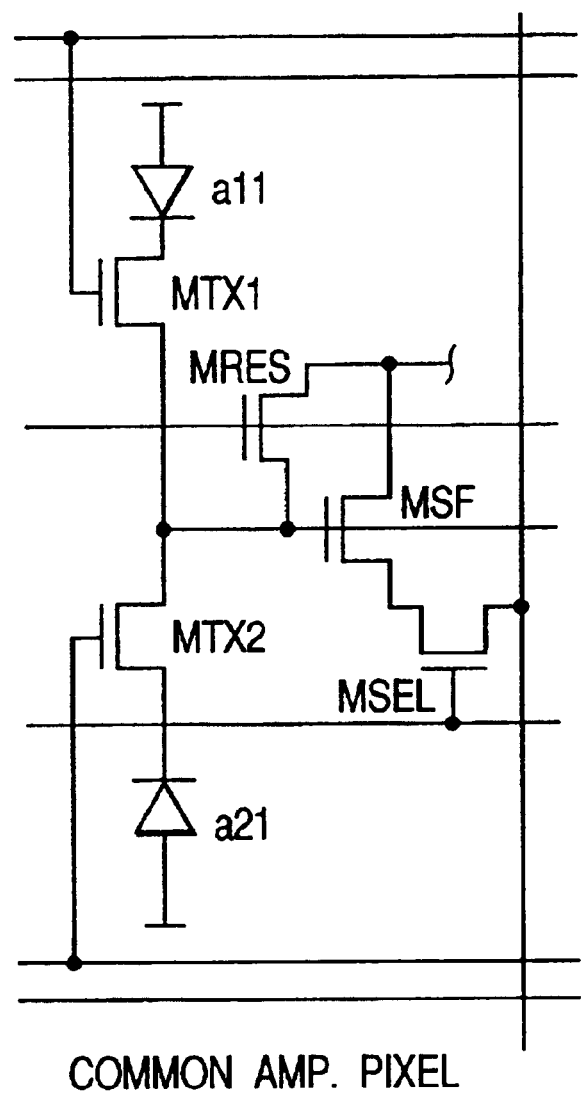
FIG. 34 is a diagram showing a two pixel arrangement using a common amplifier.

FIG. 34 is a diagram showing the structure of two pixels that employ a common amplifier. As is shown in FIG. 34, photodiodes a11 and a21 are photoelectric converters for individual pixels; an amplification transistor MSF is used as a common amplifier; transfer transistors MTX1 and MTX2 transfer signal charges stored in the photodiodes to a floating diffusion area (FD area) which is the input portion of the common amplifier; a reset transistor MRES resets the FD area; and a selection transistor MSEL selects a common amplifier pixel. The transistors MSF and MSEL constitute a source follower circuit. In the thus structured common amplifier pixels, signals are output from the two photodiodes via the common amplifier, and two pixels constitute one unit cell. One pixel includes a photodiode and a transfer transistor, and also includes part of a common circuit that is constituted by a common amplifier, a reset transistor and a selection transistor.

Figure 30:
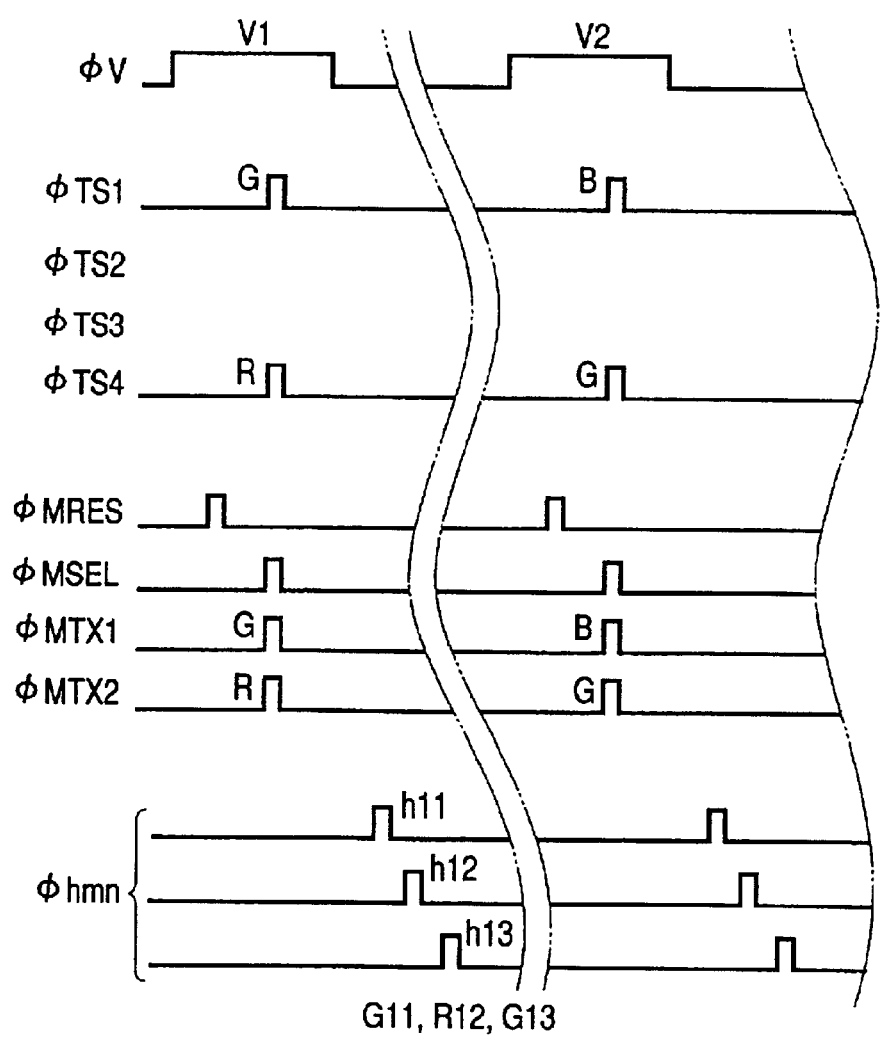
FIG. 30 is a timing chart for a signal output method in FIG. 28A.

FIG. 30 is a timing chart showing the signal output method in FIG. 28A. In FIG. 30, a memory for storing the noise produced by the common amplifier and transfer means for transmitting the noise to the memory are not shown.

First, the signal φMRES is set to level H, the gate of the common pixel amplifier is rest, and the residual charges in the gate are removed. Then, the noise transfer is performed.

Next, the signals φMTX1, φMTX2 and φSEL are set to level H to turn on the transfer transistors MTX1 and MTX2 and the selection transistor MSEL. Also, the signals φTS1 and φTS4 are set to level H to turn on the transfer transistors TS11, TS12, TS41, TS42, . . . , and for the line V1, G signals from pixels G11, G13, . . . and R signals from pixels R12, R14, . . . are transferred respectively to the memories CT1, CT2, . . . . When the output pulse hmn (h11, h12, h13, . . . ) is set to level H, the signals in the memory are dot-sequentially output via the horizontal output lines. The same process is performed for the line V and the following lines.

Figure 31:
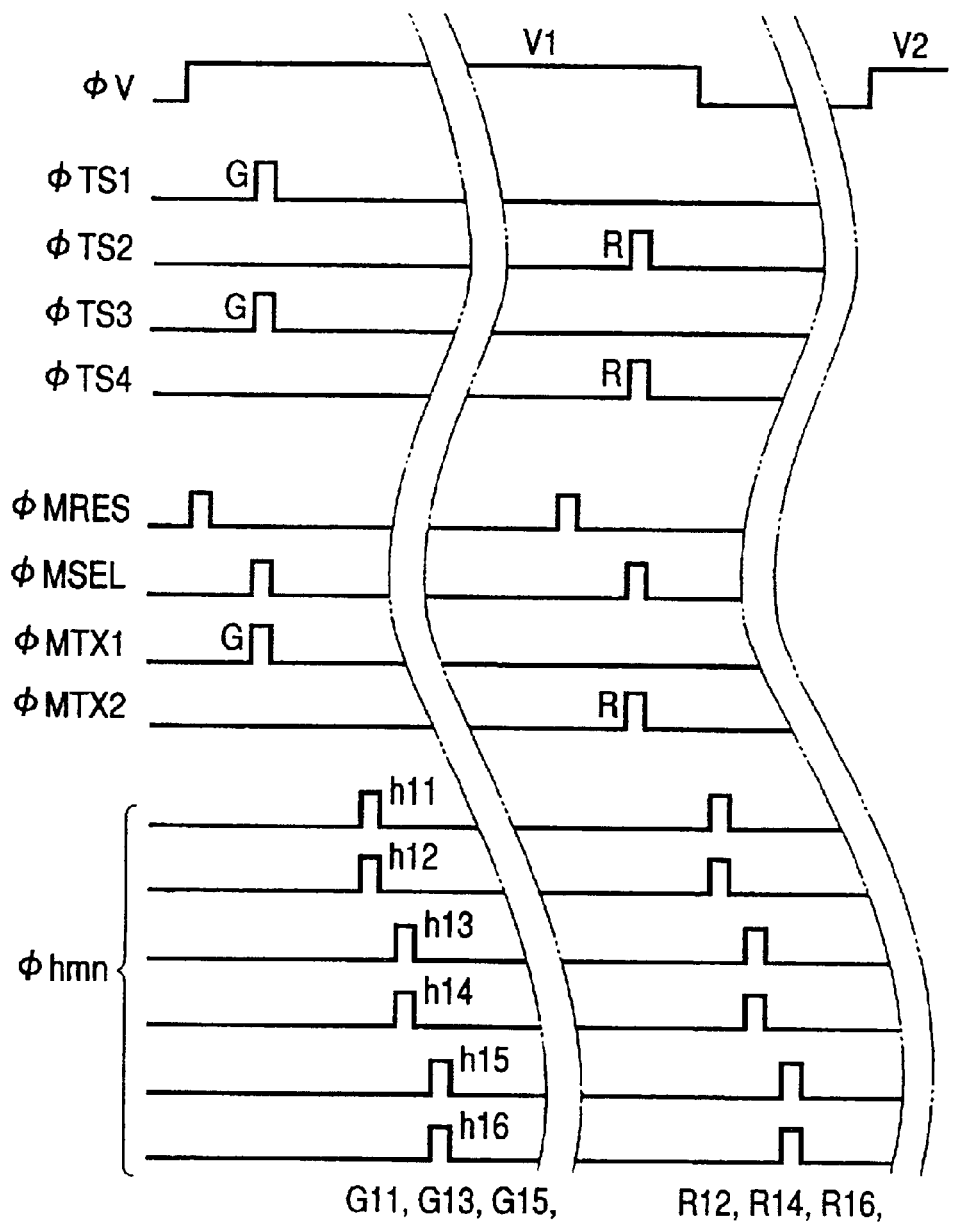
FIG. 31 is a timing chart for a signal output method in FIG. 28B.

FIG. 31 is a timing chart for the signal output method in FIG. 28C. In FIG. 31, the G signal for the line V1 is transferred to the memory, and is then output via the horizontal output line. Next, the R signal is transferred to the memory, and is then output via the horizontal output line.

First, the signal φMRES is set to level H, the gate of the common pixel amplifier is rest, and the residual charges in the gate are removed. Then, the noise transfer is performed.

Figure 32:
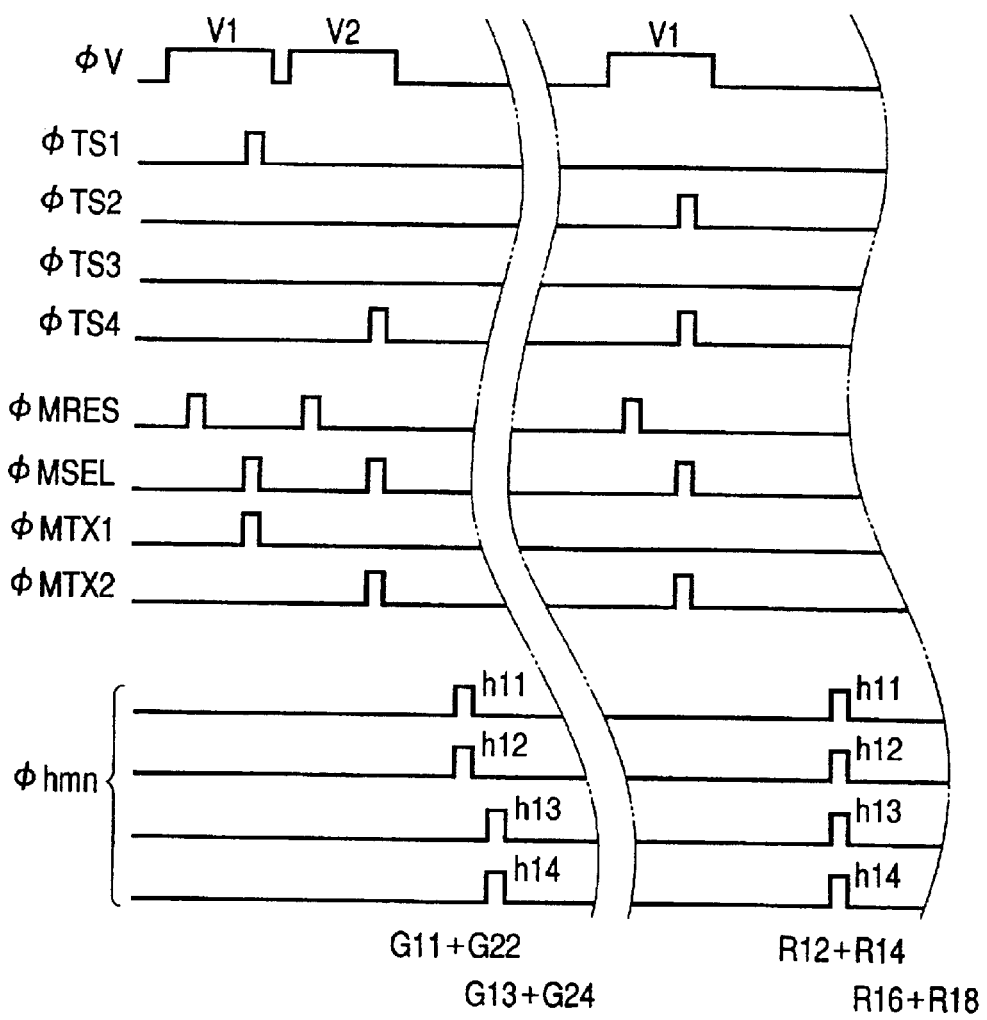
FIG. 32 is a timing chart for a signal output method in FIG. 28C.

Next, the signals φMTX1 and φSEL are set to level H to turn on the transfer transistor MTX1 and the selection transistor MSEL. Also, the signals φTS1 and φTS3 are set to level H to turn on the transfer transistors TS11, TS12, TS31, TS32, . . . , and for the line V1, G signals from pixels G11, G13, . . . are transferred respectively to the memories CT1 and CT2, CT3 and CT4, . . . . In this case, since the G pixel signal is transferred to the two memories and stored therein, the output pulses h11, h12, h13 and h14, . . . have the same phase. With the transfer of the signal to the two memories, the gain for reading from the memory to the horizontal output line in FIG. 32 is double the gain in FIG. 30. When the reading method in FIG. 30 and the reading method in FIG. 32 is selected in accordance with the system, the gain for the reading is adjusted by using a PGA (programmable gain amplifier) that will be described later.

FIG. 32 is a timing chart showing the signal output method in FIG. 28D. In FIG. 32, the G signals are transferred for the lines V1 and V2, and are added together in an oblique direction when the signals are output from the memory to the horizontal output line. Then, the R signals for the line V1 are transferred, and are added together in horizontal direction on horizontal output line. Similarly, the B signals for the line V2 are transferred and are added together in horizontal direction on the horizontal output line. In this case, the gain for the reading is the same as that in FIG. 31.

For reading the G signal, first, the signal φMRES is set to level H, the gate of the common pixel amplifier is reset, and the residual charges in the gates are removed. Then, the noise transfer is performed.

Next, the signals φMTX1 and φSEL are set to level H to turn on the transfer transistor MTX1 and the selection transistor MSEL. Also, the signal φTS1 is set to level H to turn on the transfer transistors TS11, TS12, . . . , and for the line V1, G signals from pixels G11, G13, . . . are transferred respectively to the memories CT1, CT3, . . . .

Then, the signal φRES is set to level H, the gate of the common pixel amplifier is reset, and the residual charges in the gates are removed. Then, the noise transfer is performed.

Further, the signals φMTX2 and φSEL are set to level H to turn on the transfer transistor MTX2 and the selection transistor MSEL. Also, the signal φTS4 is set to level H to turn on the transfer transistors TS41, TS42, . . . , and for the line V2, G signals from pixels G22, G24, . . . are transferred respectively to the memories CT2, CT4 . . . . The output pulses h11 and h12, h13 and h14, . . . have the same phase, and therefore, the addition signals G11+G22, G13+G24, . . . are output from the horizontal output lines.

For reading the R signals, first, the signal φMRES is set to level H, the gate of the common pixel amplifier is reset, and the residual charges in the gates are removed. Then, the noise transfer is performed.

Next, the signals φMTX2 and φSEL are set to level H to turn on the transfer transistor MTX2 and the selection transistor MSEL. Also, the signals φTS2 and φTS4 are set to level H to turn on the transfer transistors TS21, TS22, . . . and TS41, TS42, . . . , and for the line V1, the R signal from the pixel R12 is transferred to the memories CT1 and CT2, and the R signal from the pixel R4 is transferred to the memories CT3, CT4, . . . . When the output pulses h11, h12, h13, h14, . . . are set to level H, the addition signals R12+R14, . . . are output from the horizontal output lines.

The process used for reading the B signals is not shown in FIG. 32. However, the process used for reading the R signals can be employed, with the exception that for the line V2, the signals φTS1 and φTS3 are set to level H and the B signals are transferred to the memory. As a result, the addition signals B21+B23, . . . are output from the horizontal output lines.

Figure 33:
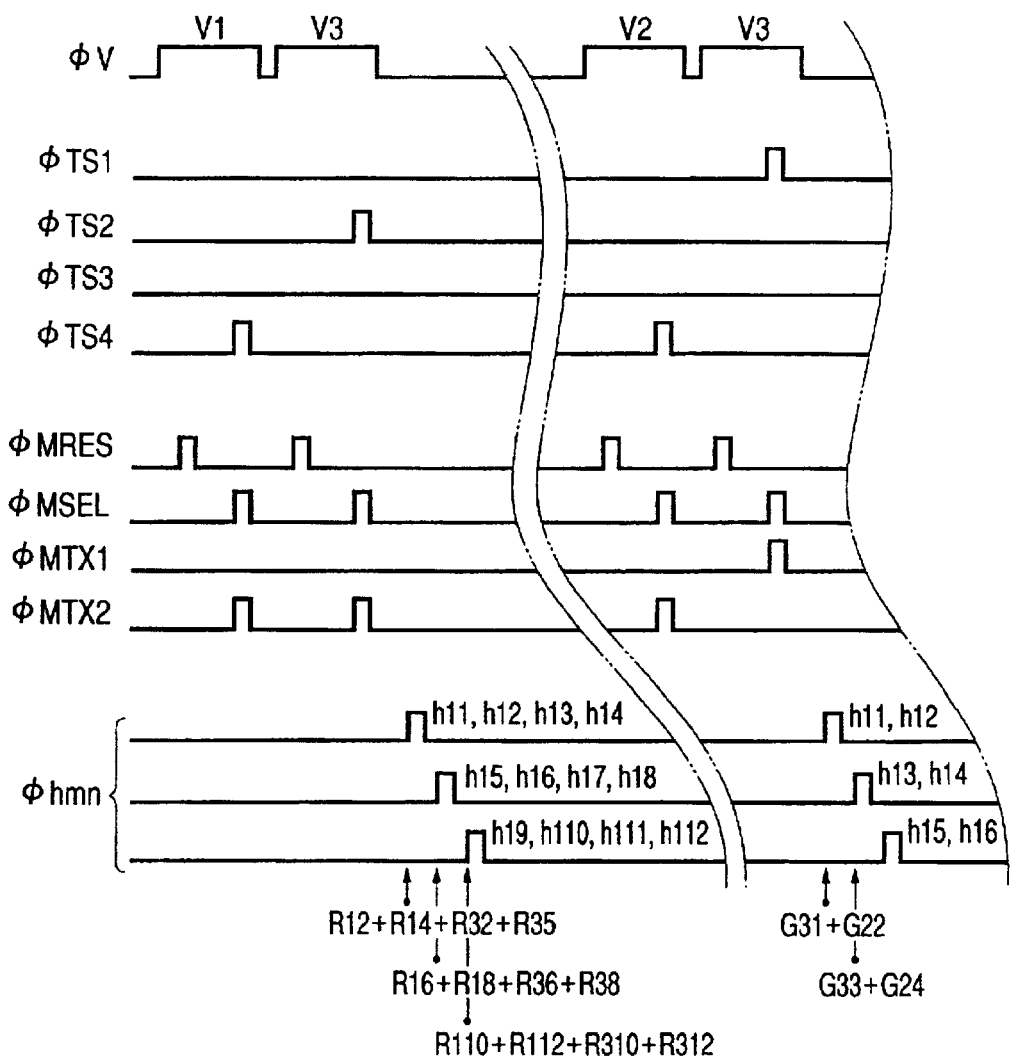
FIG. 33 is a timing chart for a signal output method in FIG. 28D.

FIG. 33 is a timing chart for the signal output method in FIG. 28E. In FIG. 33, for the line V1, the signal φMRES is set to level H, the gate of the common pixel amplifier is reset, and the residual charges in the gates are removed. Then, the noise-transfer is performed.

Next, the signals φMTX2 and φSEL are set to level H to turn on the transfer transistor MTX2 and the selection transistor MSEL. Also, the signal φTS4 is set to level H to turn on the transfer transistors TS41, TS42, . . . , and for the line V1, R signals from the pixels R12 and R14 are transferred to the memories CT2, CT4, . . . .

Similarly, for the line V3, the residual charges are removed and the noise transfer is performed, and then, the signals φMTX2 and φSEL are set to level H to turn on the transfer transistor MTX2 and the selection transistor MSEL. Also, the signal φTS2 is set to level H to turn on the transfer transistors TS21, TS22, . . . , and for the line V3, R signals from the pixels R32, R34, . . . are transferred to the memories CT1, CT3, . . . .

When the signals from the memory are transferred to the horizontal output lines, the four signals stored in the memories CT1 to CT4, . . . (signals from R pixels (e.g., R12, RT14, R32 and R34) that are located vertically and horizontally) are added together. Thus, the output pulses from the horizontal shift register have the same phase every four pulses (h11, h12, h13, h14, h15, h16, h17, h18, . . . have the same phase).

After the signals from the pixels G22, G24 for the line V2 are transferred to the memories CT2, CT4, . . . , the signals from the pixels G31, G33, . . . for the line V3 are transferred to the memories CT1, CT3, . . . . When the output pulses from the horizontal shift register are set so that they have the same phase every two pulses (h11 and h12, h13 and h14, h15 and h16, . . . have the same phase), for the lines V2 and V3, the G signals from pixels G22 and G31, G24 and G33, . . . , located in an oblique direction, are added together and the resultant signal is read. In this case, the pixels G for the lines V1 and V4 are not employed.

Following this, the four signals (signals from B pixels (e.g., B21, B23, B41 and B43) positioned vertically and horizontally) are added for the line V2 and line V4. While this timing is not shown in FIG. 33, the addition and reading can be performed in the same manner as they were for the R signals.

In FIG. 33, the horizontal resolution can be increased by using the G signals in two lines. In this case, compared with the example in FIG. 31, the gain for the reading of R and B is doubled, and the gain for the reading of G is unchanged. With the addition of the signals, the S/N ratio for R or B is improved $\sqrt{2}$ times, while the S/N ratio for G remains the same.

The embodiment has been explained by referring to FIGS. 28D and 28E; however, the addition of the color signals is not limited to this method. The G signals may be added horizontally or vertically, or a complementary color filter may be employed.

In addition, a pixel portion may be employed where filters for first, second, third and fourth colors are provided. To read signals from a predetermined block in the pixel portion, at the first timing, the first and the second color signals may be added, and at the second timing the third and the fourth color signals amy be added.

Figure 35:
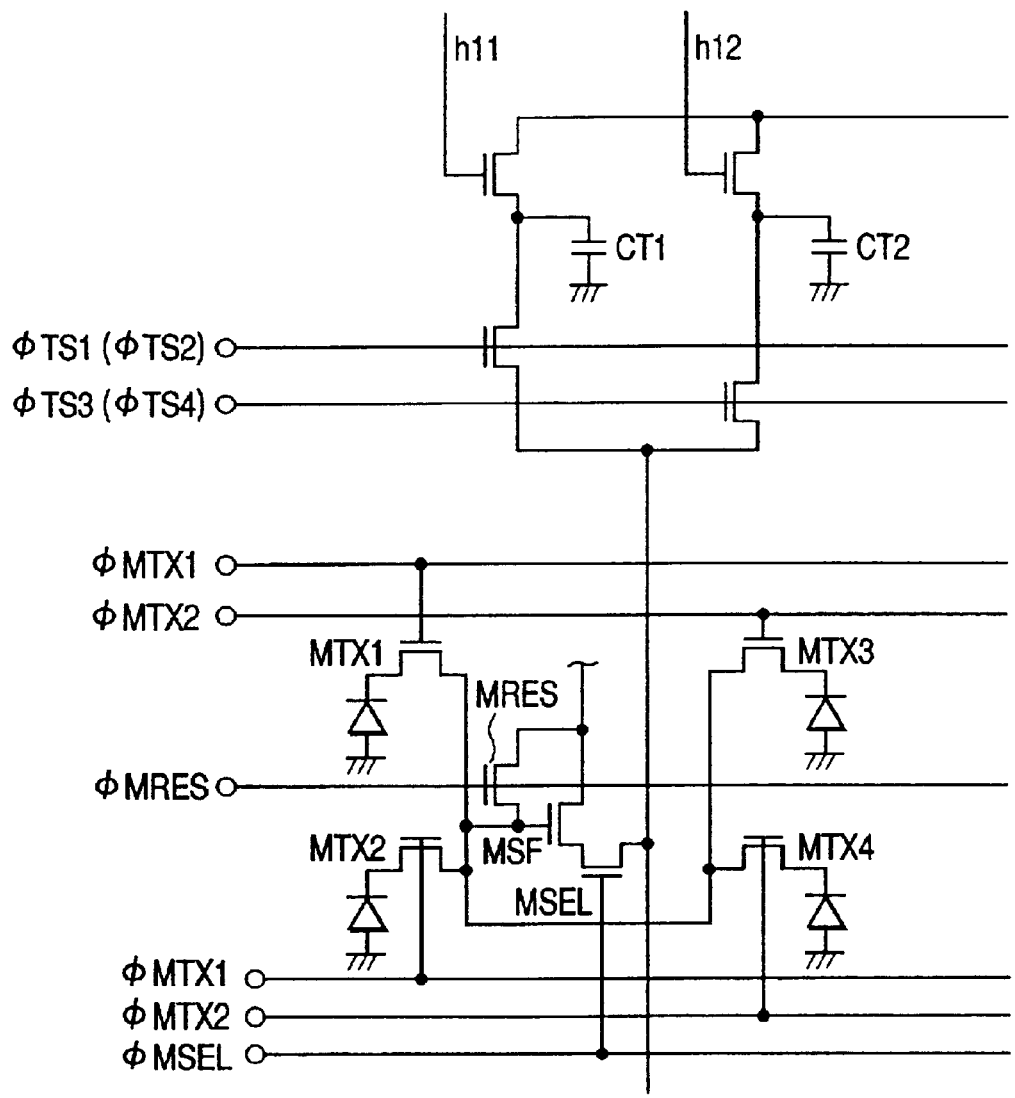
FIG. 35 is a diagram showing a four pixel arrangement using a common amplifier.

FIG. 35 is a diagram showing an example where four pixels located horizontally and vertically are connected to a common pixel amplifier. With this arrangement, vertical output lines and switches required can be reduced, and the aperture ratio of the pixel and the chip size can be further reduced.

In this embodiment, the common amplifier is not always required, while it is required in FIGS. 34 and 35; a single amplifier may be provided for each pixel, or instead of two color pixel signals, three or more may be added.

Figure 37:
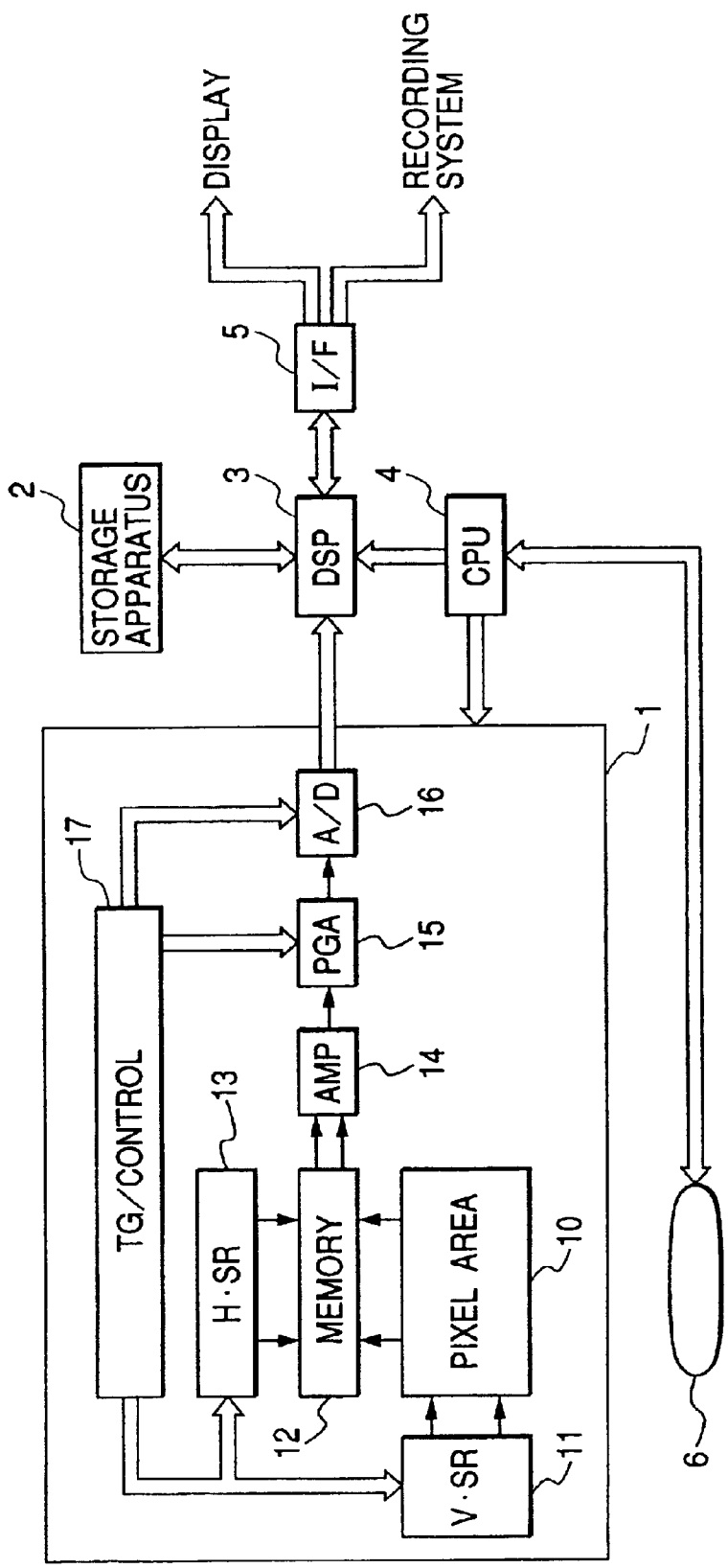
FIG. 37 is a block diagram showing an example pickup system using the color pickup apparatus of this embodiment.

FIG. 37 is a block diagram showing an image pickup system that employs the color image pickup apparatus of this embodiment.

In this system, an image pickup device 401 comprises: a vertical shift register (V-SR) 411 for controlling a pixel area 410 and a pixel on a line basis; a memory 412 used to temporarily store (or add) a pixel signal and noise; a horizontal shift register (H-SR) 413 for outputting a signal from the memory 412 to a horizontal output line (or for adding a signal); an AMP 14 for removing the noise produced by a pixel amplifier from a signal from the memory 412; a programmable gain amplifier PGA 415 for changing the gain for the signal of the AMP 414; an A/D converter 416 for converting the output signal of the PGA 415 into a digital signal; and a timing generator/controller 417 for controlling the V-SR 411, the H-SR 413, the memory 412, the PGA 415 and the A/D converter 416. Also, an optical system 406 having an iris is provided to focus a light on the image pickup apparatus.

A DSP 403 performs image processing for a moving image or a still image. A CPU 401 sets, to the DSP 403, a parameter used for the image processing, or controls the image pickup device 401 and the iris of the optical system 406.

A storage device 402 is an image recording medium, such as a DRAM, a smart medium, a magnetic tape or an optical disk, and is used as a temporary storage area for image processing. Furthermore, provided are a display device, such as a CRT, for providing a display after the image processing has been completed, and an I/F circuit 405 for transmitting a signal to a recording apparatus, such as a printer.

In the image pickup device 401, to switch between the addition reading mode and the all pixel reading mode and between the dot-sequential scanning or the line-sequential scanning, the CPU 404 determines which mode is to be used and transmits, to the image pickup device 401 and the DPS 403, a signal corresponding to the determined mode. The timing generator/controller 417 changes the timing as shown in FIGS. 30 to 33 in accordance with the moving image or the still image.

Figure 36:
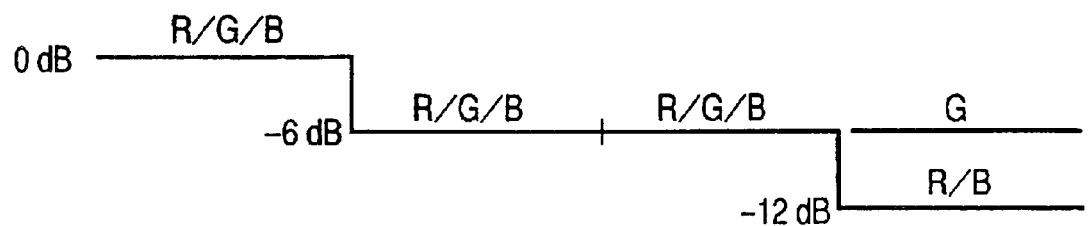
FIG. 36 is a diagram for explaining an adjustment gain for each signal output method.

FIG. 36 is a diagram for explaining the gain adjustment for each signal output method. When the gain shown in FIG. 30 is employed as a reference, the gain in case of FIGS. 31 and 32 is adjusted to −6 dB, and the gain in case of FIG. 33 is adjusted to −12 dB for the R and B signals and to −6 dB for the G signal.

In this embodiment, the chip size can be reduced, and an inexpensive color pickup apparatus can be provided.

Further, since the same signal processing system is employed for each signal, variation in signals is small, and a high image quality is obtained.

In addition, a high image quality is obtained by employing high definition reading whereby all the pixels are read, and the drive frequency can be reduced and the S/N ratio improved by the adding reading of pixel signals. The consumption of power can be therefore reduced. And furthermore, as an additional, excellent effect, the angle of view of the optical system is the same in the high definition mode and in the adding and reading mode.

A sixth embodiment of the present invention will now be described. In this embodiment, a common pixel amplifier mentioned briefly in the first, the third, the fourth and the fifth embodiments will be described in more. detail.

Figure 45:
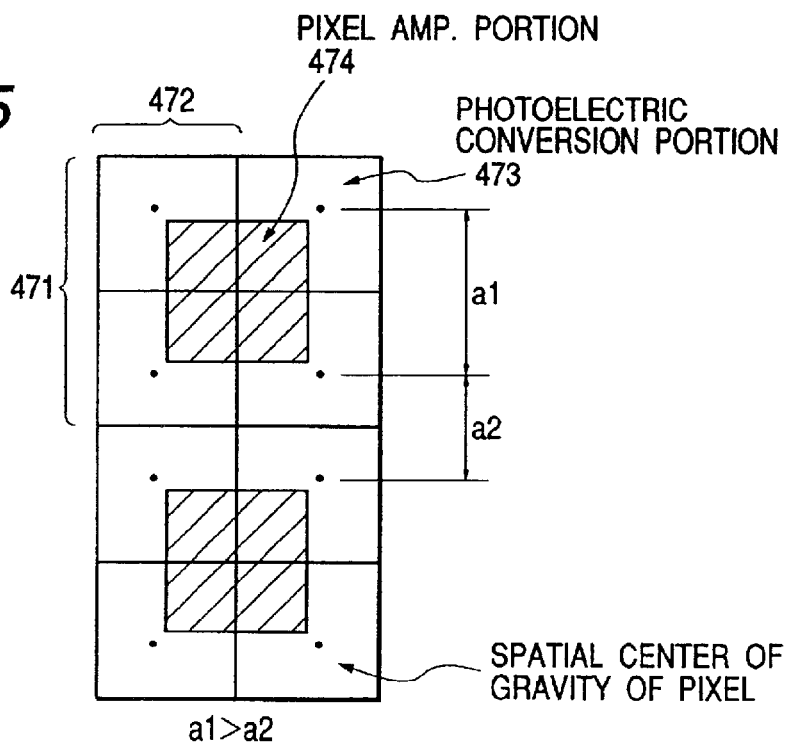
FIG. 45 is a diagram showing one more example unit cell arrangement.

Since in the arrangement in FIG. 45 photoelectric converters 473 are not located at the same pitch (a1≠a2), the interval between the portions (light receiving portions) that detect light in each pixel thereof is not equal, and the following problem occurs. Specifically, since the spatial frequency and the resolution are different in different portions wherein a the pitches for the same color are unequal, a defect, such as a reduction in the resolution and an increase in the generation of moire, occurs. The generation of moire is a very serious problem, and an image pickup apparatus having such a problem can not actually be considered a practicable product. This problem will also be encountered in cases where unit cell is constituted by pixels in counts other than four.

To resolve this problem, the present application proposes an appropriate image pickup apparatus. With this apparatus, even for a CMOS sensor having an amplifier that is distributed among a plurality of pixels, a constant pitch is maintained for the photoelectric converters, so that the light reception portion intervals are equal and the reduction in the resolution and the occurrence of moire can be prevented. Furthermore, the aperture ratio can be increased and a preferable performance can be obtained. This image pickup apparatus can be appropriately employed for the present invention.

Figure 38:
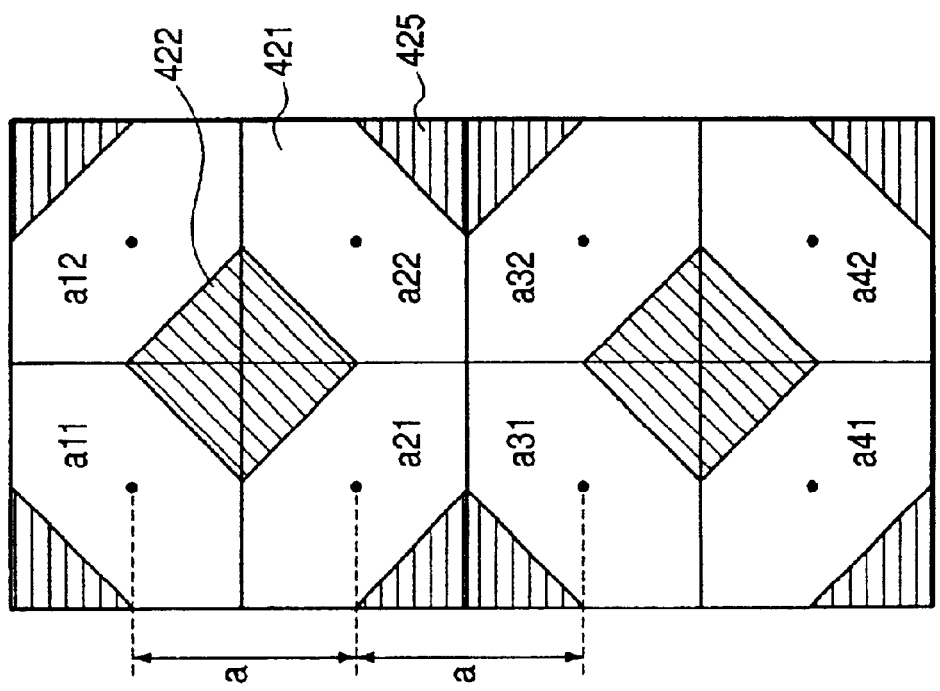
FIG. 38 is a diagram showing a layout for unit cells according to a sixth embodiment of the present invention.

FIG. 38 is a diagram showing an example where a common amplifier 422 is employed in common for a 2×2 pixel block. In FIG. 38, a common amplifier 422 is positioned in the center of the four pixels, and four photoelectric converters, a11, a12, a21 and a22, are distributed around it. The common amplifier 422 includes the amplification means MSF, the reset means MRES, the selection means MSEL, and the transfer means MTX1 to MTX4 in FIG. 35.

In addition, a light shielding portion 425 is symmetrically located relative to the portion of each pixel that the common amplifier 422 occupies. Therefore, the center of gravity of the photoelectric converter 421 of each pixel is located at the center of the pixel. Thus, the four photoelectric converters all to a22 are arranged at the same interval "a" in both vertical and horizontal directions.

Figure 39:
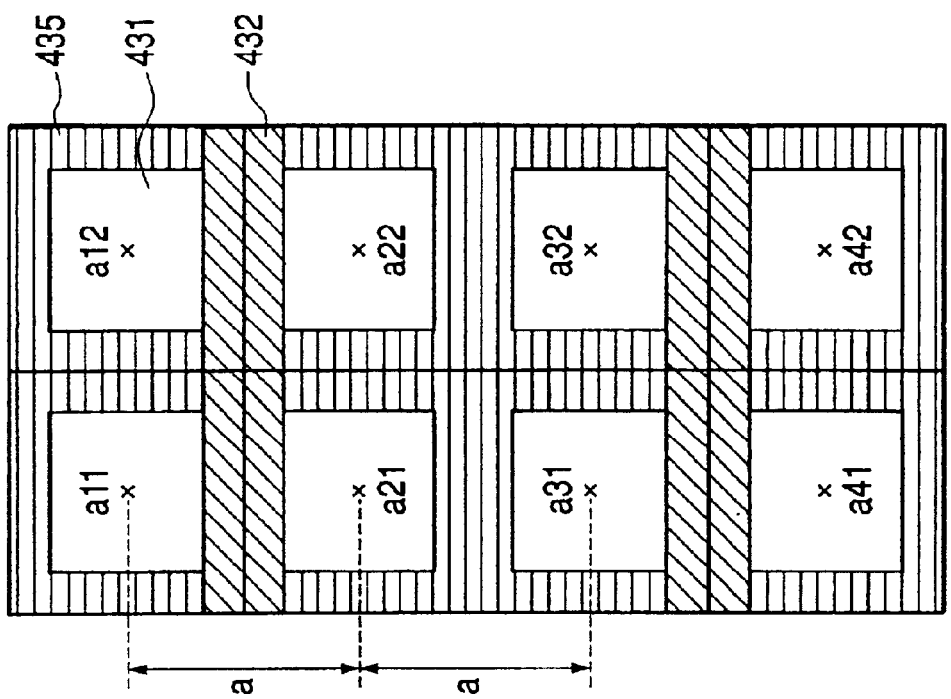
FIG. 39 is a diagram showing a layout for unit cells.

In FIG. 39, a common amplifier 432 is positioned in the center of four pixels in the horizontal direction, and four photoelectric converters 431 (a11, a12, a21 and a22) are so located that they sandwich the common amplifier 432.

Further, a light shielding portion 425 is symmetrically located relative to the portion of each pixel that the common amplifier 422 occupies. Therefore, the center of gravity of the photoelectric converter 431 of each pixel is located at the center of the pixel. Thus, the four photoelectric converters all to a22 are arranged at the same interval "a" in both vertical and horizontal directions.

Even if the vertical and the horizontal arrays are exchanged, the embodiment in FIG. 39 is established.

Figure 40:
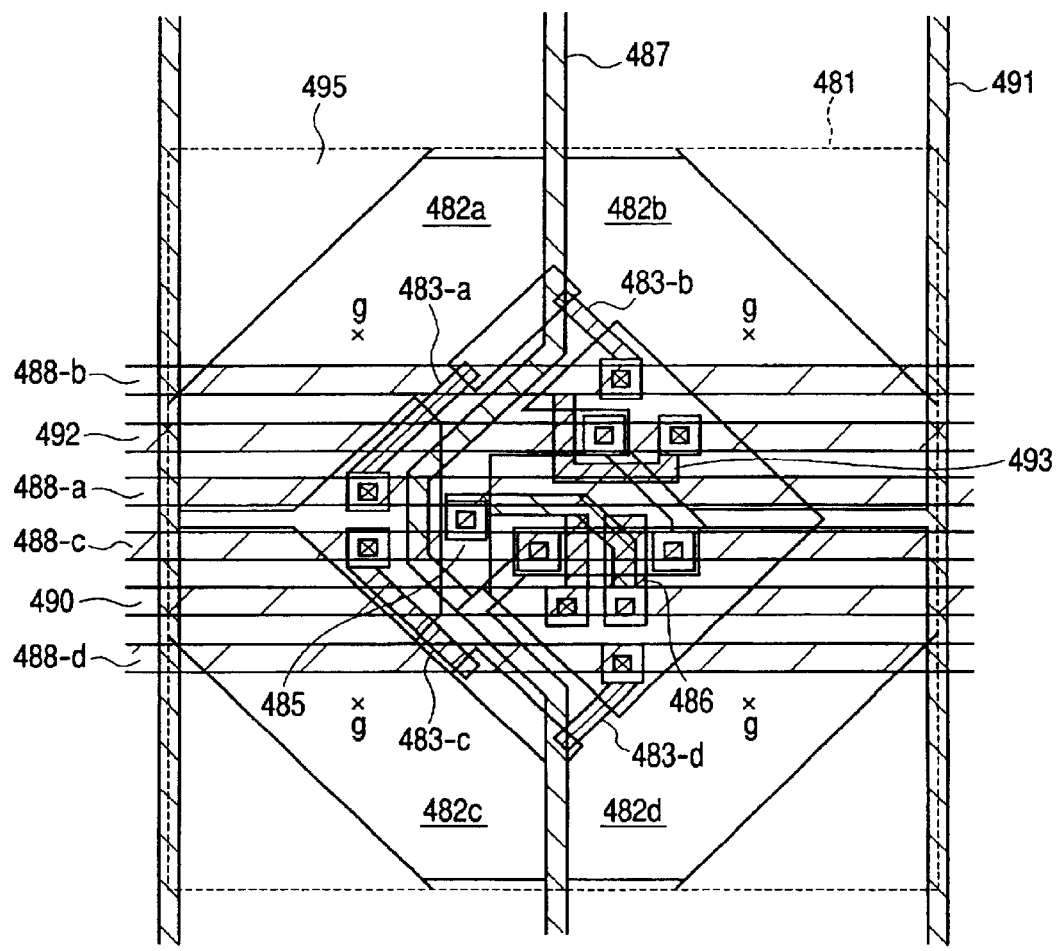
FIG. 40 is a diagram showing an example pattern layout for unit cells.

FIG. 40 is a diagram showing a specific pattern layout for a first arrangement of a pixel array in a CMOS sensor.

The CMOS sensor in FIG. 40 is formed on a monocrystal substrate according to the layout rule of 0.4 μm. The pixel size is 8 μm square, and a source follower amplifier, which is the amplification means, is used in common by four pixels in a 2×2 block. Therefore, the size of a repetitive unit cell 481 described by broken lines is 16 μm×16 μm square, and a two-dimension array is formed.

Photodiodes 482a, 482b, 482c and 482d, which are photoelectric converters, are arranged obliquely in the center of the individual pixels. The shape of each photodiode, vertically and horizontally, is substantially symmetric in rotation and in space. The gravity centers g of the photodiodes 482a, 482b, 482c and 482d are designed to correspond to those of the pixels. Light shielding portions 495 are also provided.

Additionally provided are a scanning line 488-a for controlling an transfer gate 483-a shown upper left, a row selection line 490, and a reset line 492 for controlling a MOS gate 493.

Signal charges stored in the photodiodes 482a to 482d are transferred via the transfer gates 483a to 483d to an FD 485. The MOS size in the gates 483a to 483d is provided with channel length L=0.4 μm and channel width W=1.0 μm.

The FD 485 is connected to an input gate 486 of the source follower by an Al line of 0.4 μm wide, and the signal charge transferred to the FD 485 modulates the voltage of the input gate 486. The MOS size of the input gate 486 is provided with the channel length L=0.8 μm and the channel width W=1.0 μm, and the sum of the capacitances of the FD 485 and the input gage 486 is about 5 fF. Since Q=CV, the voltage of the input gate 486 is changed by 3.2 V when $10^5$ electrons are accumulated.

A current flowing from a VDD terminal 491 is modulated by the input gate 486, and is supplied to a vertical output line 487. The current flowing to the vertical output line 487 is processed by a signal processor (not shown) to finally provide image information.

Thereafter, in order to set predetermined potential VDD for the photodiodes 482a to 482d, the FD 485 and the input gate 486, a MOS gate 493 connected to a reset line 492 is opened (at this time, the transfer gates 483a to 483d are also opened), so that the photodiodes 482a to 482d, the FD 485 and the input gate 486 are short-circuited with the VDD terminal.

Thereafter, the transfer gates 483a to 483d are closed, and the charge accumulation function of the photodiodes 482a to 482d is resumed.

The importance here is as follows. Since all the lines 488a to 488d, 490 and 492 that pass through horizontally are formed of transparent conductor material ITO of a 1500 Å thick (Indium Tin Oxide), light is transmitted through the photodiodes 482a to 482d, so that the center of gravity g of the photodiodes corresponds to the center of gravity of the portions (light receiving portions) where light is detected.

According to this embodiment, a CMOS sensor that has an equal pixel pitch, a high areal ratio and a high aperture ratio can be provided.

Figure 41:
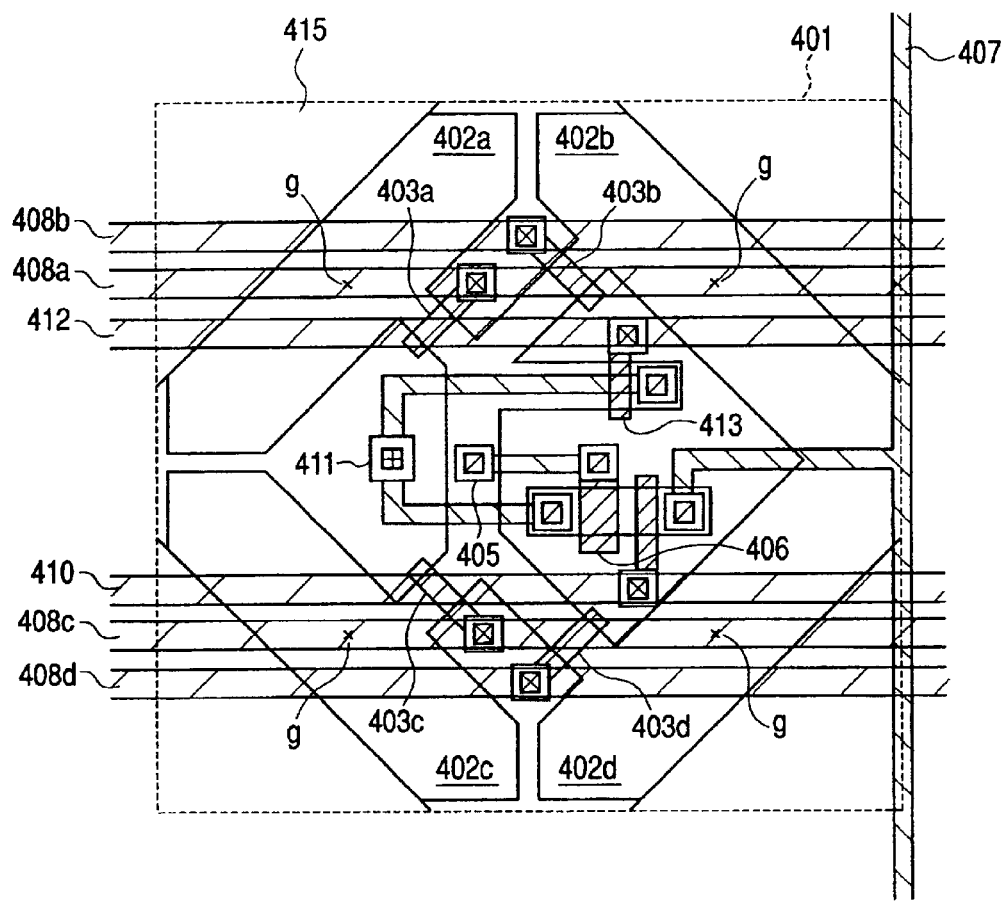
FIG. 41 is a diagram showing another example pattern layout for unit cells.
Figure 42:
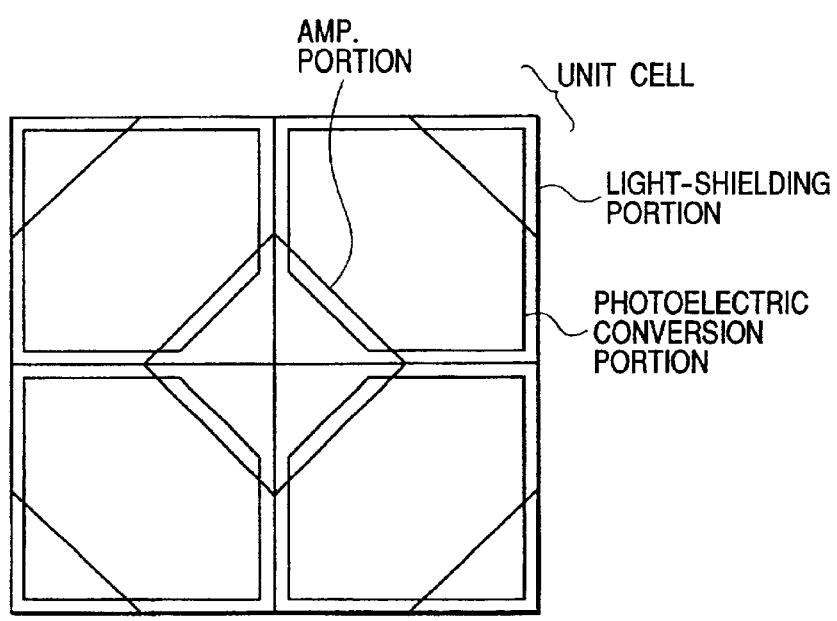
FIG. 42 is a diagram showing an example unit cell arrangement.

FIG. 41 is a diagram showing a specific pattern layout for a second arrangement of the pixel array in the CMOS sensor in this embodiment.

In FIG. 41, the pixel array includes photodiodes 402a to 402d, transfer gates 403a to 403d, an FD 405, an input gate 406 for a source follower, a vertical output line 407, scanning lines 408a to 408d, a row selection line 410, and a reset line 412 for controlling a MOS gate 413.

In this example, three of the horizontal lines 408a to 408d and 410 and 412 pass across the center of each pixel. Therefore, even when metal lines are employed to interrupt light incident onto the photodiodes 402a to 402d, the center of gravity g of the portion wherein light is detected, is not changed, and corresponds to the center of each pixel.

According to this example, since conventional (nontransparent) metal having a small electrical resistance can be employed, the time constant for the horizontal line can be enhanced, and an image pickup apparatus which can operate at high speed can be provided.

With the above arrangement, since the portion under the light shielding film is effectively used, the photodiodes that are photoelectric converters can also be formed below the portion of the film, so as to function as a charge accumulator portion.

Figure 43:
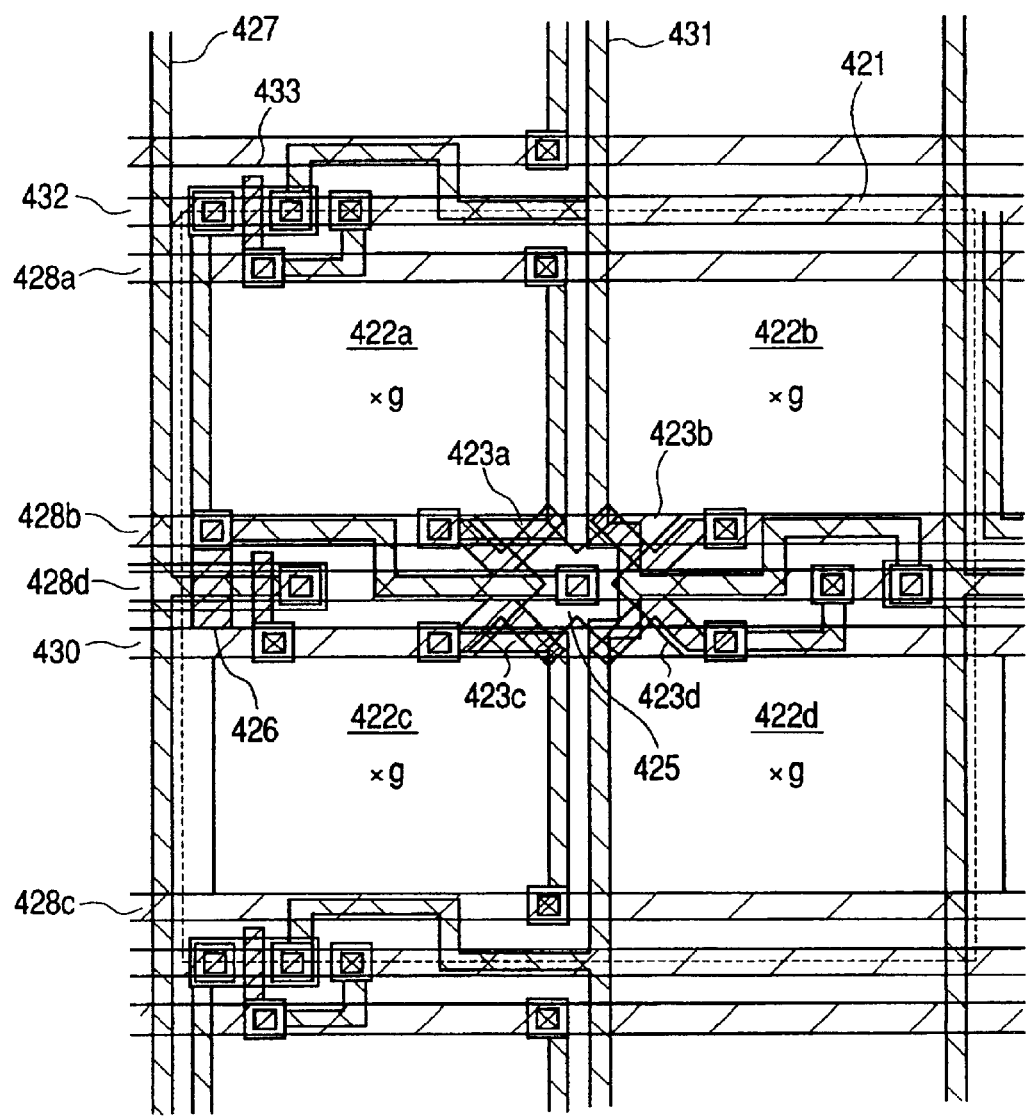
FIG. 43 is a diagram showing an additional example pattern layout for unit cells.

In the second arrangement, a reduction in the sensitivity of the image pickup apparatus may occur because wiring lines pass across the center of the pixel where the highest light condensing ratio is provided. Thus, a third improved arrangement is proposed as shown in FIG. 43.

With this arrangement, transfer gates 423a to 423d, an FD 425, an input gate 426 of a source follower, and a reset MOS gate 433 are all located under horizontal lines (scanning lines 428a to 428d, a row selection line 430 and a reset line 432). Therefore, the size of the photodiodes 422a to 422d and the aperture ratio can be maximized. Further, the openings are continuously arranged in the center of the individual pixels, and a light shielding portion is formed in the horizontal and vertical line areas 427, 431 and 421.

Furthermore, in this arrangement, since the source follower, which is amplification means, and the reset MOS transistor are separately arranged around the pixels in the horizontal direction, they can be compactly distributed under the horizontal lines.

Since under the lines of the upper right pixels there is unused space, a new element, such as a smart sensor, can be additionally provided therein.

According to this arrangement, the size of the photodiode and the aperture ratio can be increased, so that an image pickup apparatus having high sensitivity and a broad dynamic range can be provided. Further, even when high definition has been further developed in the future so that the size of the opening of the photodiode becomes substantially equal to the wavelength of light, the problem that no light is received by the photodiode can be avoided, and it will be possible to demonstrate the performance of the apparatus for an extended period of time.

Figure 44:
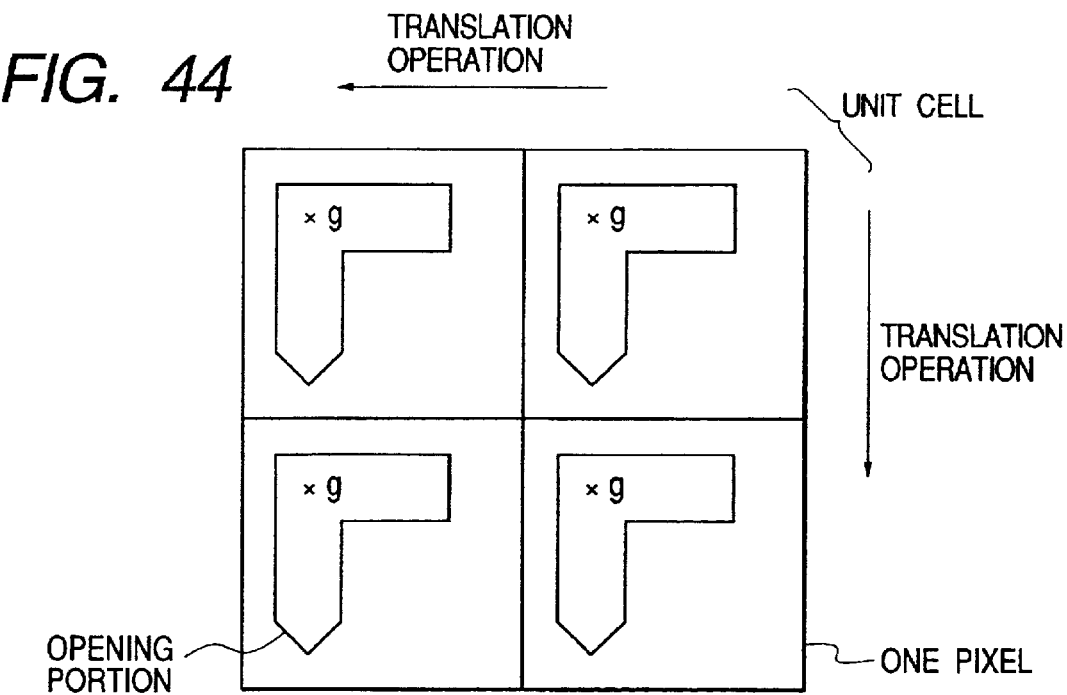
FIG. 44 is a diagram showing another example unit cell arrangement.

With the above described arrangements, the amplification means is located at the center of the unit cell, and the center of gravity of the portion where light is detected corresponds to the center of the pixel. However, the present invention is not limited to these arrangement, and as is shown in FIG. 44, the opening may be translationally symmetrical.

That is, since the opening is formed so that it is translationally symmetrical, the portions where light is detected will be arranged at the same pitch.

A seventh embodiment of the present invention will now be described.

Figure 46:
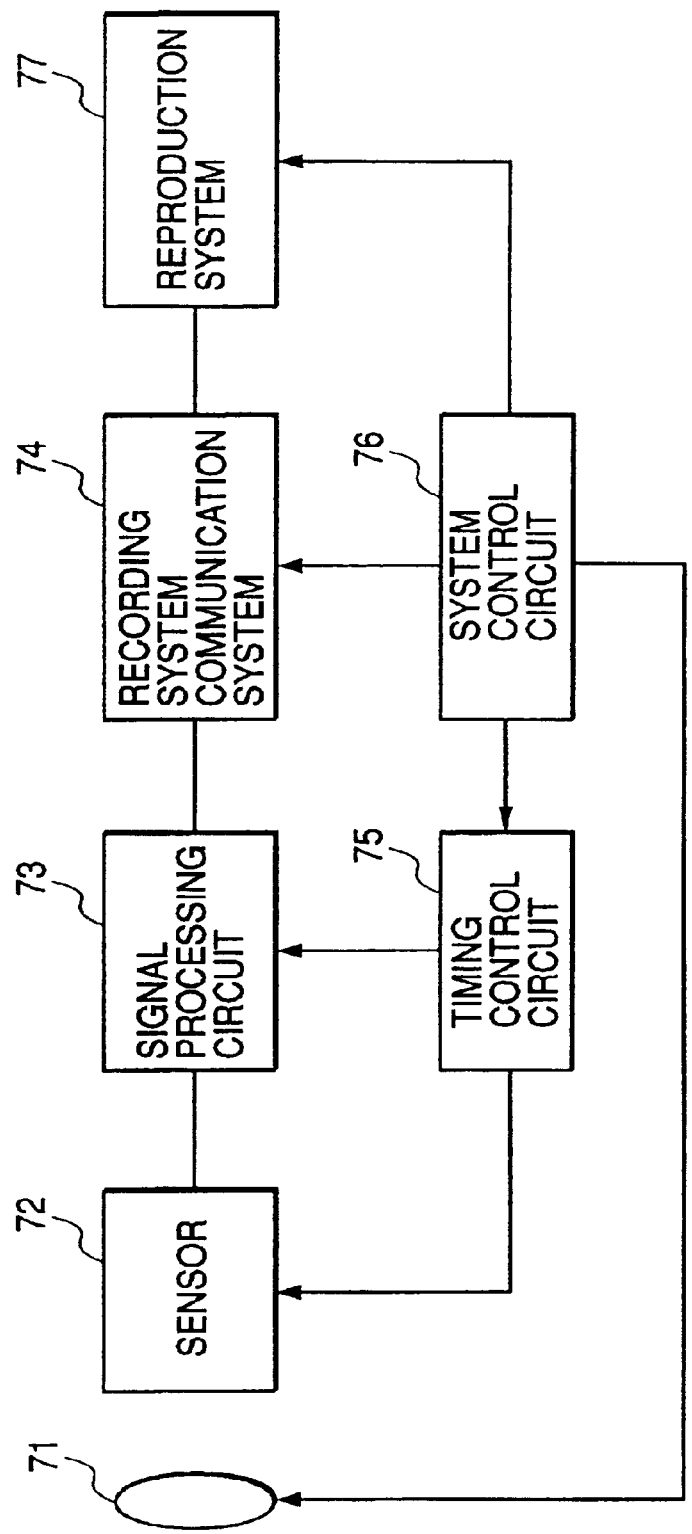
FIG. 46 is a diagram showing an image pickup apparatus that employs one of the image pickup apparatuses explained in the first to the sixth embodiments.

FIG. 46 is a schematic diagram illustrating a system that employs the image pickup apparatus according to the first to the sixth embodiments. As is shown in FIG. 46, image light that has entered through an optical system 71 forms an image on a CMOS sensor 72 which includes the pixel portion and the reading circuits explained for the first to the sixth embodiments. The light information is converted into an electrical signal by a pixel array that is arranged on the CMOS sensor 72. The obtained electrical signal is processed by a signal processing circuit 73 using a predetermined method, and the resultant signal is output. The output signal is recorded in a data recording device by a recording/communication system 74, or is transmitted to a reproduction system 77. The recorded, or stored, signal is reproduced by the reproduction system 77. The CMOS sensor 72 and the signal processing circuit 73 are controlled by a timing control circuit 75, and the optical system 71, the timing control circuit 75, the recording/communication system 74, and the reproduction system 77 are controlled by a system control circuit 76. The timing control circuit 75 selects independent reading and adding and thinning-out reading.

The horizontal and vertical drive pulses differ in the fast pixel reading (all pixel reading) and the slow pixel reading (adding and thinning-out reading). Therefore, the sensor driving timing, the resolution process of the signal processing circuit 73, and the number of pixels to be recorded by the recording system 74 must be changed for each reading mode. This adjustment is performed by the system control circuit 76 in accordance with the reading mode. Further, for each reading mode, the sensitivity differs due to the addition. For example, compared with the fast pixel reading, the number of signals in the adding and reading process is doubled. And since in this case the dynamic range is reduced to ½, an iris (not shown) is reduced by half to obtain an appropriate signal. Therefore, an image can be obtained at a low illuminance of ½. Also, the signal processing circuit and the recording system may be separately provided for use for high definition and for moving images.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:

plural pixels arranged two-dimensionally:

a first addition portion which adds signals from a plurality of said plural pixels each outputting a first color signal; and a second addition portion which adds signals from a plurality of said plural pixels each outputting a second color signal, wherein the number of the plurality of pixels to be subjected to addition by the first addition portion selectively is made different from the number of the plurality of pixels to be subjected to addition by the second addition portion, so that a spatial color arrangement before the addition becomes the same as the spatial color arrangement after the addition.

2. An apparatus according to claim 1, wherein a positional range of the plurality of pixels each outputting the first color signal overlaps spatially with a positional range of the plurality of pixels each outputting the second color signal.

3. An apparatus according to claim 1, wherein the plurality of pixels each outputting the first color signal are arranged in a diagonal direction, and the plurality of pixels each outputting the second color signal are arranged in horizontal and vertical directions.

4. An apparatus according to claim 1, wherein the first color is green and the second color is red or blue.

* * * * *

UNITED STATES PATENT AND TRADEMARK OFFICE
CERTIFICATE OF CORRECTION

PATENT NO. : 6,992,714 B1
APPLICATION NO. : 09/584198
DATED : January 31, 2006
INVENTOR(S) : Seiji Hashimoto et al.

It is certified that error appears in the above-identified patent and that said Letters Patent is hereby corrected as shown below:

COLUMN 2
Line 13, "comprises" should read -- that comprises:--.
Line 42, "aspect" should read --another aspect--.

COLUMN 4
Line 24, "circuit" should read --circuit;--.
Line 26, "circuit" should read --circuit;--.

COLUMN 5
Line 15, "arrangement." should read --arrangement;--.
Line 19, "arrangement." should read --arrangement;--.
Line 55, "in a" should read --in an--.

COLUMN 6
Line 5, "is." should read --is--.
Line 57, "preformed" should read --performed--.

COLUMN 7
Line 5, "Is" should read --is--
Line 52, "is-transferred" should read --is transferred--.

COLUMN 8
Line 1, "above described" should read --above-described--.
Line 40, "all" should read --al l--.
Line 49, "common a" should read --common--.
Line 56, "all" should read --al l--.
Line 59, "all" should read --al l--.

COLUMN 10
Line 25, "memory." should read --memory--.
Line 45, "preformed" should read --performed--.

COLUMN 11
Line 17, "ɸadd together" should read --added together--.
Line 60, "C-and" should read --C and--.

COLUMN 12
Line 56, "above described" should read --above-described--.

UNITED STATES PATENT AND TRADEMARK OFFICE
CERTIFICATE OF CORRECTION

PATENT NO. : 6,992,714
APPLICATION NO. : 09/584198
DATED : January 31, 2006
INVENTOR(S) : Seiji Hashimoto et al.

It is certified that error appears in the above-identified patent and that said Letters Patent is hereby corrected as shown below:

COLUMN 16
Line 41, "preformed" should read --performed--.
Line 44, "ϕEL" should read --ϕSEL--.

COLUMN 18
Line 43, "gates,." should read --gates,--.

COLUMN 19
Line 20, "scanning m" should read --scanning--.

COLUMN 22
Line 24, "in is" should read --is--.
Line 39, "all" should read --al l--.
Line 59, "rest" should read --reset--.

COLUMN 23
Line 12, "rest" should read --reset--.
Line 51, "ϕRES" should read -- ϕMRES--.

COLUMN 25
Line 10, "amy" should read --may--.

COLUMN 26
Line 17, "more." should read --more--.
Line 24, "a the" should read --the--.
Line 56, "all" should read --al l--.

UNITED STATES PATENT AND TRADEMARK OFFICE
CERTIFICATE OF CORRECTION

PATENT NO. : 6,992,714 B1
APPLICATION NO. : 09/584198
DATED : January 31, 2006
INVENTOR(S) : Seiji Hashimoto et al.

It is certified that error appears in the above-identified patent and that said Letters Patent is hereby corrected as shown below:

COLUMN 27
Line 1, "all" should read --al l--.
Line 22, "an" should read --a--.

COLUMN 28,
Line 7, "are." should read --are--.
Line 54, "above described" should read --above-described--.
Line 58, "arrangement" should read --arrangements--.

COLUMN 30
Line 9, "two-dimensionally:" should read --two-dimensionally;--.

Signed and Sealed this

Eighth Day of August, 2006

JON W. DUDAS
*Director of the United States Patent and Trademark Office*